US009485459B2

(12) United States Patent
Shoemake et al.

(10) Patent No.: US 9,485,459 B2
(45) Date of Patent: Nov. 1, 2016

(54) VIRTUAL WINDOW

(71) Applicant: Biscotti Inc., McKinney, TX (US)

(72) Inventors: Matthew B. Shoemake, Allen, TX (US); Syed Nadeem Ahmed, Allen, TX (US)

(73) Assignee: Biscotti Inc., Allen, TX (US)

( * ) Notice: Subject to any disclaimer, the term of this patent is extended or adjusted under 35 U.S.C. 154(b) by 0 days.

(21) Appl. No.: 14/479,169

(22) Filed: Sep. 5, 2014

(65) Prior Publication Data
US 2014/0375752 A1 Dec. 25, 2014

Related U.S. Application Data

(63) Continuation-in-part of application No. 14/106,263, filed on Dec. 13, 2013, which is a continuation-in-part of application No. 14/170,499, filed on Jan. 31, 2014, which is a continuation-in-part of application No.
(Continued)

(51) Int. Cl.
H04H 60/33 (2008.01)
H04N 7/14 (2006.01)
(Continued)

(52) U.S. Cl.
CPC ............... *H04N 7/141* (2013.01); *G06F 3/011* (2013.01); *G06K 9/00362* (2013.01);
(Continued)

(58) Field of Classification Search
CPC ............ H04N 21/44218; H04N 21/4223; H04N 21/44008; H04N 21/42203; H04N 7/141
USPC ............................................. 725/10; 348/169
See application file for complete search history.

(56) References Cited

U.S. PATENT DOCUMENTS 5,243,510 A   9/1993  Cheney, II
5,641,288 A * 6/1997  Zaenglein, Jr. ....... F41G 3/2633
                                                434/17
(Continued)

FOREIGN PATENT DOCUMENTS

EP      1814290 A2    8/2007
JP   2010/152866 A    7/2010
(Continued)

OTHER PUBLICATIONS

Amazon "Amazon CloudFront Documentation" 3 pages, Available at: http://aws.amazon.com/documentation/cloudfront/; Accessed on Feb. 25, 2014.
(Continued)

*Primary Examiner* — Nasser Goodarzi
*Assistant Examiner* — Michael B Pierorazio
(74) *Attorney, Agent, or Firm* — Swanson & Bratschun, L.L.C.

(57) ABSTRACT

Novel tools and techniques are provided for displaying video. In some embodiments, novel tools and techniques might be provided for sensing the presence and/or position of a user in a room, and/or for customizing displayed content (including video call content, media content, and/or the like) based on the sensed presence and/or position of the user. In particular, in some aspects, a user device (which might include, without limitation, a video calling device, an image capture device, a gaming console, etc.) might determine a position of a user relative to a display device in communication with the user device. The user device and/or a control server (in communication with the user device over a network) might adjust an apparent view of video or image(s) displayed on the display device, based at least in part on the determined position of the user relative to the display device.

37 Claims, 14 Drawing Sheets

Related U.S. Application Data

14/341,009, filed on Jul. 25, 2014, which is a continuation-in-part of application No. 14/472,133, filed on Aug. 28, 2014, which is a continuation-in-part of application No. 14/106,279, filed on Dec. 13, 2013, which is a continuation-in-part of application No. 14/106,360, filed on Dec. 13, 2013, now Pat. No. 8,914,837, and a continuation-in-part of application No. 14/464,435, filed on Aug. 20, 2014.

(60) Provisional application No. 61/874,903, filed on Sep. 6, 2013, provisional application No. 61/737,506, filed on Dec. 14, 2012, provisional application No. 61/759,621, filed on Feb. 1, 2013, provisional application No. 61/858,518, filed on Jul. 25, 2013, provisional application No. 61/872,603, filed on Aug. 30, 2013, provisional application No. 61/877,928, filed on Sep. 13, 2013.

(51) Int. Cl.

| | |
|---|---|
| *G06K 9/00* | (2006.01) |
| *H04N 21/422* | (2011.01) |
| *H04N 21/4223* | (2011.01) |
| *H04N 21/44* | (2011.01) |
| *H04N 21/442* | (2011.01) |
| *G06F 3/01* | (2006.01) |
| *H04N 5/232* | (2006.01) |

(52) U.S. Cl.
CPC ......... *H04N 5/23206* (2013.01); *H04N 7/14* (2013.01); *H04N 21/4223* (2013.01); *H04N 21/42203* (2013.01); *H04N 21/44008* (2013.01); *H04N 21/44218* (2013.01); *H04N 5/23296* (2013.01)

(56) References Cited

U.S. PATENT DOCUMENTS

| | | | |
|---|---|---|---|
| 5,827,092 A | 10/1998 | Minich | |
| 5,966,167 A * | 10/1999 | Nose | G02B 27/0093 348/169 |
| 5,975,958 A | 11/1999 | Weidler | |
| 6,058,307 A | 5/2000 | Garner | |
| 6,307,526 B1 * | 10/2001 | Mann | G02B 27/017 345/7 |
| 6,614,465 B2 | 9/2003 | Alexander et al. | |
| 6,638,113 B2 | 10/2003 | Kajiwara et al. | |
| 6,717,607 B1 * | 4/2004 | Lauper | H04N 7/142 348/14.08 |
| 6,804,224 B1 | 10/2004 | Schuster et al. | |
| 7,039,393 B1 | 5/2006 | Kite | |
| 7,084,904 B2 * | 8/2006 | Liu et al. | 348/218.1 |
| 7,460,150 B1 * | 12/2008 | Coughlan | H04N 7/147 348/14.01 |
| 7,587,289 B1 | 9/2009 | Sivertsen | |
| 7,646,404 B2 * | 1/2010 | Liu et al. | 348/218.1 |
| 7,768,388 B2 | 8/2010 | Putterman et al. | |
| 8,063,929 B2 | 11/2011 | Kurtz et al. | |
| 8,122,491 B2 | 2/2012 | Yee et al. | |
| 8,144,182 B2 * | 3/2012 | Shoemake et al. | 348/14.04 |
| 8,239,903 B1 * | 8/2012 | Campagna et al. | 725/107 |
| 8,266,536 B2 * | 9/2012 | Roberts | G06F 3/011 715/706 |
| 8,300,082 B2 * | 10/2012 | Malik | 348/14.08 |
| 8,325,213 B2 | 12/2012 | Lamb et al. | |
| 8,330,795 B2 | 12/2012 | Iyer et al. | |
| 8,366,487 B2 | 2/2013 | Weng et al. | |
| 8,395,652 B1 * | 3/2013 | Chapweske et al. | 348/14.05 |
| 8,395,656 B1 * | 3/2013 | Malzbender | H04N 5/4403 348/14.08 |
| 8,416,715 B2 * | 4/2013 | Rosenfeld | H04N 7/147 348/14.03 |
| 8,421,782 B2 * | 4/2013 | Sakata | G06F 3/011 345/158 |
| 8,566,838 B2 | 10/2013 | Sabin et al. | |
| 8,638,223 B2 * | 1/2014 | Lahcanski | G06F 3/011 340/539.11 |
| 8,736,660 B2 * | 5/2014 | Rosenberg | H04N 7/15 348/14.02 |
| 8,879,801 B2 * | 11/2014 | Ragland | G06F 3/011 351/209 |
| 8,914,837 B2 | 12/2014 | Ahmed et al. | |
| 8,933,886 B2 * | 1/2015 | Imoto | G06F 3/013 345/158 |
| 9,253,520 B2 | 2/2016 | Shoemake et al. | |
| 9,300,910 B2 | 3/2016 | Shoemake et al. | |
| 9,310,977 B2 | 4/2016 | Ahmed et al. | |
| 9,323,325 B2 * | 4/2016 | Perez | H04N 13/0278 |
| 9,329,682 B2 * | 5/2016 | Keane | G06F 3/013 |
| 2001/0001159 A1 | 5/2001 | Ford | |
| 2001/0032246 A1 | 10/2001 | Fardella et al. | |
| 2002/0059094 A1 | 5/2002 | Hosea et al. | |
| 2002/0073420 A1 | 6/2002 | Yoon | |
| 2002/0085843 A1 * | 7/2002 | Mann | E03C 1/057 396/374 |
| 2002/0118675 A1 | 8/2002 | Strathmeyer et al. | |
| 2003/0160871 A1 * | 8/2003 | Pelletier et al. | 348/207.99 |
| 2003/0200105 A1 | 10/2003 | Borden, IV et al. | |
| 2004/0027624 A1 | 2/2004 | Parulski et al. | |
| 2004/0061787 A1 * | 4/2004 | Liu et al. | 348/218.1 |
| 2004/0114919 A1 | 6/2004 | Rife | |
| 2004/0145658 A1 | 7/2004 | Lev-Ran et al. | |
| 2005/0007445 A1 | 1/2005 | Foote et al. | |
| 2005/0066357 A1 | 3/2005 | Ryal | |
| 2005/0086069 A1 | 4/2005 | Watson et al. | |
| 2005/0096084 A1 | 5/2005 | Pohja et al. | |
| 2005/0108092 A1 * | 5/2005 | Campbell | A61B 3/113 705/14.64 |
| 2005/0195954 A1 | 9/2005 | Klein et al. | |
| 2005/0246738 A1 | 11/2005 | Lockett et al. | |
| 2005/0262542 A1 | 11/2005 | DeWeese et al. | |
| 2005/0283813 A1 | 12/2005 | Jamail et al. | |
| 2006/0031291 A1 | 2/2006 | Beckemeyer | |
| 2006/0107281 A1 | 5/2006 | Dunton | |
| 2006/0110136 A1 | 5/2006 | Abecassis | |
| 2006/0130118 A1 | 6/2006 | Damm | |
| 2006/0130119 A1 | 6/2006 | Candelore et al. | |
| 2006/0187306 A1 * | 8/2006 | Matsui | 348/207.11 |
| 2006/0209194 A1 * | 9/2006 | Liu et al. | 348/218.1 |
| 2006/0256133 A1 * | 11/2006 | Rosenberg | G06Q 30/02 345/619 |
| 2006/0268149 A1 | 11/2006 | Teng | |
| 2007/0050253 A1 * | 3/2007 | Biggs | G06Q 30/0271 705/14.67 |
| 2007/0067407 A1 | 3/2007 | Bettis et al. | |
| 2007/0161386 A1 | 7/2007 | Faber et al. | |
| 2007/0188597 A1 | 8/2007 | Kenoyer | |
| 2007/0203708 A1 | 8/2007 | Polcyn et al. | |
| 2007/0204288 A1 | 8/2007 | Candelore | |
| 2007/0239825 A1 * | 10/2007 | Walter | 709/204 |
| 2007/0271580 A1 | 11/2007 | Tischer et al. | |
| 2008/0028318 A1 | 1/2008 | Shikuma | |
| 2008/0040380 A1 | 2/2008 | Miyaki | |
| 2008/0062253 A1 | 3/2008 | Jaspersohn et al. | |
| 2008/0152096 A1 | 6/2008 | Archer | |
| 2008/0189617 A1 | 8/2008 | Covell et al. | |
| 2008/0201369 A1 | 8/2008 | Cordoba | |
| 2008/0222673 A1 | 9/2008 | Durden et al. | |
| 2008/0270589 A1 | 10/2008 | Hwang | |
| 2008/0292139 A1 | 11/2008 | Wadhwa et al. | |
| 2008/0307105 A1 | 12/2008 | Sethi et al. | |
| 2009/0037945 A1 | 2/2009 | Greig et al. | |
| 2009/0079264 A1 | 3/2009 | Minami | |
| 2009/0232129 A1 | 9/2009 | Wong et al. | |
| 2009/0281897 A1 | 11/2009 | Antos | |
| 2010/0053555 A1 * | 3/2010 | Enriquez | A61B 3/113 351/210 |
| 2010/0060477 A1 | 3/2010 | Laasik et al. | |
| 2010/0064334 A1 | 3/2010 | Blackburn et al. | |
| 2010/0066804 A1 * | 3/2010 | Shoemake et al. | 348/14.02 |

(56) References Cited

U.S. PATENT DOCUMENTS

| | | | |
|---|---|---|---|
| 2010/0080418 A1* | 4/2010 | Ito | G06K 9/00228 382/103 |
| 2010/0131363 A1 | 5/2010 | Sievert et al. | |
| 2010/0131368 A1 | 5/2010 | Sievert et al. | |
| 2010/0157013 A1* | 6/2010 | Sylvain | 348/14.01 |
| 2010/0169410 A1 | 7/2010 | Lund et al. | |
| 2010/0218170 A1 | 8/2010 | MacLellan et al. | |
| 2010/0220188 A1 | 9/2010 | Renkis | |
| 2010/0232758 A1 | 9/2010 | Cook et al. | |
| 2010/0266111 A1 | 10/2010 | Crausaz et al. | |
| 2010/0306379 A1 | 12/2010 | Ferris | |
| 2010/0315482 A1* | 12/2010 | Rosenfeld | H04N 7/147 348/14.08 |
| 2011/0029370 A1 | 2/2011 | Roeding et al. | |
| 2011/0034242 A1 | 2/2011 | Aronzon et al. | |
| 2011/0035271 A1 | 2/2011 | Weaver et al. | |
| 2011/0069179 A1 | 3/2011 | Bathiche et al. | |
| 2011/0075011 A1 | 3/2011 | Abebe | |
| 2011/0153362 A1* | 6/2011 | Valin | G06Q 20/105 705/3 |
| 2011/0161163 A1* | 6/2011 | Carlson | G06Q 30/02 705/14.44 |
| 2011/0164044 A1* | 7/2011 | Huang | A63B 21/0004 345/473 |
| 2011/0193971 A1 | 8/2011 | Lin | |
| 2011/0205329 A1* | 8/2011 | Willis | 348/14.08 |
| 2011/0211678 A1 | 9/2011 | Woodworth et al. | |
| 2011/0213664 A1* | 9/2011 | Osterhout | G02B 27/017 705/14.58 |
| 2011/0254914 A1* | 10/2011 | Ng | 348/14.16 |
| 2011/0317587 A1 | 12/2011 | Lida et al. | |
| 2012/0002849 A1 | 1/2012 | Tokuse | |
| 2012/0019609 A1 | 1/2012 | Chang et al. | |
| 2012/0054809 A1 | 3/2012 | Chowdhury et al. | |
| 2012/0072936 A1 | 3/2012 | Small et al. | |
| 2012/0075168 A1* | 3/2012 | Osterhout | G02B 27/017 345/8 |
| 2012/0081501 A1* | 4/2012 | Benzaia et al. | 348/14.04 |
| 2012/0081502 A1* | 4/2012 | Naidu et al. | 348/14.04 |
| 2012/0086785 A1* | 4/2012 | Valin | G06Q 20/105 348/47 |
| 2012/0102533 A1* | 4/2012 | Park | 725/106 |
| 2012/0123786 A1* | 5/2012 | Valin | G06Q 20/105 704/273 |
| 2012/0133515 A1 | 5/2012 | Palshof | |
| 2012/0166517 A1 | 6/2012 | Lee et al. | |
| 2012/0189282 A1 | 7/2012 | Wyatt et al. | |
| 2012/0194553 A1* | 8/2012 | Osterhout | G02B 27/0093 345/633 |
| 2012/0203823 A1 | 8/2012 | Manglik et al. | |
| 2012/0206553 A1 | 8/2012 | MacDonald | |
| 2012/0207088 A1 | 8/2012 | Liu et al. | |
| 2012/0226752 A1 | 9/2012 | Jeong et al. | |
| 2012/0229591 A1* | 9/2012 | Lee | 348/14.08 |
| 2012/0236107 A1* | 9/2012 | Rosenberg | H04N 7/15 348/14.08 |
| 2012/0236127 A1 | 9/2012 | Ojala et al. | |
| 2012/0266252 A1 | 10/2012 | Spiers et al. | |
| 2012/0268888 A1 | 10/2012 | Tian et al. | |
| 2012/0315793 A1 | 12/2012 | Hermann et al. | |
| 2012/0331113 A1 | 12/2012 | Jain et al. | |
| 2013/0007157 A1* | 1/2013 | Eftis et al. | 709/206 |
| 2013/0046280 A1 | 2/2013 | Martin et al. | |
| 2013/0083150 A1 | 4/2013 | Howarter et al. | |
| 2013/0141518 A1* | 6/2013 | Chou | H04N 7/148 348/14.08 |
| 2013/0174194 A1 | 7/2013 | Mooneyham | |
| 2013/0231183 A1 | 9/2013 | Zalewski | |
| 2013/0265382 A1* | 10/2013 | Guleryuz | G06T 11/60 348/14.08 |
| 2013/0265384 A1 | 10/2013 | Shoemake et al. | |
| 2013/0344961 A1 | 12/2013 | Iannetta | |
| 2014/0049593 A1* | 2/2014 | Pai | H04N 7/147 348/14.01 |
| 2014/0123162 A1 | 5/2014 | Karlsson et al. | |
| 2014/0133658 A1* | 5/2014 | Mentz | H04S 7/304 381/1 |
| 2014/0168056 A1* | 6/2014 | Swaminathan | G06K 9/00604 345/156 |
| 2014/0168071 A1 | 6/2014 | Ahmed et al. | |
| 2014/0168344 A1 | 6/2014 | Shoemake et al. | |
| 2014/0168453 A1 | 6/2014 | Shoemake et al. | |
| 2014/0173675 A1 | 6/2014 | Ahmed et al. | |
| 2014/0247321 A1* | 9/2014 | Rosenberg | H04N 7/15 348/14.08 |
| 2014/0333713 A1 | 11/2014 | Shoemake et al. | |
| 2014/0359647 A1 | 12/2014 | Shoemake et al. | |
| 2014/0362170 A1* | 12/2014 | Walker | H04N 19/105 348/14.08 |
| 2014/0375752 A1 | 12/2014 | Shoemake et al. | |
| 2015/0026708 A1 | 1/2015 | Ahmed et al. | |
| 2015/0070516 A1 | 3/2015 | Shoemake et al. | |
| 2015/0085056 A1* | 3/2015 | Van Broeck | G06F 3/013 348/14.1 |
| 2015/0138303 A1* | 5/2015 | White | H04N 7/144 348/14.07 |
| 2015/0243163 A1 | 8/2015 | Shoemake | |
| 2015/0244807 A1 | 8/2015 | Shoemake et al. | |
| 2015/0324076 A1 | 11/2015 | Ahmed et al. | |
| 2015/0334344 A1 | 11/2015 | Shoemake et al. | |

FOREIGN PATENT DOCUMENTS

| | | |
|---|---|---|
| KR | 2010/0062559 A | 6/2010 |
| KR | 2012/0139251 A | 12/2012 |
| WO | WO 2010-118202 A1 | 10/2010 |
| WO | WO 2010/147281 A1 | 12/2010 |
| WO | WO 2012/076724 A1 | 6/2012 |
| WO | WO 2014/093931 A1 | 6/2014 |
| WO | WO 2014/093932 A1 | 6/2014 |
| WO | WO 2014/093933 A1 | 6/2014 |
| WO | WO 2014/121148 A1 | 8/2014 |
| WO | WO 2015/013592 A1 | 1/2015 |
| WO | WO 2015/031671 A1 | 3/2015 |
| WO | WO 2015/035247 A1 | 3/2015 |

OTHER PUBLICATIONS

AWS, Amazon Elastic Compute Cloud (EC2), Amazon Web Services LLC, 6 pages, Available at: http://aws.amazon.com/ec2/; Accessed on Mar. 3, 2014.

AWS, Amazon Simple Storage Service, Amazon Web Services, Inc., 6 pages, Available at: http://aws.amazon.com/s3/; Accessed on Mar. 3, 2014.

Amazon "Amazon Simple Storage Service Getting Started Guide" Mar. 1, 2006, 20 pages, Amazon Web Services LLC.

Anderson "SETI@home: An Experiment in Public-Resource Computing" (Nov. 2002) 8 pages, Space Sciences Laboratory, U.C. Berkeley.

Apple, "iOS 8 FaceTime" video calling service; Available at: http://www.apple.com/ios/facetime/; Accessed on Oct. 2, 2014; 3 pages.

Apple "iPhoto for Mac" 6 pages, Available at: https://www.apple.com/mac/iphoto/; Accessed on Feb. 28, 2014.

Apple "OS X Mavericks, Mac App Store" 5 pages, Available at: http://www.apple.com/osx/apps/app-store.html; Accessed on Feb. 28, 2014.

Biscotti camera products; Available at: http://biscotti.com/biscotti; Accessed on Oct. 2, 2014; 1 page.

Blue Host, "The Best Web Hosting", Available at: http://www.bluehost.com/; Accessed on Oct. 2, 2014; 3 pages.

BlueJeans Network; Multi-Party Conferencing in the Cloud; Available at: http://www.bluejeans.com; Accessed on Oct. 2, 2014; 3 pages.

Cerf et al. (1974) "Specification of Internet Transmission Control Program" Network Working Group; 70 pages.

Cisco Collaboration Endpoints; Video calling cameras and systems; Available at: http://www.cisco.com/c/en/us/products/collaboration-endpoints/product-listing.html. Accessed on Oct. 2, 2014; 2 pages.

(56) References Cited

OTHER PUBLICATIONS

Data Center Virtualization and Cloud Infrastructure Products; Available at: http://www.vmware.com/products/datacenter-virtualization/; Accessed on Feb. 25, 2014; 5 pages.
DECT "Part 6: Identities and addressing" (Feb. 1998) European Standard (Telecommunications series); 41 pages.
Dropbox Review and Rating, Available at: http://www.pcmag.com/article2/0,2817,2343852,00.asp, Accessed on Feb. 25, 2014, 12 pages.
Fielding et al. (1999) "Hypertext Transfer Protocol—HTTP/1.1" Network Working Group; 114 pages.
Google website; Available at: https://www.google.com/; Accessed on Oct. 2, 2014; 1 page.
Google "Google Apps for Business" 2 pages, Available at: http://www.google.com/enterprise/apps/business/, Accessed on Feb. 28, 2014.
Google "Google Play" 3 pages, Available at: https://play.google.com/store?hl=en, Accessed on Feb. 28, 2014.
HD Wi-Fi video monitoring cameras for iPhone, Android or computer; Dropcam, Inc., Available at: http://web.archive.org/web/20121213184724/https://www.dropcam.com/; Accessed on Feb. 28, 2014, 3 pages.
Information Sciences Institute (1981) "Internet Protocol"; Available at: http://www.ietf.org/rfc/rfc791.txt; Accessed on Oct. 2, 2014 48 pages.
International Telecommunication Union; E.164: The international public telecommunication numbering plan; Available at: http://www.itu.int/rec/T-REC-E.164/en; Accessed on Oct. 2, 2014; 1 page.
International Telecommunication Union; G.711: Pulse code modulation (PCM) of voice frequencies; Available at: http://www.itu.int/rec/T-REC-G.711; Accessed on Oct. 2, 2014; 1 page.
International Telecommunication Union; G.722: 7kHz audio-coding within 64 kbit/s; Available at: http://www.itu.int/rec/T-REC-G.722; Accessed on Oct. 2, 2014; 1 page.
IP Version 6 Working Group (ipv6); Available at: http://datatracker.ietf.org/wg/ipv6/charter/; Accessed on Oct. 2, 2014; 3 pages.
ITU-T (2007) "H.264 Series H: Audiovisual and Multimedia Systems"; 564 pages.
Johnny Chung Lee Projects—Wii www.johnnylee.net/projects/wii/ Accessed on Sep. 5, 2013, 3 pages.
Lifesize; Video Conference Systems and Accessories; Available at: http://www.lifesize.com/en/products/video-conferencing-systems-and-accessories; Accessed on Oct. 2, 2014; 11 pages.
Linux Foundation, "Why the Xen Project?", Available at: http://www.xenproject.org/users/why-the-xen-project.html, Accessed on Feb. 25, 2014, 5 pages.
Logitech Business Webcams; Available at: http://www.logitech.com/en-us/for-business/products/webcams; Accessed on Oct. 2, 2014; 4 pages.
Ludwig, XEP-0166: Jingle; Available at: http://xmpp.org/extensions/xep-0166.html; Accessed on Oct. 2, 2014; 49 pages.
Mahy et al. (2010) Traversal Using Relays around NAT (Turn): Relay Extensions to Session Traversal Utilities for NAT (STUN); Available at: http://tools.ietf.org/html/rfc5766; Accessed on Oct. 2, 2014; 134 pages.
Microsoft, Xbox Games and Entertainment on All Your Devices; Available at: http://www.xbox.com/en-US/#fbid=_oRvaiAGfk1; Accessed on Oct. 2, 2014; 2 pages.
Netflix "Watch TV Shows Online, Watch Movies Online"; Available at: https://www.netflix.com/?locale=en-US; Accessed on Feb. 28, 2014; 1 page.
Nielson People Meters; Available at: http://www.nielsen.com/content/corporate/us/en/solutions/measurement/television.html; Accessed on Oct. 2, 2014; 4 pages.
Notification Concerning Availability of Publication of the International Application; PCT Patent Application No. PCT/US2013/075184; mailed Jun. 19, 2014; 1 page.
Notification Concerning Availability of Publication of the International Application; PCT Patent Application No. PCT/US2013/075185; mailed Jun. 19, 2014; 1 page.
Notification Concerning Availability of Publication of the International Application; PCT Patent Application No. PCT/US2013/075186; mailed Jun. 19, 2014; 1 page.
Notification Concerning Availability of Publication of the International Application; PCT Patent Application No. PCT/US2014/014321; mailed Aug. 7, 2014; 1 page.
Notification of Transmittal of the International Search Report and the Written Opinion of the International Searching Authority, or the Declaration for PCT International Application No. PCT/US13/075184; mailed May 13, 2014; 15 pages.
Notification of Transmittal of the International Search Report and the Written Opinion of the International Searching Authority, or the Declaration for PCT International Application No. PCT/US13/075185; mailed Apr. 7, 2014; 12 pages.
Notification of Transmittal of the International Search Report and the Written Opinion of the International Searching Authority, or the Declaration for PCT International Application No. PCT/US13/75186; mailed May 1, 2014; 11 pages.
Notification of Transmittal of the International Search Report and the Written Opinion of the International Searching Authority, or the Declaration for PCT International Application No. PCT/US14/14321; mailed May 9, 2014; 18 pages.
Oracle VM VirtualBox, 2 pages, Available at: https://www.virtualbox.org/, Accessed on Feb. 25, 2014.
Panasonic (2011) Operating Instructions: KX-TG9471 and KX-TG9472; 64 pages.
Pantos et al. (2013) "HTTP Live Streaming"; Available at: http://tools.ietf.org/html/draft-pantos-http-live-streaming-11; Accessed on Oct. 2, 2014; 74 pages.
Polycom Data Sheet; Polycom® VoiceStation® 300 "Crystal-clear conferencing for smaller rooms and desktops"; 2013 Polycom, Inc.; 2 pages.
Polycom; Polycom HDX Series Product Brochure; Available at: http://www.polycom.com/content/dam/polycom/common/documents/brochures/hdx-family-br-enus.pdf; Accessed on Oct. 2, 2014; 4 pages.
Postel (1982) "Simple Mail Transfer Protocol" Info Sciences Institute, USC; 71 pages.
Qemu, Open Source Processor Emulator, 2 pages, Available at: http://wiki.qemu.org/Main_Page, Accessed on Mar. 4, 2014.
Roku, User Guide (2008-2009), 51 pages, Roku, Inc.
Rosenberg (2010) "Interactive Connectivity Establishment (ICE): A Protocol for Network Address Translator (NAT) Traversal for Offer/Answer Protocols"; Available at: http://tools.ietf.org/html/rfc5245; Accessed on Oct. 12, 2014; 234 pages.
Rosenberg et al. "Session Traversal Utilities for NAT (STUN)"; Available at: http://tools.ietf.org/html/rfc5389; Accessed on Oct. 12, 2014; 102 pages.
Rosenberg, et al. (2002) "SIP: Session Initiation Protocol" http://www.ietf.org/rfc/rfc3261.txt; Accessed on Jun. 27, 2014; 265 pages.
Rosenberg "Simple Made Simple: An Overview of the IETF Specifications for Instant Messaging and Presence Using the Session Initiation Protocol (SIP)" (Apr. 2013) Available at: https://tools.ietf.org/html/rfc6914, Accessed on Feb. 28, 2014.
Saint-Andre, "Extensible Messaging and Presence Protocol (XMPP): Core, Jabber Software Foundation" (Oct. 2004) 73 pages, Available at: http://xmpp.org/rfcs/rfc3920.html, Accessed on Feb. 28, 2014.
Skype video calling service; Available at: www.skype.com/en/; Accessed on Oct. 2, 2014; 4 pages.
Softlayer Services®, 2 pages, Available at: http://www.softlayer.com/services/storagelayer, Accessed on Mar. 4, 2014.
SPEEX: A Free Codec for Free Speech; Available at: http://www.speex.org; Accessed on Oct. 12, 2014; 2 pages.
U.S. Appl. No. 12/561,165; Notice of Allowance dated Feb. 2, 2012; 12 pages.
U.S. Appl. No. 13/857,736; Notice of Publication dated Oct. 10, 2013; 1 page.
U.S. Appl. No. 13/857,736; Ex Parte Quayle Office Action dated Sep. 16, 2014; 8 pages.
U.S. Appl. No. 13/857,736; Notice of Allowance dated Oct. 10, 2014; 9 pages.

(56) References Cited

OTHER PUBLICATIONS

U.S. Appl. No. 14/106,263; NonFinal Office Action dated Mar. 6, 2014; 20 pages.
U.S. Appl. No. 14/106,263; Final Office Action dated Jun. 13, 2014; 21 pages.
U.S. Appl. No. 14/106,263; Notice of Publication dated Jun. 19, 2014; 1 page.
U.S. Appl. No. 14/106,279; NonFinal Office Action dated Feb. 28, 2014; 16 pages.
U.S. Appl. No. 14/106,279; Notice of Publication dated Jun. 19, 2014; 1 page.
U.S. Appl. No. 14/106,279; Final Office Action dated Jul. 22, 2014; 17 pages.
U.S. Appl. No. 14/106,360; NonFinal Office Action dated Mar. 20, 2014; 22 pages.
U.S. Appl. No. 14/106,360; Notice of Publication dated Jun. 19, 2014; 1 page.
U.S. Appl. No. 14/170,499; Notice of Publication dated Jun. 19, 2014; 1 page.
U.S. Appl. No. 14/170,499, NonFinal Office Action dated Jul. 18, 2014; 19 pages.
U.S. Appl. No. 14/341,009; filed Jul. 25, 2014; 89 pages.
U.S. Appl. No. 14/464,435; filed Aug. 20, 2014; 111 pages.
U.S. Appl. No. 14/472,133; filed Aug. 28, 2014; 123 pages.
Varia et al., Overview of Amazon Web Services (Jan. 2014), 22 pages, Amazon Web Services.
Variable Frame Rate MP4; https://kb.speeddemosarchive.com/Variable_Frame_Rate_MP4; Accessed on Jun. 27, 2014; 3 pages.
Vidyo, "The Vidyo Experience"; Available at: http://www.vidyo.com/products/use/; Accessed on Oct. 2, 2014; 5 pages.
WebRTC; Available at: http://www.webrtc.org; Accessed on Oct. 2, 2014; 4 pages.
WebSocket.org, Are you plugged in?; "What is WebSocket?"; Available at: http://www.websocket.org; Accessed on Oct. 2, 2014; Kaazing Corporation; 1 page.
Wikipedia, the free encyclopedia, Apache HTTP Server, 5 pages, Available at: http://en.wikipedia.org/wiki/Apache_HTTP_Server, Accessed on Feb. 26, 2014.
Wikipedia, the free encyclopedia; "Audio to Video Synchronization" Available at: http://en.wikipedia.org/wiki/Audio_to_video_synchronization; Accessed on Jun. 27, 2014; 6 pages.
Wikipedia, the free encyclopedia; "Cloud computing" Available at: en.wikipedia.org/wiki/Cloud_computing; Retrieved Mar. 3, 2014; 34 pages.
Wikipedia, the free encyclopedia; "Cloud storage" Available at: en.wikipedia.org/wiki/Cloud-storage; Retrieved Mar. 3, 2014; 5 pages.
Wikipedia, the free encyclopedia; "cPanel" Available at: http://en.wikipedia.org/wiki/Cpanel; Accessed on Feb. 26, 2014; 4 pages.
Wikipedia, the free encyclopedia; "Distributed computing" Available at: http://en.wikipedia.org/wiki/Distributed_computing; Accessed on Feb. 26, 2014; 12 pages.
Wikipedia, the free encyclopedia; "Email" Available at: en.wikipedia.org/wiki/Email; Retrieved Mar. 3, 2014; 25 pages.
Wikipedia, the free encyclopedia; "Face Detection" Available at: http://en.wikipedia.org/wiki/Face_detection; Accessed on Feb. 28, 2014; 2 pages.
Wikipedia, the free encyclopedia; "Face Recognition System" Available at: http://en.wikipedia.org/wiki/Facial_recognition_system; Accessed on Feb. 28, 2014; 10 pages.
Wikipedia, the free encyclopedia; "Grid computing" Available at: http://en.wikipedia.org/wiki/Grid_computing; Accessed on Feb. 26, 2014; 12 pages.
Wikipedia, the free encyclopedia; "Hypertext Transfer Protocol" Available at: en.wikipedia.org/wiki/Http; Retrieved Mar. 3, 2014; 10 pages.
Wikipedia, the free encyclopedia; "MPEG-4 Part 14" container format; Available at: http.//en.wikipedia.org/wiki/Mpeg-4; Accessed on Jun. 27, 2014; 4 pages.

Wikipedia, the free encyclopedia, "PlayStation 4" Available at: http://en.wikipedia.org/wiki/PlayStation_4, Accessed on Feb. 25, 2014, 21 pages.
Wikipedia, the free encyclopedia; "Session Initiation Protocol" Available at: http://en.wikipedia.org/wiki/Session_Initiation_Protocol; Accessed Jun. 27, 2014; 6 pages.
Wikipedia, the free encyclopedia "SIMPLE" en.wikipedia.org/wiki/SIMPLE, retrieved Mar. 3, 2014, 3 pages.
Wikipedia, the free encyclopedia; "Speech Recognition" Available at: http://en.wikipedia.org/wiki/Speech_recognition; Accessed on Feb. 28, 2014; 14 pages.
Wikipedia, the free encyclopedia; "Time-lapse photography" Available at en.wikipedia.org/wiki/ Time-lapse_photography; Retrieved Mar. 3, 2014; 11 pages.
Wikipedia, the free encyclopedia; "Transmission Control Protocol" Available at: en.wikipedia.org/wiki/Transmission_Control_Protocol; Retrieved Mar. 3, 2014; 19 pages.
Wikipedia, the free encyclopedia; "VP8" Available at: http://en.wikipedia.org/wiki/VP8; Retrieved Oct. 12, 2014; 8 pages.
Wikipedia, the free encyclopedia; "Wii" Available at: http://en.wikipedia.org/wiki/Wii; Accessed on Feb. 25, 2014; 30 pages.
Wikipedia, the free encyclopedia; "Wolfram Alpha" Available at: http://en.wikipedia.org/wiki/Wolfram_Alpha; Accessed on Feb. 25, 2014; 6 pages.
Wikipedia, the free encyclopedia; "Xbox One" Available at: http://en.wikipedia.org/wiki/Xbox_one; Accessed on Feb. 25, 2014; 16 pages.
Wikipedia, the free encyclopedia; "XMPP" Available at: en.wikipedia.org/wiki/XMPP; Retrieved Mar. 3, 2014; 10 pages.
XMPP Standards Foundation; Available at: http://xmpp.org/xmpp-protocols/; Accessed on Oct. 2, 2014; 1 page.
Young (1998) "FundamentalsImageProcessing," 113 pages.
Zoom Video Communications, Inc.; Zoom Cloud Video Conferencing; Available at: http://www.zoom.us; Accessed on Oct. 2, 2014; 2 pages.
U.S. Appl. No. 14/106,360; Notice of Allowance dated Oct. 29, 2014; 22 pages.
Notification of Transmittal of the International Search Report and the Written Opinion of the International Searching Authority, or the Declaration for PCT International Application No. PCT/US14/48158; mailed Nov. 10, 2014; 12 pages.
U.S. Appl. No. 14/341,009; Notice of Publication dated Nov. 13, 2014; 1 page.
U.S. Appl. No. 14/106,360; Issue Notification dated Nov. 25, 2014; 1 page.
U.S. Appl. No. 14/464,435; Notice of Publication dated Dec. 4, 2014; 1 page.
Notification of Transmittal of the International Search Report and the Written Opinion of the International Searching Authority, or the Declaration for PCT International Application No. PCT/US14/53254; mailed Dec. 15, 2014; 11 pages.
Notification of Transmittal of the International Search Report and the Written Opinion of the International Searching Authority, or the Declaration for PCT International Application No. PCT/US14/54409; mailed Dec. 16, 2014; 16 pages.
U.S. Appl. No. 14/472,133; Notice of Publication dated Jan. 22, 2015; 1 page.
U.S. Appl. No. 13/857,736; Issue Notification dated Jan. 27, 2015; 1 page.
Notification Concerning Availability of Publication of the International Application; PCT Patent Application No. PCT/US14/48158; mailed Jan. 29, 2015; 1 page.
U.S. Appl. No. 14/106,263; NonFinal Office Action dated Mar. 24, 2015; 48 pages.
U.S. Appl. No. 14/170,499; NonFinal Office Action dated Feb. 9, 2015; 39 pages.
U.S. Appl. No. 14/341,009; NonFinal Office Action dated Apr. 22, 2015; 39 pages.
U.S. Appl. No. 14/464,435; NonFinal Office Action dated Feb. 12, 2015; 33 pages.
U.S. Appl. No. 14/472,133; NonFinal Office Action dated Feb. 11, 2015; 34 pages.

(56) References Cited

OTHER PUBLICATIONS

U.S. Appl. No. 14/106,279; NonFinal Office Action dated Mar. 20, 2015; 30 pages.
Google "How Set Up Google Chromecast?" Available at googlechromecast.com/how-set-up-google-chromecast/, retrieved on Apr. 29, 2014, 25 pages.
Google "What is Google Chromecast?" Available at googlechromecast.com/what-is-google-chromecast/ retrieved on Apr. 29, 2014, 6 pages.
Wikipedia, the free encyclopedia; "Bluetooth" Available at: en.wikipedia.org/wiki/Bluetooth; retrieved on Apr. 29, 2014; 25 pages.
Wikipedia, the free encyclopedia; "Wi-Fi Direct" Available at: en.wikipedia.org/wiki/Wi-Fi_Direct; Retrieved on Apr. 29, 2014; 5 pages.
Notification Concerning Transmittal of Copy of International Preliminary Report on Patentability by The International Bureau of WIPO for PCT International Application No. PCT/US13/75184; mailed Jun. 25, 2015; 11 pages.
Notification Concerning Transmittal of Copy of International Preliminary Report on Patentability by the International Bureau of WIPO for PCT International Application No. PCT/US13/75185; mailed Jun. 25, 2015; 9 pages.
Notification Concerning Transmittal of Copy of International Preliminary Report on Patentability by the International Bureau of WIPO for PCT International Application No. PCT/US13/75186; mailed Jun. 25, 2015; 8 pages.
U.S. Appl. No. 14/170,499; NonFinal Office Action dated Jun. 3, 2015; 31 pages.
Polycom User Guide (2014); VoiceStation™ 300; Polycom, Inc.; http://www.polycom.com; 17 pages.
U.S. Appl. No. 14/106,263; Notice of Allowance dated Sep. 25, 2015; 24 pages.
U.S. Appl. No. 14/341,009; Final Office Action dated Oct. 8, 2015; 35 pages.
U.S. Appl. No. 14/464,435; Final Office Action dated Sep. 21, 2015; 26 pages.
U.S. Patent Application No. 14/472,133; Final Office Action dated Sep. 22, 2015; 26 pages.
U.S. Appl. No. 14/106,279; Final Office Action dated Aug. 3, 2015; 23 pages.
Apple "Apple TV 3rd Generation Setup Guide" (2012); 36 pages.
Domain Discover.US "Put Yourself On The Web"; TierraNet Inc. (1997-2014); Available at: https://www.tierra.net/domains; 3 pages.
Nest, Learning Thermostat™ User Guide (2012); 8 pages.
Nygren, "The Akamai Network: A Platform for High-Performance Internet Applications," Akamai Technologies, Cambridge, US; ACM SIGOPS Operating Systems Review; vol. 44, Issue 3, Jul. 2010; 18 pages.
U.S. Appl. No. 14/539,106; NonFinal Office Action dated Sep. 15, 2015; 45 pages.
Notification Concerning Transmittal of Copy of International Preliminary Report on Patentability by The International Bureau of WIPO for PCT International Application No. PCT/US14/14321; mailed Aug. 13, 2015; 11 pages.
U.S. Appl. No. 14/170,499; Notice of Allowance dated Nov. 5, 2015; 31 pages.
U.S. Appl. No. 14/341,009; NonFinal Office Action dated Mar. 11, 2016; 34 pages.
U.S. Appl. No. 14/106,279; Notice of Allowance dated Dec. 3, 2015; 16 pages.
U.S. Appl. No. 14/539,106; Final Office Action dated Apr. 8, 2016; 41 pages.
Notification Concerning Transmittal of Copy of International Preliminary Report on Patentability by the International Bureau of WIPO for PCT International Application No. PCT/US14/48158; dated Jan. 26, 2016; 9 pages.
Notification Concerning Transmittal of Copy of International Preliminary Report on Patentability by the International Bureau of WIPO for PCT International Application No. PCT/US14/53254; dated Mar. 10, 2016; 8 pages.
Notification Concerning Transmittal of Copy of International Preliminary Report on Patentability by The International Bureau of WIPO for PCT International Application No. PCT/US14/54409; dated Mar. 17, 2016; 13 pages.

\* cited by examiner

VIRTUAL WINDOW

CROSS-REFERENCES TO RELATED APPLICATIONS

This application claims the benefit, under 35 U.S.C. §119(e), of provisional U.S. Patent Application No. 61/874,903, filed Sep. 6, 2013 by Shoemake et al. and titled "Virtual Window" (referred to herein as the "'903 Application").

This application is also a continuation-in-part of U.S. patent application Ser. No. 14/106,263, filed on Dec. 13, 2013 by Shoemake et al. and titled "Video Capture, Processing and Distribution System" (referred to herein as the "'263 Application"), which claims the benefit of provisional U.S. Patent Application No. 61/737,506, filed Dec. 14, 2012 by Shoemake et al. and titled "Video Capture, Processing and Distribution System" (referred to herein as the "'506 Application"). This application is also a continuation in part of U.S. patent application Ser. No. 14/170,499, filed on Jan. 31, 2014 by Shoemake et al. and titled "Video Mail Capture, Processing and Distribution" (referred to herein as the "'499 Application"), which claims the benefit of provisional U.S. Patent Application No. 61/759,621, filed Feb. 1, 2013 by Shoemake et al. and titled "Video Mail Capture, Processing and Distribution" (referred to herein as the "'621 Application"). This application is also a continuation-in part of U.S. patent application Ser. No. 14/341,009, filed on Jul. 25, 2014 by Shoemake et al. and titled "Video Calling and Conferencing Addressing" (referred to herein as the "'009 Application"), which claims the benefit of provisional U.S. Patent Application No. 61/858,518, filed Jul. 25, 2013 by Shoemake et al. and titled "Video Calling and Conferencing Addressing" (referred to herein as the "'518 Application"). This application is also a continuation in part of U.S. patent application Ser. No. 14/472,133, filed on Aug. 28, 2014 by Ahmed et al. and titled "Physical Presence and Advertising" (referred to herein as the "'133 Application"), which claims the benefit of provisional U.S. Patent Application No. 61/872,603, filed Aug. 30, 2013 by Ahmed et al. and titled "Physical Presence and Advertising" (referred to herein as the "'603 Application"). This application is also a continuation in part of U.S. patent application Ser. No. 14/106,279, filed on Dec. 13, 2013 by Ahmed et al. and titled "Mobile Presence Detection" (referred to herein as the "'279 Application"), which claims the benefit of provisional U.S. Patent Application No. 61/877,928, filed Sep. 13, 2013 by Ahmed et al. and titled "Mobile Presence Detection" (referred to herein as the "'928 Application"). This application is also a continuation-in-part of U.S. patent application Ser. No. 14/106,360, filed on Dec. 13, 2013 by Ahmed et al. and titled "Distributed Infrastructure" (referred to herein as the "'360 Application"). This application is also a continuation-in-part of U.S. patent application Ser. No. 14/464,435, filed Aug. 20, 2014 by Shoemake et al. and titled "Monitoring, Trend Estimation, and User Recommendations" (referred to herein as the "'435 Application").

This application may also be related to provisional U.S. Patent Application No. 61/987,304, filed May 1, 2014 by Shoemake et al. and titled "Virtual Remote Functionality" (referred to herein as the "'304 Application").

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to tools and techniques for implementing video communications or presenting media content, and, more particularly, to tools and techniques for sensing the presence and/or position of a user in a room, and/or for customizing displayed content (including video call content, media content, and/or the like) based on the sensed presence and/or position of the user.

BACKGROUND

The proliferation of capable user devices, pervasive communication, and increased bandwidth has provided opportunity for many enhanced services for users. One example is video calling. Once the domain of high-end, dedicated systems from vendors such as POLYCOM®, video calling has become available to the average consumer at a reasonable cost. For example, the Biscotti™ device, available from Biscotti, Inc., provides an inexpensive tool to allow video calling using a high-definition television and an Internet connection. More generally, a class of devices, which have been described as "video calling devices" but are referred to herein as video communication devices ("VCDs") can be simultaneously connected to a display (such as a television, to name one example) and a source of content (such as a set-top box ("STB"), to name an example) in a pass-through configuration and can have a network connection and/or sensors such as a camera, a microphone, infrared sensors, and/or other suitable sensors. Such devices present a powerful platform for various applications. Examples include, without limitation, video calling, instant messaging, presence detection, status updates, media streaming over the Internet, web content viewing, gaming, and DVR capability. Another example of such value added services is the introduction of online gaming. Rather than playing a game by him- or herself, a user now can play most games in a multiplayer mode, using communication over the Internet or another network.

Enabling such services is a new class of user device, which generally features relatively high-end processing capability (which would have been unthinkable outside supercomputing labs just a few years ago), substantial random access memory, and relatively vast non-transient storage capabilities, including hard drives, solid state drives, and the like. Such user devices can include, without limitation, the VCDs mentioned above, the presence detection devices ("PDDs") described in the '279 Application, various video game consoles, and the like. Such devices generally have a reliable, and relatively high-speed, connection to the Internet (to enable the value added services) and significant amounts of downtime, in which the processing and other capabilities of the devices are unused.

In the context of video communications, while some existing devices provide inexpensive ways for a user to engage in video calls, the entire field of video calling (and viewing video generally) traditionally tends to be static, in the sense that the image viewed does not change with the position of the viewer. This is very much unlike a real-life experience. For example, when a person looks through a window, what that person sees through the window changes depending on the person's perspective relative to the window. If the person gets closer to the window, he or she has broader field of view of the scene on the other side of the window (i.e., can see more of the area on the other side of the window). Conversely, if the person moves further way, he or she has a narrower field of view. If a person moves to the right relative to the window, the field of view will shift toward the left, and so forth. In conventional video communications (including, without limitation, video calling as well as other video communications, such as television and video gaming), the fact that the image does not change with position of the viewer makes the interaction feel less lifelike and less real.

Hence, there is a need for solutions that allow for more flexible and robust display and apparent view functionalities based on presence and position information of a user, and some such solutions can employ the powerful user devices already resident in many users' homes.

BRIEF SUMMARY

A set of embodiments provides tools and techniques to enable more lifelike audio and video communications (including, without limitation, audio/video calls, video games, media content, etc.), in which the images seen on a display device and/or the audio played through one or more speakers changes based on the position of the viewer relative to the display device/speakers. In one aspect, certain embodiments can provide this functionality by being aware of the position or location of the viewer (or the viewer's eyes) via various means and adjusting the image (and/or audio) that is presented to the viewer in response to that position.

In some embodiments, novel tools and techniques might be provided for sensing the presence and/or position of a user in a room, and/or for customizing displayed content (including video call content, media content, and/or the like) based on the sensed presence and/or position of the user. In particular, in some aspects, a user device (which might include, without limitation, a video calling device, an image capture device, a gaming console, etc.) might determine a position of a user relative to a display device in communication with the user device. The user device and/or a control server (in communication with the user device over a network) might adjust an apparent view of video or image(s) displayed on the display device, based at least in part on the determined position of the user relative to the display device.

In some cases, adjusting an apparent view of the video or image(s) might comprise one or more of adjusting an apparent field of view of the video or image(s) and/or adjusting an apparent perspective of the video or image(s). In some instances, the video or image(s) displayed on the display device might comprise one of a video program, a television program, movie content, video media content, audio media content, game content, or image content, and/or the like.

The techniques described herein can also be employed in a variety of video calling environments, and with a variety of different hardware and software configurations. Merely by way of example, these techniques can be used with video calling devices and systems described in detail in U.S. patent application Ser. No. 12/561,165, filed Sep. 16, 2009 by Shoemake et al. and titled "Real Time Video Communications System" (issued as U.S. Pat. No. 8,144,182) and in the '304, '360, '279, '928, '903, '133, '603, '435, '009, '518, '499, '621, '263, and '506 Applications, each of which is incorporated by reference, as if set forth in full in this document, for all purposes.

The tools provided by various embodiments include, without limitation, methods, systems, and/or software products. Merely by way of example, a method might comprise one or more procedures, any or all of which are executed by an image capture device ("ICD"), a presence detection device ("PDD"), and/or a computer system. Correspondingly, an embodiment might provide an ICD, a PDD, and/or a computer system configured with instructions to perform one or more procedures in accordance with methods provided by various other embodiments. Similarly, a computer program might comprise a set of instructions that are executable by an ICD, a PDD, and/or a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise determining, with a user device comprising a camera, a position of a user relative to a display device in communication with the user device. The method might further comprise adjusting an apparent view of video on the display device in response to the determined position of the user relative to the display device.

According to some embodiments, adjusting an apparent view of video on the display device might comprise adjusting an apparent field of view of the video to correspond to the determined position of the user relative to the display device. In some cases, adjusting an apparent view of video on the display device might comprise adjusting an apparent perspective of the video to correspond to the determined position of the user relative to the display device.

In some embodiments, the user device might comprise a video calling device, and wherein the video on the display device might comprise a video call. In some instances, the user device might comprise a video game console, and wherein the video on the display device might comprise a video game. According to some embodiments, the video on the display device might comprise one of a video program, a television program, movie content, video media content, audio media content, game content, or image content. In some cases, the video on the display device might comprise a live video stream captured by a camera in a location remote from the user device. Merely by way of example, in some instances, the method might further comprise adjusting an audio track of the video in response to the determined position of the user relative to the display device.

In another aspect, a user device might comprise a sensor, a processor, and a computer readable medium having encoded thereon a set of instructions executable by the processor to cause the user device to perform one or more operations. The set of instructions might comprise instructions for determining a position of a user relative to a display device in communication with the user device and instructions for adjusting an apparent view of video on the display device in response to the determined position of the user relative to the display device. According to some embodiments, the user device might comprise the display device.

In yet another aspect, a method might comprise determining, with a video calling device, a position of a first party to a video call relative to a display device that displays video of a video call. The method might further comprise adjusting an apparent view of the video call, based at least in part on the determined position of the first party to the video call.

In some embodiments, the video calling device might comprise a video input interface to receive video input from a set-top box, an audio input interface to receive audio input from the set-top box, a video output interface to provide video output to the display device, an audio output interface to provide audio output to an audio receiver, a video capture device to capture video, an audio capture device to capture audio, a network interface, at least one processor, and a storage medium in communication with the at least one processor. The storage medium might have encoded thereon a set of instructions executable by the at least one processor to control operation of the video calling device. The set of instructions might comprise instructions for controlling the video capture device to capture a captured video stream, instructions for controlling the audio capture device to capture a captured audio stream, instructions for encoding the captured video stream and the captured audio stream to produce a series of data packets, and instructions for transmitting the series of data packets on the network interface for reception by a second video calling device.

In some cases, adjusting an apparent view of the video call might comprise adjusting an apparent field of view of the video call. In some instances, determining a position of a first party might comprise determining a distance of the first party from the display device. According to some embodiments, adjusting an apparent field of view of the video might comprise zooming the video based on the determined distance of the first party from the display device. In some embodiments, determining a position of a first party might comprises determining a horizontal position of the first party in a horizontal dimension of a plane parallel to a face of the display device. In some instances, adjusting an apparent field of view of the video might comprise panning the video in a horizontal direction, based on the determined horizontal position of the first party. According to some embodiments, determining a position of a first party might comprise determining a vertical position of the first party in a vertical dimension of a plane parallel to a face of the display device. In some cases, adjusting an apparent field of view of the video might comprise panning the video in a vertical direction, based on the determined vertical position of the first party.

According to some embodiments, adjusting an apparent view of the video call might comprise modifying, at the video calling device, a video signal received by the video calling device. In some cases, the video might be received from a second video calling device. Adjusting an apparent view of the video call might comprise instructing the second video calling device to adjust a view of one or more cameras of the second video calling device. In some instances, instructing the second video calling device to adjust a view of one or more cameras might comprise instructing the second video calling device to adjust a field of view of the one or more cameras. In some embodiments, the second video calling device might comprise an array of cameras. The field of view of the one or more cameras might comprise a field of view of a composite image captured by a plurality of cameras within the array of cameras. The apparent view of the video call might comprise a virtual perspective of the composite image. The virtual perspective might represent a perspective of the first party to the video call relative to the display device.

In some embodiments, instructing the second video calling device to adjust a view of one or more cameras might comprise instructing the second video calling device to adjust a perspective of the one or more cameras. In some cases, instructing the second video calling device to adjust a view of one or more cameras might comprise instructing the second video calling device to pan a camera in at least one of a horizontal dimension or a vertical dimension.

According to some embodiments, instructing the second video calling device to adjust a view of a camera might comprise instructing the second video calling device to zoom a camera. In some instances, instructing the second video calling device to adjust a view of a camera might comprise instructing the second video calling device to crop frames of a video stream captured by the camera.

In some cases, the method might further comprise determining, with the video calling device, that the first party has moved relative to the display device, and modifying the apparent view of the video call, in response to determined movement of the first party. In some embodiments, modifying the apparent view of the video call might comprise modifying an apparent perspective of the video call, in response to determined movement of the first party. In some instances, modifying the apparent view of the video call might comprise modifying the apparent view of the video call substantially in real time with the determined movement of the first party.

According to some embodiments, the video calling device might comprise a camera, and determining a position of a first party to a video call might comprise capturing one or more images of the first party with the camera. In some cases, the one or more images might comprise a video stream. The method, in some instances, might further comprise transmitting the video stream to a second video calling device as part of the video call. In some instances, determining a position of a first party to a video call might further comprise analyzing the one or more images to identify the position of the first party. In some embodiments, analyzing the one or more images might comprise identifying, in the one or more images, positions of one or more eyes of the first party to the video call.

In still another aspect, an apparatus might comprise a computer readable medium having encoded thereon a set of instructions executable by one or more computers to cause the apparatus to perform one or more operations. The set of instructions might comprise instructions for determining a position of a first party to a video call relative to a display device that displays video of a second party to the video call, and instructions for adjusting an apparent view of the video of the second party to the video call, based at least in part on the determined position of the first party to the video call.

In another aspect, a system might comprise a video calling device and a computer. The video calling device might comprise at least one first processor and a first computer readable medium in communication with the at least one first processor. The first computer readable medium might have encoded thereon a first set of instructions executable by the at least one first processor to cause the video calling device to perform one or more operations. The first set of instructions might comprise instructions for determining a position of a first party to a video call relative to a display device that displays video of a second party to the video call. The computer might comprise one or more second processors and a second computer readable medium in communication with the one or more second processors. The second computer readable medium might have encoded thereon a second set of instructions executable by the one or more second processors to cause the computer to perform one or more operations. The second set of instructions might comprise instructions for adjusting an apparent view of the video of the second party to the video call, based at least in part on the determined position of the first party to the video call.

According to some embodiments, the video calling device might comprise the computer. In some embodiments, the video calling device might comprise a first video calling device. The system might further comprise a second video calling device that comprises a camera that records the video of the second party to the video call. In some cases, the instructions for adjusting an apparent field of view of the video of the second party to the video call might comprise transmitting, to the second video calling device, instructions for adjusting a field of view of the camera of the second video calling device. In some instances, the computer might be a control server separate from the video calling device. The computer, according to some embodiments, might be incorporated within a second video calling device that further comprises a camera that captures the video of the second party to the video call.

In some cases, the video calling device might comprise a video input interface to receive video input from a set-top box, an audio input interface to receive audio input from the set-top box, a video output interface to provide video output to a display device, an audio output interface to provide audio output to an audio receiver, a video capture device to capture video, an audio capture device to capture audio, a network interface, one or more third processors, and a third storage medium in communication with the one or more third processors. The third storage medium might have encoded thereon a third set of instructions executable by the one or more third processors to control operation of the video calling device. The third set of instructions comprise instructions for controlling the video capture device to capture a captured video stream, instructions for controlling the audio capture device to capture a captured audio stream, instructions for encoding the captured video stream and the captured audio stream to produce a series of data packets, and instructions for transmitting the series of data packets on the network interface for reception by a second video calling device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
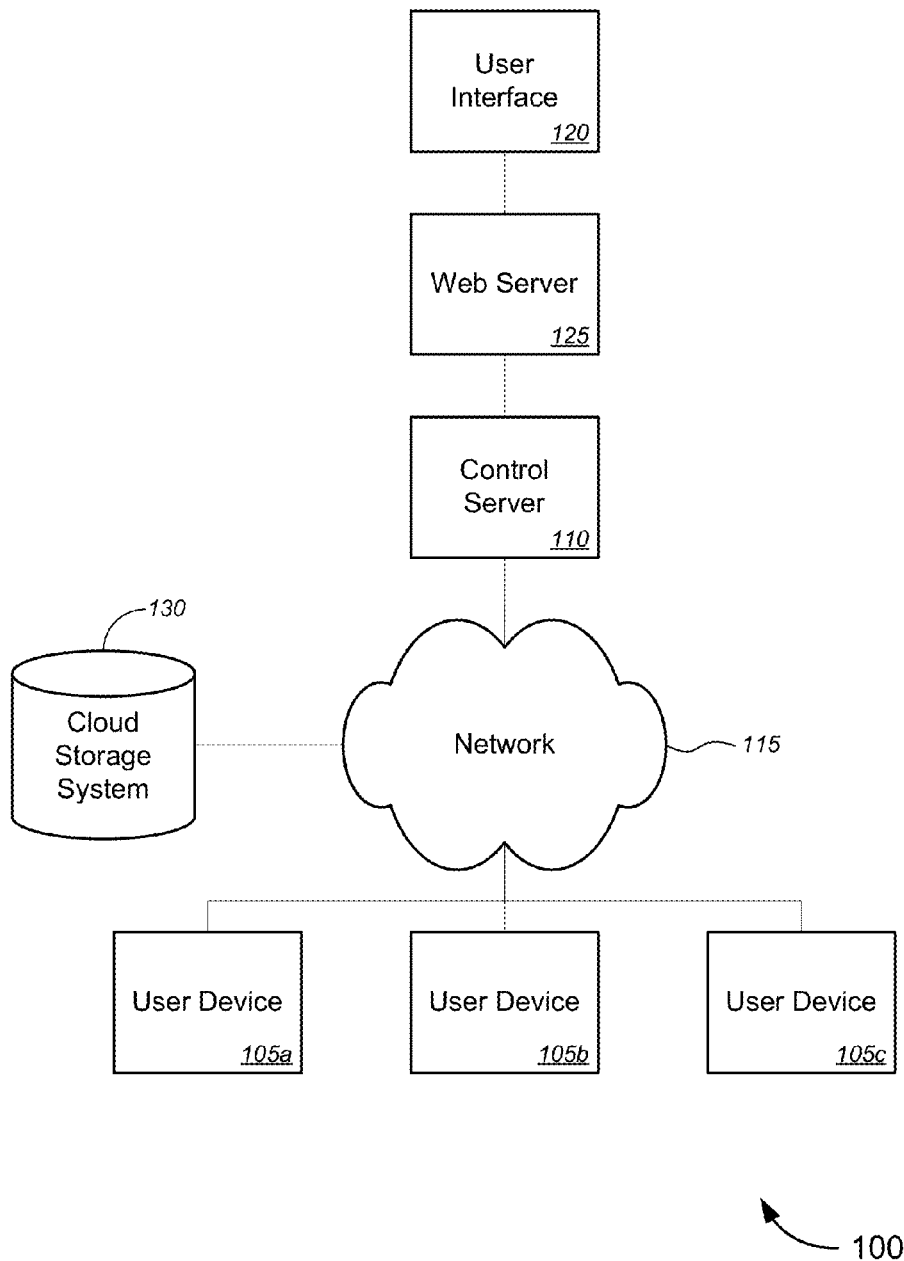
FIG. 1 is a block diagram illustrating a system for modifying an apparent view(s) of displayed content, based at least in part on sensed presence and/or determined position(s) of a user in a room, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features Provided By Various Embodiments
Presence Detection Functionalities
Presence Detection Devices ("PDDs") or Image Capture Devices ("ICDs") provided by various embodiments can contain or communicate with, inter alia, cameras, microphones, and/or other sensors (including, without limitation, infrared ("IR") sensors). These sensors, in conjunction with the internal processing capability of the device, can allow the device to detect when a person is in the room. Additionally, through means such as facial recognition and voice detection, or the like, the devices also can automatically recognize who is in the room. More specifically, such devices can detect the presence of a particular individual. In some aspects, ICDs might contain or communicate with, inter alia, image capture devices for capturing images or video of the person or people in the room. In some cases, ICDs might also contain or communicate with, inter alia, microphones, and/or other sensors (including, without limitation, infrared ("IR") sensors). According to some embodiments, some ICDs might have similar functionality as PDDs.

In various embodiments, presence detection can be local and/or cloud based. In the case of local presence detection, the PDD or ICD itself might keep a list of all user profiles and will attempt to match an individual against its local list of all users. In cloud based detection, the functionality of user detection can be moved into servers in the cloud. A cloud based approach allows detection of a user's presence to be mobile among various devices (whether or not owned by, and/or associated with, the user). That same user can be detected on his or her device or on any other device that has the same capability and that is tied into the same cloud infrastructure.

The ability to automatically detect the presence of an individual on any device presents a powerful new paradigm for many applications including automation, customization, content delivery, gaming, video calling, advertising, and others. Advantageously, in some embodiments, a user's content, services, games, profiles (e.g., contacts list(s), social media friends, viewing/listening/gaming patterns or history, etc.), videomail, e-mail, content recommendations, determined advertisements, preferences for advertisements, and/or preferences (e.g., content preferences, content recommendation preferences, notification preferences, and/or the like), etc. can follow that user from device to device, including devices that are not owned by (or previously associated with) the individual, as described in detail in the '279 Application (already incorporated herein). Alternatively, or in addition, presence detection functionality can also allow for mobile presence detection that enables remote access and control of ICDs over a network, following automatic identification and authentication of the user by any device (e.g., PDD, ICD, or other device) so long as such device has authentication functionality that is or can be tied to the access and control of the ICDs, regardless of whether or not such device is owned or associated with the user. In other words, the ability to remotely access and control one's ICDs over a network can follow the user wherever he or she goes, in a similar manner to the user's content and profiles following the user as described in the '279 Application. Such remote control of ICDs, as well as post-processing of video and/or image data captured by the ICDs, is described in detail in the '263 Application (which is already incorporated by reference herein).

Various sensors on a PDD or an ICD (and/or a video calling device) can be used for user detection. Facial recognition can be used to identify a particular individual's facial characteristics, and/or voice detection can be used to uniquely identify a person. Additionally, PDDs, ICDs, and/or video calling devices may also have local data storage. This local data storage can be used to store a database of user profiles. The user profiles can contain the various mechanisms that can be used to identify a person, including username and password, facial characteristics, voice characteristics, etc. When sensors detect the facial features or capture the voice of a particular individual, that captured presence information can be compared against the characteristics of the users on the local storage. If a match is found, then the individual has been successfully identified by the device. (As used herein, the term "presence information" can be any data or information that can be used to determine the presence of a user, and/or to identify and/or authenticate such a user. As such, presence information can include raw image, video, or audio data, analyzed data (e.g., video or image data to which preliminary facial recognition procedures, such as feature extraction, have been employed, as well as verification of audio self-identification or verification of audio challenge/response information), the results of such analysis, and even the end result of the detection process—i.e., a notification that a user is present and/or an identification of the user.)

Detection of a user's presence can also be performed via proximity of a PDD, an ICD, and/or a video calling device to another device. For example, if a user's mobile phone, smart phone, tablet, or PC is near the PDD, the ICD, and/or the video calling device, that person is automatically detected. In some instances, a unique device identifier for each of a user's devices might have previously been associated with the user's profile in a cloud database or the like (i.e., making the user's devices "known devices"), and detection of such unique device identifiers might serve as a basis for identifying the user, or might streamline the identification process by verifying whether the person with the device owned by or associated with the known device is the user or simply someone in possession of the device(s) (whether lawful or unlawful). Such verification might comprise one or more of facial recognition, voice recognition, audio challenge/response verification, biometric analysis, or the like. In some cases, audio challenge/response verification might include analysis of sub-vocal responses from the person challenged, to prevent undesired casual overhearing of audio passwords, audio keyphrases, or the like. In some instances, biometric analysis might include analysis of any suitable biometric (aside from facial and voice recognition) selected from a group consisting of fingerprint, iris, pupil, height, unique scar(s), other unique physical characteristics, and/or any combination of these biometrics. To capture biometric information such as fingerprints, iris, pupil, height, scar, or other unique physical characteristics, which might be image-based biometrics (which might be captured by a high resolution image capture device of the PDD, the ICD, and/or the video calling device), the PDD, the ICD, and/or the video calling device might prompt the person being detected to position himself or herself so that his or her fingerprints, iris, pupil, full body, scar, or other unique physical characteristics, respectively, are appropriately facing the image capture device of the PDD and/or the ICD.

In some embodiments, with detection of known devices and with automatic detection/identification processes being enabled, it may be possible for the system to identify persons not normally associated with a known device being in possession of the known device. In such a case, the system might notify the original user (via e-mail or other forms of communication indicated in the user's profile, or the like) of the situation. In some instances, the user might indicate that the unknown person does have authority or permission to use, or be in possession of, the user's device. In other cases, where the user indicates that the user does not have authority or permission to use the device, the user may be given options to proceed, including, without limitation, options to lock data, options to lock device functions, options to activate location tracking (including, without limitation, global positioning system ("GPS"), global navigation satellite system ("GNSS"), etc.) of the device (in case the system loses track of the device; e.g., in the case the device moves outside the range of the system's sensor/detection/communications systems), options to contact the unknown person, options to activate speakers to emit sirens, options to activate displays or lights (e.g., light emitting diodes ("LEDs"), organic LEDs ("OLEDs"), liquid crystal displays ("LCDs"), etc.), and/or options to notify authorities (e.g., police or other law enforcement personnel) of the situation and/or the location of the device (e.g., GPS coordinates, or the like), etc.

Additionally and/or alternatively, proximity detection can be done using GNSS location tracking functionality, which can be found in many electronic devices and authenticating the user when the secondary device is within a predefined distance of the PDD, the ICD, and/or the video calling device. Proximity detection can also be done wirelessly via Bluetooth or WiFi. With respect to Bluetooth, if the secondary device pairs with the PDD, the ICD, and/or the video calling device, the user can be considered detected. With respect to WiFi, one approach could be to see if the secondary device associates with the same WiFi access point to which the PDD, the ICD, and/or the video calling device is connected. Another approach to proximity detection is the use of near-field communications ("NFC") commonly found in many electronic devices. When the secondary device is within range of the PDD, the ICD, and/or the video calling device, a NFC detector can be used to determine that the user is in the room. From these examples, a skilled reader should appreciate that many different techniques can be used to detect presence based on device proximity.

According to some embodiments, regardless of the specific manner in which the user's electronic device, personal device, or user device is detected, presence may be determined or inferred by knowing the location of the personal device (which might include, without limitation, at least one of a laptop computer, a smart phone, a mobile phone, a portable gaming device, a desktop computer, a television, a set-top box, or a wearable computing device, and/or the like). When the personal device is close to the display device (or the PDD, ICD, and/or video calling device), it may be determined that the personal device (and hence the user associated with the personal device) is present. Based on the presence of the user and information about the user, advertisement content (which may be determined to be relevant to the user) may be sent to the display device. In this manner, a highly targeted advertising may be implemented (which may be embodied, in some cases, as a highly targeted form of television advertisement, which may be thought of as being similar to what is done on web browsers today, but much more targeted). In a similar manner, recommendations of media content and/or (in some cases, automatic) presentation of recommended media content may also be based on the presence of the user and information about the user. From the user's perspective, when he or she is in the room, recommended media content and/or advertisements on the display device (e.g., a TV or the like) may become customized to him or her (based on detection of the presence of the user and/or based on detection of the presence of his or her personal device, and, in some cases, based also on the user's profile, other information about the user, and/or the like). In some embodiments, the PDD/ICD/video calling device may be one of the personal device itself, a computer/server in the cloud, and/or the personal device in conjunction with some computer/server in the cloud, or the like. The recommended media content and/or advertisement may be sent to a local content source (e.g., an STB or the like) or another PDD/ICD/video calling device that has the ability to control content being played or sent to the display device (and/or, of course, to receive the recommended media content and/or advertisement from a content server). Such a method or apparatus may allow for the targeted presentation (or, in some cases, selling) of recommended media content and/or advertisements directly to the display device (e.g., TV or the like), based on characteristics of the user. In some cases, among other information about the user that can be taken into account, determination of recommended media content and/or advertisements to send to the display device might be based on, or might otherwise take into account, the user's Internet browsing history, the user's Internet browsing patterns, the user's Internet browser bookmarks/favorites, and/or the like.

In some embodiments, detection of an individual can be fully automatic and might (in some instances) require no user interaction. For example, the system can characterize an individual's facial features (and/or unique physical characteristics or other biometrics) automatically, detect the presence of a secondary device, characterize an individual's voice print automatically, etc. Several detection methods can be used in combination to reduce errors in the detection process. For example, if the system detects a person in the room and first identifies that person's facial features, it can then prompt them for voice (e.g., "Bob, is that you?"). Once the user's voice is captured, that audio sample can be compared against the stored voice characteristics for that user, to reduce false detection. Another approach for the second step may be to prompt the user to speak a PIN or password to be compared against what is stored in the user profile. Using this approach, the characteristics of the speech (e.g., user's voice, cadence, syntax, diction) and the content of the speech (e.g., a PIN or password) can be jointly used to reduce false detections. To prevent eavesdropping of passwords or PINs, the audio capture device might be configured to capture sub-vocalizations of the passwords or PINs, for analysis. Alternatively and/or additionally, the system can prompt the user to position his or her body so as to allow the image capture device to face one or more of the user's fingers (e.g., for fingerprint analysis), the user's eyes (e.g., for iris and/or pupil analysis), the user's full body (e.g., for height analysis), portions of the user's body (e.g., for analysis of scars or other unique physical characteristics, or the like), etc.

In some embodiments, physical geography can be used as a metric in detection to reduce the possibility of errors. For example, if a user is known to use the system in Dallas, Tex., and then is detected in Madrid, Spain, the system can weigh detection in Spain lower than detection in Dallas. Additionally, if the user is detected in Spain, a secondary authentication method may optionally be invoked to reduce false detection. According to some embodiments, in the case that the system has access to profile or other personal information of the user such as communications, calendar items, contacts list, travel/itinerary information, or the like that might indicate that the user might be visiting a friend or relative in Spain having a similar PDD, ICD, and/or video calling device linked to a common network or cloud server, the system might determine that the user is or will be in Spain. In such a case, the user's profiles, media content, preferences, content recommendations, determined advertisements, preferences for advertisements, or the like (or access thereto) might be sent to the friend's or relative's device in Spain or to a local data center or the like to allow the user to access the user's own content or profiles on the friend's or relative's device during the visit; in particular embodiments, the user's profiles might include access and control information for remotely accessing and controlling the user's ICDs over a network, while the user's content might include image data and/or video data captured by the user's ICDs (either in raw or processed form). After the scheduled visit, it may be determined using any combination of the user's personal information, the user's devices (including the user's PDD, ICD, and/or video calling device, mobile devices, etc.), and/or the friend's or relative's device whether the user has left the friend's or relative's location (in this example, Spain). If so determined, the content and profiles (or access thereto, as the case may be) might be removed from the friend's or relative's device (and/or from the data center or the like that is local to said device).

In particular embodiments, a PDD, an ICD, and/or a video calling device can also be connected to a network, such as the Internet. In such a scenario, the database of user profiles, including identifiable facial and/or voice characteristics, as well as other identifying information (e.g., passwords, identifying information for other devices owned by the user, etc.), can be stored on servers located in the cloud, i.e., on the network or in a distributed computing system available over the network. In some cases, the distributed computing system might comprise a plurality of PDDs, a plurality of ICDs, and/or a plurality of video calling devices in communication with each other either directly or indirectly over the network. The distributed computing system, in some instances, might comprise one or more central cloud servers linking the plurality of PDDs, the plurality of ICDs, and/or the plurality of video calling devices and controlling the distribution and redundant storage of media content, access to content, user profiles, user data, content recommendations, determined advertisements, preferences for advertisements, and/or the like. When an individual's facial features are detected by a PDD, an ICD, and/or a video calling device, those features (and/or an image captured by the PDD, the ICD, and/or the video calling device) can be sent to a server on the network. The server then can compare the identifiable facial features against the database of user profiles. If a match is found, then the server might inform the device of the identity of the user and/or might send a user profile for the user to the device.

User profiles, including facial characteristics, can be stored both locally on the device and on a server located in the cloud. When using both device-based and cloud-based databases, user identification can be performed by first checking the local database to see if there is a match, and if there is no local match, then checking the cloud-based database. The advantage of this approach is that it is faster for user identification in the case where the user profile is contained in the local database. In some embodiments, the database on the device can be configured to stay synchronized with the database in the cloud. For example, if a change is made to a user profile on the device, that change can be sent to the server and reflected on the database in the cloud. Similarly, if a change is made to the user profile in the cloud-based database, that change can be reflected on the device database.

Matching presence information or identifying information with an individual having a user profile can be a form of authentication in some embodiments. User profiles can also contain information necessary for many authentication mechanisms. Such information may include challenge/response pairs (such as username and password combinations, security question/pass phrase combinations, or the like), facial recognition profiles, voice recognition profiles, and/or other biometric information, such as fingerprints, etc. An individual may be authenticated using any combination of such techniques.

In some cases, the system can also determine when a user is no longer present. Merely by way of example, a PDD, an ICD, and/or a video calling device might continually (or periodically) monitor for the user's presence. For instance, in the case of facial recognition, the device can continually check to detect whether a captured image includes the user's face. With voice recognition, after a period of inactivity, the device might prompt the user if they are there (e.g., "Bob, are you still there?").

According to some embodiments, user profiles can work across heterogeneous networks. Not all user devices need to be the same. Some user devices might be PDDs, ICDs, and/or video calling devices. Other user devices might be computers, tablets, smart phones, mobile phones, etc. Each device can use any appropriate method (based on device capabilities) to determine the presence of, identify, and/or authenticate the user of the device with a user profile.

In an aspect, this automated presence detection can be used to provide user information (e.g., content, content recommendations, determined advertisements, preferences for advertisements, and/or services) to an identified user. With a PDD, an ICD, and/or a video calling device, when a user enters the room, and the camera sensors detect that user's facial features (or other biometric features) and authenticates the individual, the content associated with that user profile (including, without limitation, profile information for handling media content, for handling content recommendations, for handling notification of content recommendations, for handling determination of advertisements, for handling presentation of advertisements, and/or the like) can automatically become available to that individual. Additionally, with the cloud-based authentication approach described herein, that user's content, content recommendations, determined advertisements, preferences for advertisements, and/or profiles can become available on any device. More specifically, if a user is identified by another PDD, ICD, and/or video calling device, then his or her content (e.g., media content, and/or the like), content recommendations, determined advertisements, preferences for advertisements, profiles, etc., become available to him or her even if the PDD, ICD, and/or video calling device that he or she is in front of is not the user's own device. This functionality allows a new paradigm in which the user's content, content recommendations, determined advertisements, preferences for advertisements, and/or profiles follow the user automatically. Similarly, when upgrading PDDs, ICDs, and/or video calling devices, detection, identification, and authentication of the user on the new device can allow automatic and easy porting of the user's content, content recommendations, determined advertisements, preferences for advertisements, and/or profiles to the new device, allowing for an ultimate type of "plug-and-play" functionality, especially if the profiles include information on configurations and settings of the user devices (and interconnections with other devices).

PDDs, ICDs, and/or video calling devices also are capable of handling, transmitting, and/or distributing image captured content, which can include, but is not limited to, video mail and/or video mail data captured or recorded by the video calling devices. In some cases, the video mail and/or video mail data might be raw data, while in other cases they might be post-processed data. Video mail and/or video mail data can be stored on servers in the cloud, on PDDs, ICDs, and/or video calling devices in the cloud, and/or locally on a particular user device. When accessing video mail and/or video mail data from another device, the first PDD and/or video calling device that has the video mail and/or video mail data stored thereon needs to serve the video mail and/or video mail data to the new device that the user is using. In order to do this, the new PDD, ICD, and/or video calling device might need to get a list of video mail and/or video mail data that is stored on the first PDD and/or video calling device. This can, in some embodiments, be facilitated via a server that is in the cloud that all PDDs, ICDs, and/or video calling devices are always or mostly connected to. The server can communicate with all PDDs, ICDs, and/or video calling devices and help send messages between PDDs, ICDs, and/or video calling devices. When a user is authenticated with a new PDD, ICD, and/or video calling device, the new device can request the list of video mail and/or video mail data from the first device. If the user requests video mail and/or video mail data from the new device, then the first PDD, ICD, and/or video calling device (or the other user device) can serve the video mail and/or video mail data to the new device. This can be done either directly in a peer-to-peer fashion and/or can be facilitated by the server. For instance, in some cases, peer-to-peer sessions might be initiated using a server, and after a peer-to-peer session has been initiated or established by the server, the server may be by-passed, resulting in a direct peer-to-peer connection or session. In some embodiments, this communication can be accomplished by using protocols such as XMPP, SIP, TCP/IP, RTP, UDP, etc. Videomail capture, processing, and distribution is described in detail in the '499 Application, which is already incorporated herein by reference.

As discussed above, identification and authentication of a user by a PDD, an ICD, and/or a video calling device (whether or not associated with or owned by the user) can provide the user with remote access and control of the user's PDD(s), ICD(s), and/or video calling device(s) over a network (e.g., by porting the user's profiles associated with remote access and control of the user's device(s), and/or the like to the current PDD, ICD, and/or video calling device in front of which the user is located). This functionality allows the user to remotely access media content, to remotely access and modify settings for content recommendations, to remotely access and modify settings for advertisements, and to remotely access and modify user profiles, and/or the like.

Master Account

Some embodiments employ a master account for access to a video calling device. In an aspect, a master account can be created on a per user basis. This master account might serve as the top-level identifier for a particular user. In some cases, the master account may be used to manage, control, and monitor a user's camera(s) and/or other device functionalities (whether hardware and/or software-based). Additionally, the master account can be used to control any account or device level services that are available.

For example, an email account and password can be used as a master account to manage a user's settings for accessing media content, for accessing and modifying settings for content recommendations, for accessing and modifying settings for advertisements, and for accessing and modifying user profiles, and/or the like.

Device Association

For proper management and control of a PDD, ICD, and/or video calling device, some embodiments provide the ability to reliably associate a PDD, ICD, and/or video calling device with a master account (i.e., assign the device to the master account). When a PDD, ICD, and/or video calling device is associated with an account, then it can be managed and controlled from within the master account. Association ensures that a PDD, ICD, and/or video calling device is being controlled by the appropriate user and not an unauthorized user.

A PDD, ICD, and/or video calling device may be associated with a particular master account at the time of the device setup. During device setup, the user is prompted to enter a master account and password. When doing so, a secure communications channel may be opened up between video calling device and servers. Then, a unique and difficult to guess key can be sent from the device to the server. Servers that have a master list of all keys then can associate that particular device, via its serial number, to a particular master account. A feature of this approach is that a user only needs to enter a password at the time of device setup. The user never needs to enter a password again, and in fact, passwords do not need to be stored on the device at all, making them very secure.

Device Management and Remote Configuration

Once a device has been associated with a master account, it may be managed from the master account via an interface such as a web interface, in accordance with some embodiments. The communication link between the device and server may, in some cases, be always encrypted and authenticated. This ensures that messages between device and server are secure and ensures that the device knows it is communicating with the server on behalf of the appropriate master account. Once the secure and authenticated link is established, devices can connect to the server and are able to send and receive commands.

The device and server can have a common set of command codes and responses. Servers can send commands down to the camera(s) to enact specific behavior. For example, the server can send remote configuration commands. These commands can be items such as changing the device address, changing the nickname that is associated with the device, changing the avatar image associated with the device. In addition to configuration, the commands can be used to enact specific behavior on the device, such as running network tests, or taking a live image(s) from the video calling device. New commands and features can be added by extending the set of command codes on the device and server.

Virtual Window Concept

A set of embodiments can provide a "virtual window" that includes an apparent view of video content (or still images) that corresponds to a user's position with respect to the display device (such as a television or other display device) on which the video content (or still images) is displayed. In some instances, the video content might include video of parties in a video call, video of media content (e.g., movie content, television program content, gaming content, advertisement content, and/or the like), video of a live video feed, and/or the like. In some cases, embodiments can also adjust audio (which might be an audio track of the video content or might be a standalone audio stream with no accompanying video), using similar techniques, based on the position of a listener with respect to a video display (or any other specified point). With respect to video, the effect of some embodiments is to make the displayed video appear to the user as if the user is watching the video through a virtual window, such that the apparent view of the video changes depending on the user's location relative to the virtual window (i.e., display device or the like), and can be modified in real-time (or near real-time, if the user moves with respect to the display device). Thus, the term, "virtual window" is used only for purposes of illustrating the concepts described herein and should not be considered limiting in any way.

The "apparent view" that can be adjusted by various embodiments can include an apparent field of view and/or an apparent perspective on the video. With regard to a scene displayed in a video (or still image), an "apparent field of view," as used herein, means the field of view (i.e., portion of the scene that is displayed) that the user perceives when watching the video (which is analogous to the field of view of a real or virtual camera that captured the scene depicted in the video). An "apparent perspective" is the perspective (e.g., above, below, straight in front, on one side or the other, or any suitable combination of these perspectives) from which the user perceives that he or she is viewing the scene depicted on the video, and it is analogous to the perspective of the real or virtual camera that captured the scene displayed in the video. (The term "virtual camera" is used to convey an embodiment in which the displayed video is not actually live-filmed video but is generated, such as animated video or video from a video game; such generated video has a field of view and a perspective, just as live-recorded video, which is represented by a virtual camera.)

Herein, description of movement of a user's eyes might refer to physical movement of the user's eyes relative to the display device, and not merely rotation of the user's eyes (which is merely a change in the focus of the user's visual field of view, and, in some cases, might not affect the displayed field of view through the virtual window). In other words, physically moving so as to change one's eyes along x, y, or z directions relative to a virtual window might change the field of view looking through the window, but simply rotating one's eyes (without changing position of one's eyes along any of the x, y, or z directions relative to the virtual window) might not affect the field of view looking through the virtual window.

Exemplary Embodiments

FIGS. 1-11 illustrate exemplary embodiments that can provide some or all of the features described above. The methods, systems, and apparatuses illustrated by FIGS. 1-11 may refer to examples of different embodiments that include various components and steps, which can be considered alternatives or which can be used in conjunction with one another in the various embodiments. The description of the illustrated methods, systems, and apparatuses shown in FIGS. 1-11 is provided for purposes of illustration and should not be considered to limit the scope of the different embodiments.

FIG. 1 illustrates an exemplary environment that can provide some or all of the features described herein, including, but not limited to, modifying an apparent view(s) of displayed content (including, without limitation, video call content, media content, and/or the like), based at least in part on sensed presence and/or determined position(s) of a user in a room, in accordance with various embodiments. More specifically, FIG. 1 illustrates a functional diagram of a system 100 for controlling one or more presence detection devices ("PDDs"), one or more image capture devices ("ICDs"), and/or one or more video calling devices (labeled user devices 105 in FIG. 1 for ease of illustration, but described herein as PDDs, ICDs, or video calling devices, each of which can be considered a type of user device). The skilled reader should note that the arrangement of the components illustrated in FIG. 1 is functional in nature, and that various embodiments can employ a variety of different structural architectures. Merely by way of example, one exemplary, generalized architecture for the system 100 is described below with respect to FIG. 11, but any number of suitable hardware arrangements can be employed in accordance with different embodiments.

An ICD 105, a video calling device 105, or a PDD 105 can be any device that is capable of communicating with a control server 110 over a network 115 and can provide any of a variety of types of advertisement determination functionality, content recommendation functionality, video communication functionality, presence detection functionality, and/or the like. Merely by way of example, in some aspects, an ICD 105, a video calling device 105, or a PDD 105 can be capable of providing pass through video/audio to a display device (and/or audio playback device) from another source (such as a local content source), and/or overlaying such video/audio with additional content generated or received by the ICD 105, the video calling device 105, or the PDD 105. In other aspects, an ICD 105, a video calling device 105, or a PDD 105 can comprise one or more sensors (e.g., digital still cameras, video cameras, webcams, security cameras, microphones, infrared sensors, touch sensors, and/or the like), and/or can be capable, using data acquired by such sensors, of sensing the presence of a user, identifying a user, and/or receiving user input from a user; further, an ICD 105, a video calling device 105, or a PDD 105 can be capable of performing some or all of the other functions described herein and/or in any of the Related Applications. Hence, in various embodiments, an ICD 105, a video calling device 105, or a PDD 105 can be embodied by a video calling device, such as any of the video communication devices ("VCDs") described in the '182 patent, a video game console, a streaming media player, to name a few non-limiting examples.

In one aspect of certain embodiments, as described more fully with respect to FIG. 8 below (or as described in the Related Applications), an ICD 105, a video calling device 105, or a PDD 105 can be placed functionally inline between a local content source and a display device. A local content source can be any device that provides an audio or video stream to a display device and thus can include, without limitation, a cable or satellite set-top box ("STB"), an Internet Protocol television ("IPTV") STB, devices that generate video and/or audio, and/or acquire video and/or audio from other sources, such as the Internet, and provide that video/audio to a display device; hence, a local content source can include devices such as a video game console, a Roku® streaming media player, an AppleTV®, and/or the like. When situated functionally inline between a local content source and a display device, the ICD, the video calling device, or the PDD can receive an audiovisual stream output from the local content source, modify that audiovisual stream in accordance with the methods described herein, in the '182 patent, and/or in the '279 Application, and provide the (perhaps modified) audiovisual stream as input to the display device. It should be noted, however, that, in some cases, the functionality of a local content source can be incorporated within an ICD, a video calling device, or a PDD, and/or the functionality of an ICD, a video calling device, or a PDD can be incorporated within a local content source; further, it should be appreciated that an ICD, a video calling device, or a PDD (which might or might not include local content source functionality) can be disposed inline with one or more other local content sources or one or more other video calling devices/PDDs. Hence, for example, an ICD, a video calling device, or a PDD with some local content source functionality (such as a video game console) might be disposed inline between one or more other local content sources or one or more other ICDs/video calling devices/PDDs (such as a cable STB, satellite STB, IPTV STB, and/or a streaming media player) and a display device.

In an aspect of some embodiments, the system can include a software client that can be installed on a computing device (e.g., a laptop computer, wireless phone, tablet computer, etc.) that has a built-in camera and/or has a camera attached (e.g., a USB webcam). This client can act as an interface to allow remote control of the built-in and/or attached camera on the computing device. In some embodiments, the computing device might have a built-in microphone(s) and/or has a microphone(s) attached (e.g., a table-top microphone, a wall-mounted microphone, and/or a microphone removably mountable on a television, on the ICD, on the video calling device, on the PDD, and/or on some other suitable user device, or the like). The software client can alternatively and/or additionally act as an interface to allow remote control of the built-in and/or attached microphone on the computing device. In some cases, the camera and/or microphone can be automatically or autonomously controlled to obtain optimal video and/or audio input. Remote control of the video calling device and/or PDD is described in detail in the '263 Application (already incorporated herein), and may be similarly applicable to remote control of the ICD.

Figure 11:
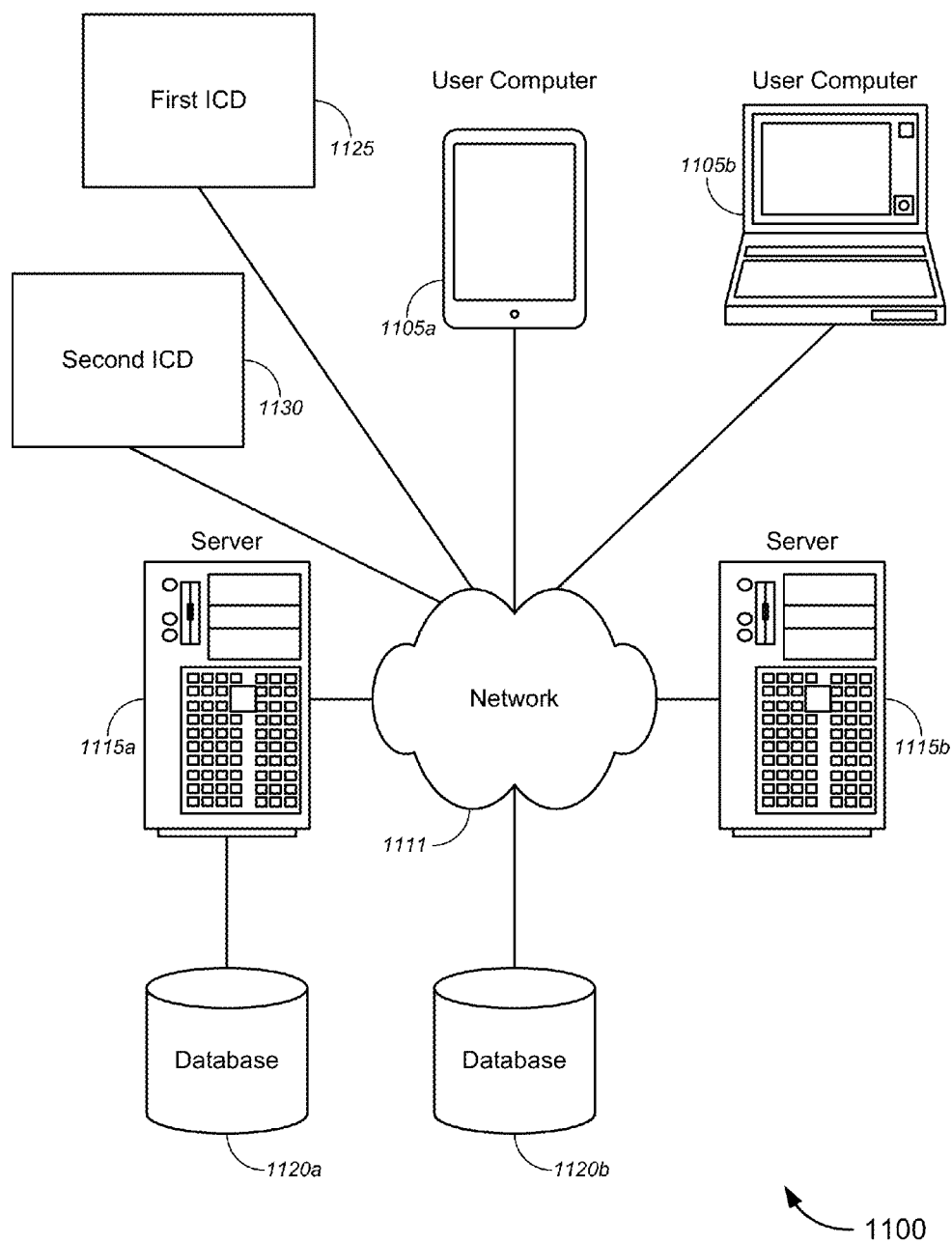
FIG. 11 is a block diagram illustrating a networked system of computers, which can be used in accordance with various embodiments.

The system 100 can further include a control server 110, which can have any suitable hardware configuration, and an example of one such configuration is described below in relation to FIG. 11. In one aspect, the control server 110 is a computer that is capable of receiving user input via a user interface 120 and/or performing operations for utilizing the ICD(s) 105, the video calling device(s) 105, and/or the PDD(s) 105 to perform one or more of receiving (and relaying) media content (either directly from a media content server or database (both not shown) via network 115, indirectly via a local content source (e.g., an STB or the like), directly from cloud storage system 130, and/or the like), monitoring the media content presented to the user(s), monitoring the user(s), sending the monitored data to the control server 110, determining content recommendations, determining at least one advertisement for the user(s) with the control server 110, receiving the at least one advertisement for the user(s) from the control server 110, presenting the at least one advertisement to the user(s), determining position(s) of the user(s) (and/or the user(s)'s eyes) relative to a display device, adjusting the apparent view of the content displayed on the display device based at least in part on the determined position(s) of the user(s) (and/or the user(s)'s eyes) relative to the display device, and/or the like. In some cases, the control server 110 might handle all of the processes for identifying and authenticating users and for providing access to the user(s)'s profiles, content, information, recommendations, advertisements, preferences (including, without limitation, preferences for advertisements and other user preferences, etc.), as well as handling the processes involved with determining or presenting the advertisements, and/or handling processes involved with position(s) determination of the user(s) (and/or eyes of the user(s)) and handling modification/adjustment of the apparent view of content displayed on a display device based on the determined position(s) of the user(s) (and/or eyes of the user(s)). Alternatively, or additionally, the processes involved with position(s) determination of the user(s) (and/or eyes of the user(s)) and/or handling modification/adjustment of the apparent view of content displayed on a display device based on the determined position(s) of the user(s) (and/or eyes of the user(s)) might be handled by the user device 105 corresponding to the user(s) and/or to the display device. In other instances, control server 110 and the particular user device 105 might split the processing tasks in any suitable manner, as appropriate Merely by way of example, in some embodiments, the control server 110 can detect user presence, identify/authenticate users, and/or enable the user to remotely access the user's master account, user preferences, media content, recommendations of media content, advertisements, preferences for advertisements, and/or the like. In other cases, the control server 110 can receive and/or store user input and/or user preferences that can specify whether and how presence information should be used, whether and how the user's ICD(s), video calling device(s), and/or PDD(s) may be used in a distributed infrastructure, whether and how the user's content and profiles should be handled under certain situations, and/or the like.

For example, preferences might specify which account information, content, profile information, personal communications (e.g., videomail, voicemail, e-mail, etc.), media content, media content recommendations, determined advertisements, preferences for advertisements, and/or the like should be delivered to a user when present at a device not owned by the user, whether presence information should be collected for that user at all (and/or where such information should be collected); for example, a user might specify that his presence should only be monitored in selected locations or from selected devices, and the control server 110 might remove that user's profile from the search universe when provided with presence information from a device not at the selected location or from a device other than one of the selected devices. More generally, the user preference can include any types of parameters related to collecting presence information, using presence information, handling media content recommendations, handling advertisements, and/or serving content/information (including, without limitation, user account information, user content, user profile information, user's personal communications (e.g., videomail, videomail, voicemail, e-mail, etc.), media content, advertisements, and/or the). These preferences might be stored in a user profile at the control server 110, which might also include other user-specific information, such as the user's normal location(s), identifying information (such as MAC address, etc.) of other user devices owned by or associated with the user, lists of or links to content owned by the user, lists of or links to media content recommendations, lists of or links to preferences for handling media content recommendations, lists of or links to advertisements, lists or links to products or services associated with advertisements, lists of or links to preferences for handling advertisements, and/or the like.

In some embodiments, user preferences might specify how the user would like his or her user devices to participate (or not) in a distributed infrastructure arrangement. For instance, the user preferences might include, without limitation, preferences indicating whether or not to allow a user device owned by the user to be used for distributed infrastructure; preferences indicating what type of software applications, customer data, media content (of other user device users and/or subscribers of a cloud service), and/or advertisements are permitted to be hosted on a user device owned by the user; and/or preferences indicating amount of resources of a user device to dedicate to the distributed infrastructure; etc. In some embodiments, in addition to indicating how a user's user device may be used in distributed infrastructure implementation, user preferences might allow a user to indicate how the user's own applications, data, and/or media content may be hosted on other users' user devices. For example, the user might be given the option to encrypt any and/or all personal data, any and/or all personal applications, any and/or all files or lists indicating which media content are associated with the user, any and/or all files or lists pertaining to media content recommendations and/or preferences thereof, and/or any and/or all files or lists pertaining to advertisements and/or preferences thereof. Common media content (which might include popular media content, or any other media content) may remain unencrypted for common usage by any number of users on any number of user devices, subject only to any subscription, rental, or purchase restrictions on the particular media content as associated with any user and/or any user device. On the other hand, the user's personal communications (including, e.g., videomail messages and/or the like), preferences for media content recommendations, past decisions/patterns/history with regard to media content viewed/listened to/played by the user, preferences for advertisements, and/or the like may be encrypted.

The control server 110 can provide a user interface (which can be used by users of the ICDs 105, the video calling devices 105, and/or the PDDs 105, and/or the like). The control server 110 might also provide machine-to-machine interfaces, such as application programming interfaces ("APIs"), data exchange protocols, and the like, which can allow for automated communications with the video calling devices 105 and/or the PDDs 105, etc. In one aspect, the control server 110 might be in communication with a web server 125 and/or might incorporate the web server 125, which can provide the user interface, e.g., over the network to a user computer (not shown in FIG. 1) and/or a machine-to-machine interface. In another aspect, the control server 110 might provide such interfaces directly without need for a web server 125. Under either configuration, the control server 110 provides the user interface 120, as that phrase is used in this document. In some cases, some or all of the functionality of the control server 110 might be implemented by the ICD 105, the video calling device 105, and/or the PDD 105 itself.

In an aspect, the user interface 120 allows users to interact with the control server 110, and by extension, the ICDs, the video calling devices 105, and/or the PDDs 105. A variety of user interfaces may be provided in accordance with various embodiments, including, without limitation, graphical user interfaces that display, for a user, display fields on display screens for providing information to the user and/or receiving user input from a user.

Merely by way of example, in some embodiments, the control server 110 may be configured to communicate with a user computer (not shown in FIG. 1) via a dedicated application running on the user computer; in this situation, the user interface 120 might be displayed by the user computer based on data and/or instructions provided by the control server 110. In this situation, providing the user interface might comprise providing instructions and/or data to cause the user computer to display the user interface. In other embodiments, the user interface may be provided from a web site, e.g., by providing a set of one or more web pages, which might be displayed in a web browser running on the user computer and/or might be served by the web server 125. As noted above, in various embodiments, the control system 110 might comprise the web server and/or be in communication with the web server 125, such that the control server 110 provides data to the web server 125 to be incorporated in web pages served by the web server 125 for reception and/or display by a browser at the user computer.

The network 115, specific examples of which are described below with regard to FIG. 11, can be any network, wired or wireless, that is capable of providing communication between the control server 110 and the ICDs 105, the video calling devices 105, and/or the PDDs 105, and/or of providing communication between the control server 110 (and/or the web server 125) and a user computer. In a specific embodiment, the network 115 can comprise the Internet, and/or any Internet service provider ("ISP") access networks that provide Internet access to the control server 110, the user computer, and/or the ICDs 105, the video calling devices 105, and/or the PDDs 105.

In some embodiments, the system 100 can include a cloud storage system 130, which can be used, as described in further detail below, to store advertisements, presence information, images, video, videomail messages, media content, media content recommendations, determined advertisements, preferences for advertisements, preference information of users, past viewing/listening/playing patterns or decisions of users, and/or the like that are monitored/captured, downloaded, streamed, and/or uploaded by the ICDs 105, the video calling devices 105 and/or the PDDs 105, and/or the like. In some cases, the cloud storage system 130 might be a proprietary system operated by an operator of the control server 110. In other cases, the cloud storage system 130 might be operated by a third party provider, such as one of the many providers of commercially available cloud services. In yet a further embodiment, the cloud storage system 130 might be implemented by using resources (e.g., compute, memory, storage network, etc.) shared by a plurality of video calling devices, and/or by a plurality of PDDs, that are distributed among various users of the system. Merely by way of example, as described in further detail below and in the '360 Application (already incorporated by reference herein), a plurality of user video calling devices and/or PDDs might each have some dedicated resources (such as a storage partition), which are dedicated for use by the system, and/or some ad hoc resources (such as network bandwidth, memory, compute resources, etc.) that are available to the system when not in use by a user. Such resources can be used as cloud storage and/or can be used to provide a distributed, cloud-like platform on which a control server can run as a virtual machine, cloud container, and/or the like.

According to some embodiments, ICD 105, video calling device 105, and/or PDD 105 might comprise a first video input interface to receive first video input from a first local content source (which in some embodiments can include a STB and/or the like) and a first audio input interface to receive first audio input from the first local content source. Video calling device 105 might further comprise a first video output interface to provide first video output to a first video display device and a first audio output interface to provide first audio output to a first audio receiver. In some cases, the first video display device and the first audio receiver might be embodied in the same device (e.g., a TV with built-in speaker system, or the like). With the input and output interfaces, video calling device 105 might provide pass-through capability for video and/or audio between the first local content source and the first display device. In some instances, high-definition multimedia interface ("HDMI") cables or other suitable HD signal cables may be used to provide the interconnections for the pass-through. Video calling device 105 may, in some cases, comprise a first image capture device to capture at least one of first image data or first video data and a first audio capture device to capture first audio data. Video calling device 105 may also comprise a first network interface, at least one first processor, and a first storage medium in communication with the at least one first processor.

In some aspects, a plurality of ICDs, PDDs, or video calling devices 105 might be communicatively coupled together in a network (e.g., network 115), each ICD, PDD, or video calling device being located in one of a plurality of customer premises. For implementing distributed infrastructure for cloud computing, cloud-based application hosting, and/or cloud-based data storage, a computer might establish one or more ICDs, PDDs, or video calling devices 105 of the plurality of ICDs, PDDs, or video calling devices 105 as distributed infrastructure elements and might provide at least one of one or more software applications, customer data, and/or media content to the one or more video calling devices 105 for hosting on the one or more video calling devices 105. These and other functionalities of the video calling devices related to distributed infrastructure are described in greater detail in the '360 Application (already incorporated by reference herein).

Merely by way of example, in some aspects, a user can remotely access one or more ICDs, PDDs, or video calling devices 105 and/or remotely access at least one of the user's master account, the user's user preference, the user's profiles, any videomail messages addressed to the user, the user's media content, media content recommendations for the user, determined advertisements, preferences for advertisements, and/or the like over a network. For example, in a web-based implementation, a user could log into the user's master account by accessing a website hosted on a web server (e.g., web server 125, which might be hosted on a cloud server, hosted on distributed PDDs, hosted on distributed video calling devices, and/or the like) and entering commands into a user interface (e.g., user interface 120) associated with remotely accessing the user's video calling device(s) 105 and/or associated with remotely accessing at least one of the user's master account, the user's user preference, the user's profiles, any videomail messages addressed to the user, the user's media content, media content recommendations for the user, determined advertisements of the user, the user's preferences for advertisements, and/or the like. In some instances, the user might access and interact with the user interface over the network (e.g., network 115) by using a user computer selected from a group consisting of a laptop computer, a desktop computer, a tablet computer, a smart phone, a mobile phone, a portable computing device, and/or the like. In an application-based (or "app-based") implementation, the user might interact with a software application (or "app") running on the user's user device, which might include, without limitation, a laptop computer, a desktop computer, a tablet computer, a smart phone, a mobile phone, a portable computing device, and/or the like. The app might include another user interface (similar to the web-based user interface) that might allow for access of the user's video calling device(s) (or any paired video calling device(s)) over the network (e.g., network 115) and/or that might allow for access to at least one of the user's master account, the user's user preference, the user's profiles, any videomail messages addressed to the user, the user's media content, media content recommendations for the user, determined advertisements for the user, the user's preferences for advertisements, and/or the like.

According to some embodiments, control server 110, which can have any suitable hardware configuration (an example of which is described below with respect to FIG. 10), might be a computer that is capable of receiving user input via a user interface 120 and/or performing operations for controlling the user device(s) 105 (which in some cases might comprise inline camera(s), which in turn might comprise cameras or other sensors, and the like). Merely by way of example, however, the control server 110 can provide modified apparent views to be inserted in a video stream, and/or the like. In other cases, the control server 110 can receive and/or store user input and/or user preferences that can specify whether and how presence information should be used.

In an aspect of some embodiments, the user might log onto his or her master account at the control server in order to access and/or control inline cameras assigned to that account. The user device 105 and/or the control server 110 might authenticate the user with a set of credentials associated with the master account (e.g., with any of several know authentication schemes, such as a userid/password challenge, a certificate exchange process, and/or the like). Once the user has been authenticated, the user interface can present the user with a variety of different information, including without limitation information about status of inline cameras (or user devices 105 comprising the inline cameras) assigned to the master account to which the user has logged on, options for controlling such inline cameras, and or the like.

Thus, in some aspects, the user device 105 and/or the control server 110 might receive user preferences (e.g., via a network, such as the Internet, to name one example), and in particular user preferences relating to the collection and/or use of presence information, including without limitation preferences such as those described above. The user device 105 and/or the control server 110 can further control and/or configure the inline camera, based at least in part on the user preferences. Merely by way of example, the user might have specified that the inline camera should not be used to collect presence information at all, in which case that feature might be turned off at the inline camera. Alternatively and/or additionally, the user might have specified some limitations on the collection of presence information (such as about whom such information may be collected, times at which information can be collected, and/or purposes for which information may be collected, to name a few examples). Of course, in some embodiments, these preferences can be set directly at the inline camera, e.g., through a menu system displayed on a video device. It should also be recognized that some preferences (such as with whom presence information can be shared) might not affect the inline camera and might be saved and/or operated on at the control server instead.

The amount of control imposed by the control server 110 can vary according to embodiment and implementation. Merely by way of example, as noted above, in some embodiments, there might be no control server, and the inline camera might incorporate all the functionality described herein with regard to the control server 110. In other embodiments, the control server 110 might provide fairly fine-grained control over the inline camera, such as instructing the camera to capture images for purposes of determining presence, and/or the control server 110 may receive the images directly and perform the present determination procedures at the controls server. The division of responsibility between the control server 110 and the inline camera or user device 105 can fall anywhere along this spectrum. In some cases, for instance, the control server 110 might provide the user preferences to the inline camera, which then is responsible for collecting presence information in accordance with those preferences and transmitting the presence information to the control server 110, which takes the appropriate action in response to the presence information, such as, selecting an advertisement based on the presence information. Alternatively and/or additionally, the inline camera itself might be responsible for taking such actions.

In some cases, the user device or inline camera might collect presence information. A variety of operations might be involved in the collection of presence information. For example, in some cases, the inline camera captures one or more images of at least a portion of a room where it is located. Such images can be digital still images, a digital video stream, and/or the like. Collecting presence information can further comprise analyzing one or more of the images. Merely by way of example, the images might be analyzed with facial recognition software, which can be used to determine the number of people in the room with the inline camera and/or to identify any of such people (e.g., by determining a name, an age range, a gender, and/or or other identifying or demographic information about a user, based on the output of the facial recognition software). Alternatively and/or additionally, analyzing the images can comprise determining that a person is watching a display device, for example using eye-tracking software to identify a focus area of the person's eyes and correlating that focus area with the location of a television. In some cases, if the number of people and the identities (or at least demographic characteristics) of each of the people in the room can be determined, analyzing the images can further include determining a collective demographic of the people in the room (based, for example on the demographic characteristics of a majority of people in the room).

In some embodiments, the user device (or inline camera) 105 might determine a position(s) of a user(s) relative to a display device in communication with the user device (or inline camera) 105. The user device (or inline camera) 105 and/or the control server 110 might adjust an apparent view of video and/or image(s) on the display device in response to the determined position(s) of the user(s) relative to the display device. In some cases, the user device (or inline camera) 105 and/or the control server 110 might adjust audio (which might be associated with the video and/or image(s), or might be stand-alone audio), in response to the determined position(s) of the user(s) relative to the display device. This technique allows for tracking movement of the user(s), and can, in some cases, provide real-time or near-real-time adjustment of video, image, and/or audio, in response to the determined updated position(s) of the user(s).

In some aspects, server 110 might perform the methods described in detail with respect to FIGS. 2-9 below, while data associated with user account(s) or preferences, data associated with monitored user(s), and/or data associated with monitored media content might be collected by the one or more user devices 105, by server 110, or by any combination of these computing devices. The database 130 might store some or all of these collected data.

Aside from the techniques described above, the user devices 105 and/or the server 110 might perform any functions that are described in detail in any of the Related Applications and/or in the '182 patent, which are already incorporated herein by reference in their entirety for all purposes.

Figure 3:
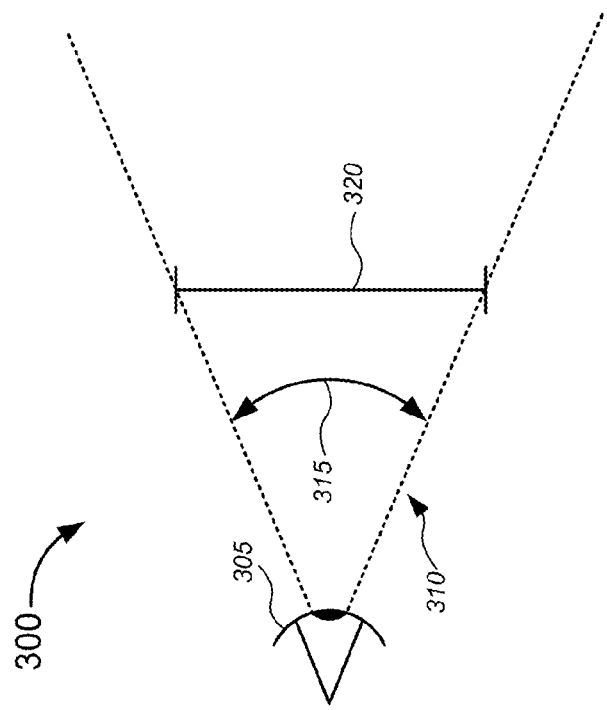
FIGS. 2 and 3 illustrate fields of view, in accordance with various embodiments.
Figure 2:
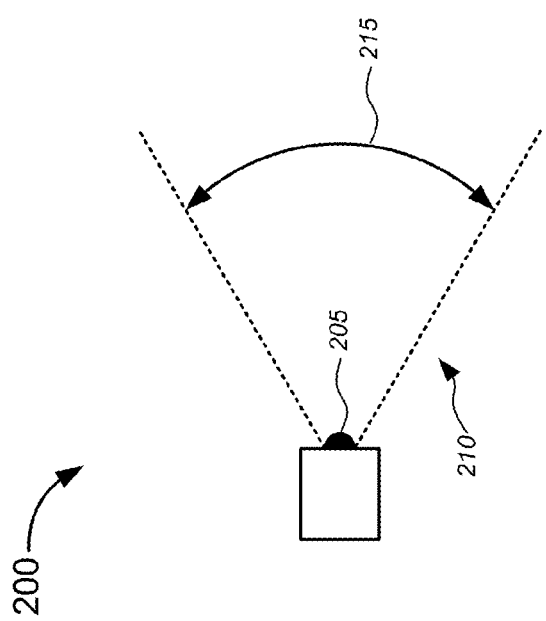

To illustrate these concepts, consider FIGS. 2 and 3. FIG. 2 illustrates a scenario 200 in which a camera or ICD 205 captures a scene. That camera has a fixed field of view 210, which might define an angle 215 that is rotated about a 360 degree direction about an axis that is normal to the lens of the camera or ICD 205. The fixed field of view 210 generally cannot be modified unless the settings or orientation of the camera are manually modified. In contrast, however, as illustrated by the scenario 300 of FIG. 3, a scene viewed on a display 320 by a user's eye 305 will have an ideal field of view 310, which is a function of the user's position (in three dimensions) and time. In some cases, the ideal field of view 210 might define an angle 315 that is rotated about a 360 degree direction about an axis that is normal to the lens of the user's eye 305. In some embodiments, a camera or ICD 205 might be designed to have a field of view that defines an angle 215 that matches or exceeds angle 315.

To make the displayed scene more realistic and lifelike, the field of view 310 (and the corresponding perspective) must depend on the user's position at any given time, and must change if the user's position changes. (As used herein, the term "position," when referring to a user, can either refer generally to a user's position or can refer more specifically to the position of the user's eyes, or a proxy thereof, such as the centroid of an ellipse that encompasses the user's eyes.)

Figure 4B:
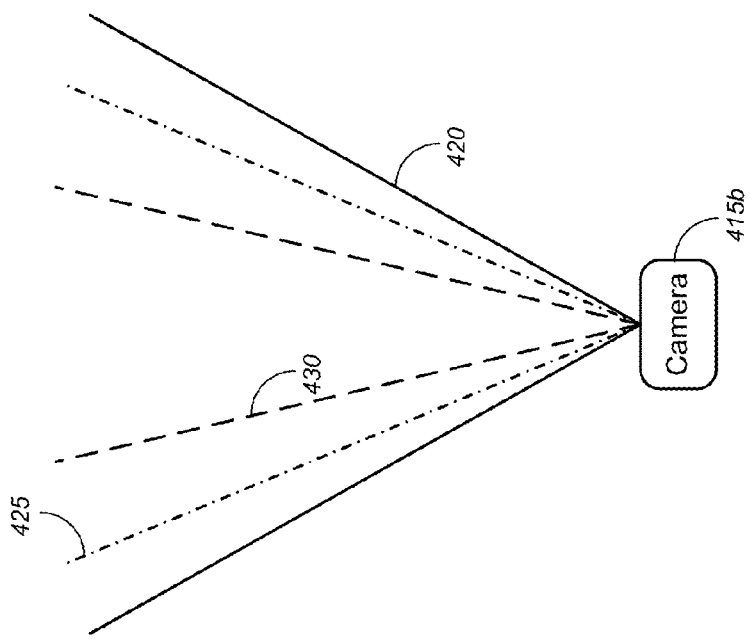
FIGS. 4A-4F are general schematic diagrams illustrating techniques for adjusting an apparent field of view of a display device, in accordance with various embodiments.
Figure 4A:
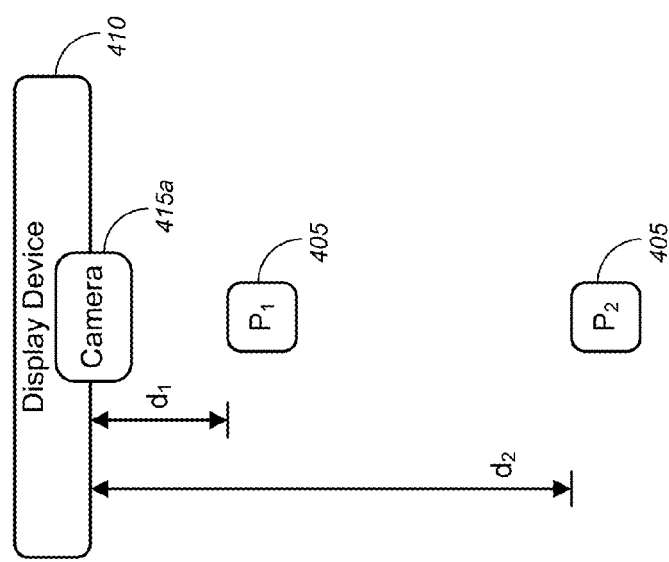
Figure 4C:
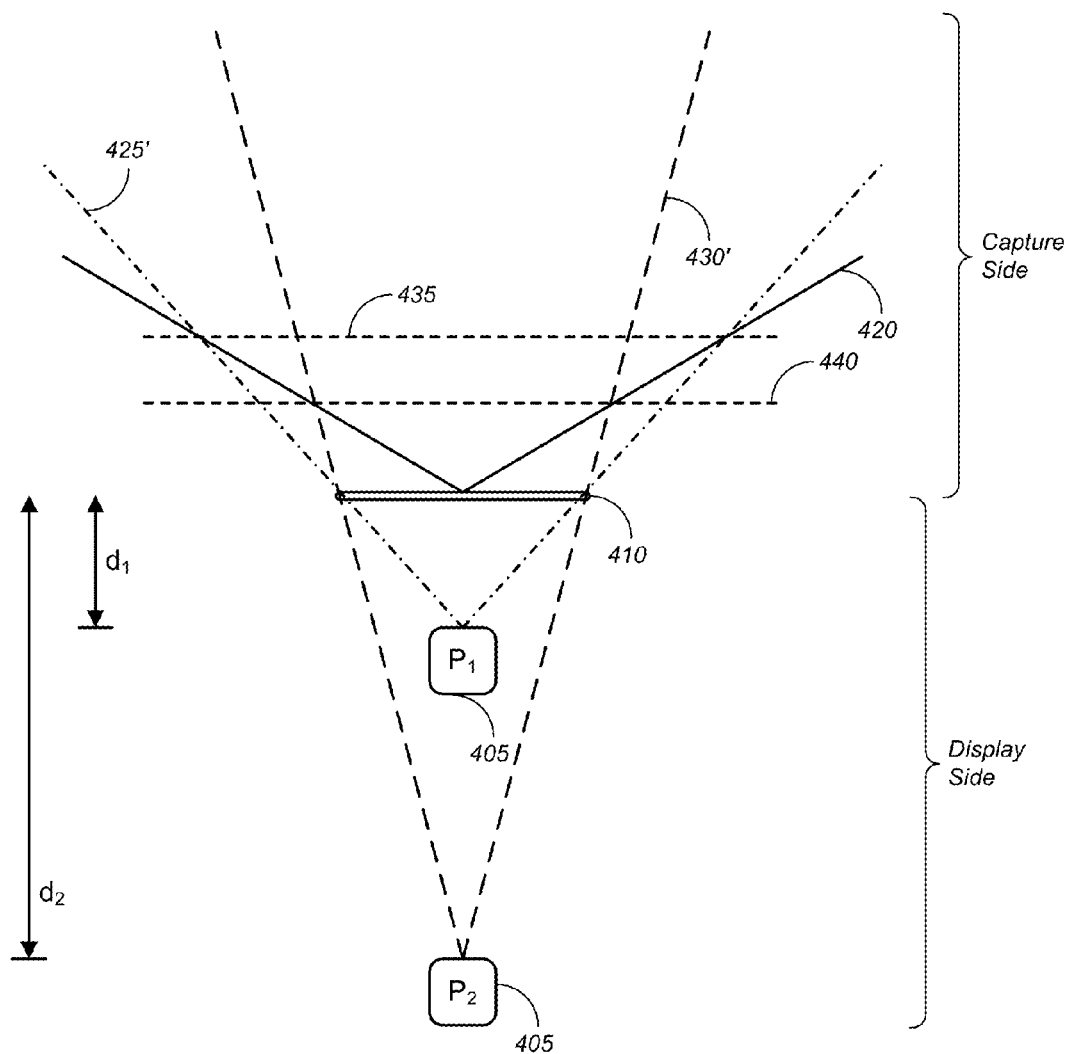

FIGS. 4A-4F (collectively, "FIG. 4") are general schematic diagrams illustrating techniques for adjusting an apparent field of view of a display device, in accordance with various embodiments. For example, as illustrated by FIGS. 4A-4C, the apparent field of view is increased when the user is closer and decreased when the user is farther away. The display side portion (shown in FIG. 4A) shows the side on which the user 405 is located and on which the display device 410 displays content (including, without limitation, images/video captured from the capture side, and/or the like) to the user 405. The position of the user 405 (and/or the user's eyes) may be tracked by camera 415a. The capture side portion (shown in FIG. 4B) shows the side on which another party to a video call is located or the side on which a live video stream is captured (or the like). The other party to the video call or the objects of the live video stream may be captured by camera 415b. The capture side shows the maximum field of view ("FOV") 420 (shown as a pair of solid lines in FIG. 4B) that the camera 415b captures, as well as the various FOVs 425 and 430 that the camera 415b captures in various situations.

On the display side (FIG. 4A), the user 405 is shown in 2 different positions—i.e., position $P_1$ (which is located a distance $d_1$ from the face of the display device 410) and position $P_2$ (which is located a distance $d_2$ from the face of the display device 410). In position $P_1$, the viewer is close to the display device 410. This corresponds to a wider field of view 425 as shown (as a pair of dot-dash lines) in the capture side figure (FIG. 4B). In position $P_2$, the viewer is further from the display device 410. This corresponds to a narrow field of view 430 as shown (as a pair of dash lines) in the capture side figure (FIG. 4B). Although two positions are shown, the techniques described herein allow for tracking the user 405 through any number of positions relative to the display device.

FIG. 4C depicts the effective FOVs of the user 405, when the user 405 is located at positions $P_1$ and $P_2$, for instance. In FIG. 4C, one might treat display device 410 as if it were a virtual window looking into the capture side (in a sense, through the "peephole" of camera 415b). For example, on the display side, when the user 405 is at position $P_1$ (i.e., at a distance $d_1$ from the display device 410), the user's effective FOV 425' might ideally extend from the display side, beyond display device 410, to the capture side. Because the camera 415b might effectively act as a peephole or the like, in order to display an appropriate FOV 425 on the display device 410 to simulate this ideal, effective FOV 425', objects within FOV 420 should ideally be at least on plane 435 that is parallel to a face of the camera 415b (which, from a functional perspective, might have a position that is effectively (though not actually) behind display device 410) or extend outward from camera 415b beyond plane 435. In this manner, it may be ensured that objects within the FOV 420 may be captured in images/video. Any objects or portions of objects between camera 415b and plane 435 may not be fully captured (or indeed captured at all), thus resulting in a somewhat unnatural image/video that is displayed on the display device, which would not effective simulate a virtual window. In some cases, the user device or control server might use image processing techniques to remove such objects (or partial image-captured objects) from the resultant displayed video or image(s).

When the user 405 moves to position $P_2$ (i.e., at a distance $d_2$ from the display device 410), the user's effective FOV 430' might ideally extend from the display side, beyond display device 410, to the capture side. For similar reasons as with FOV 425', to display an appropriate FOV 430 on the display device 410 to simulate this ideal, effective FOV 430', objects within FOV 420 should ideally be at least on plane 440 that is parallel to a face of the camera 415b or extend outward from camera 415b beyond plane 440.

Figure 4E:
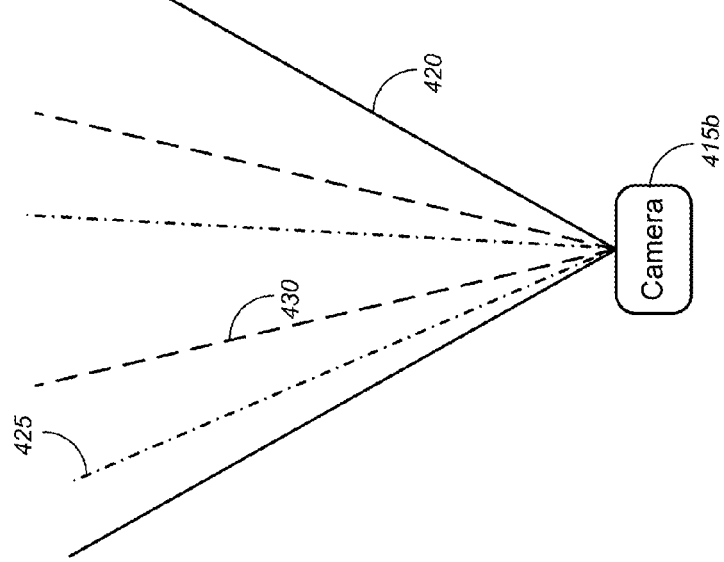
Figure 4D:
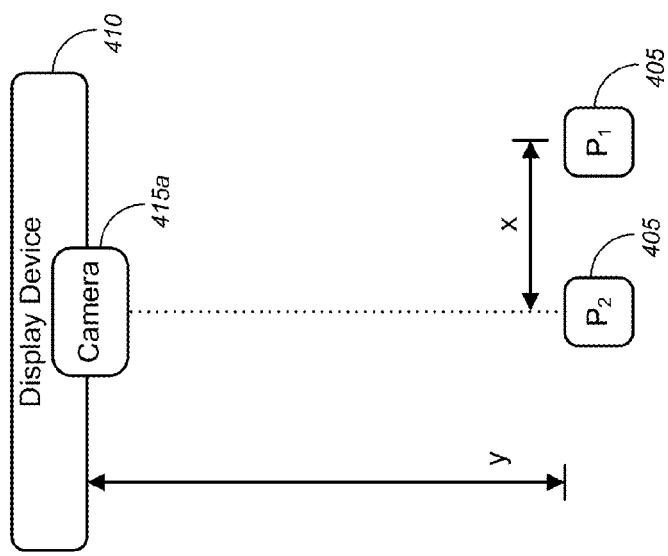
Figure 4F:
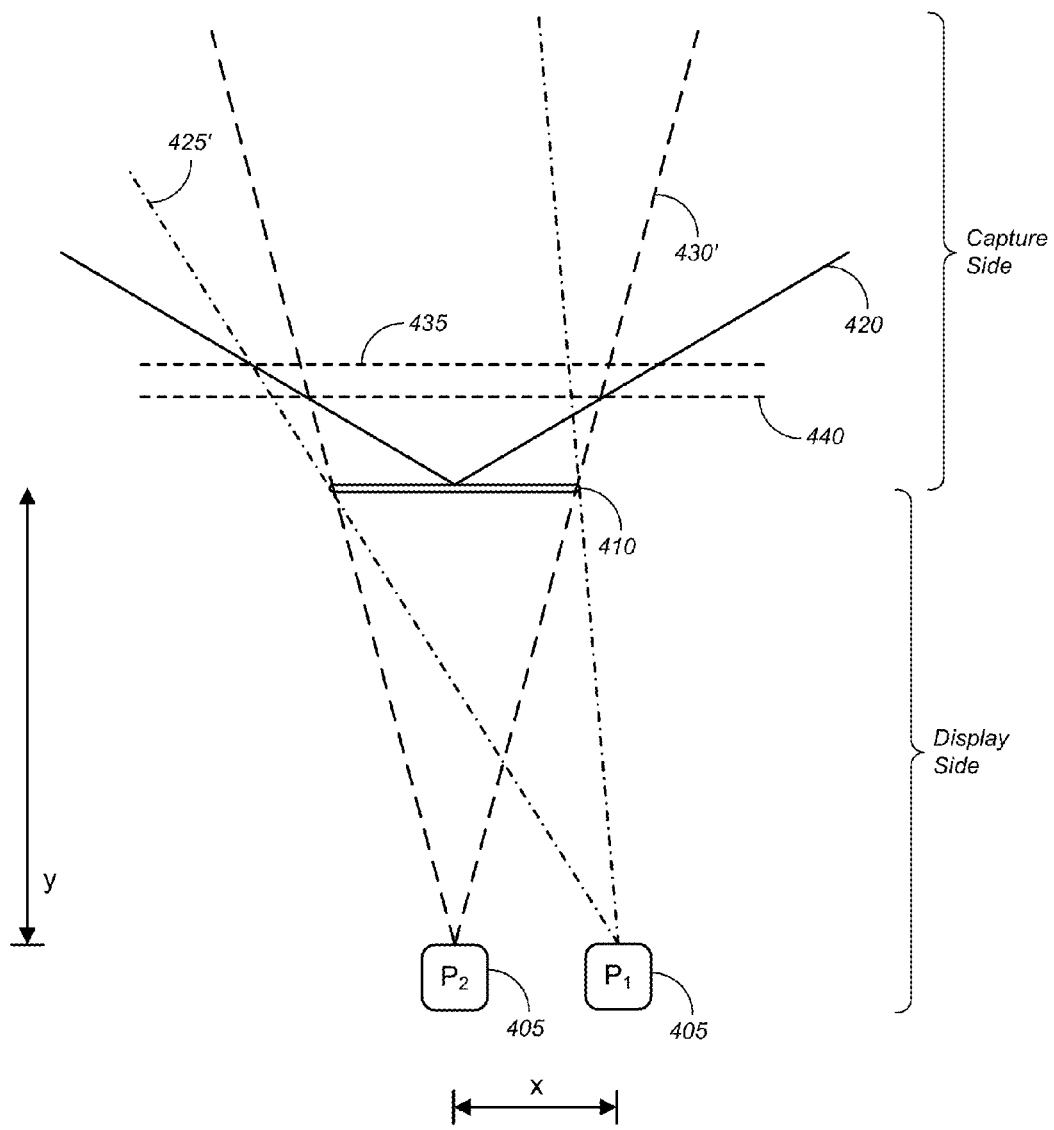

FIGS. 4D-4F illustrate this process for horizontal movements of the user 405. As shown in FIG. 4D, camera 415a might be used for determining the user's 405 position relative to (a face of) display device 410 (and can be used to transmit video or other media content to the user 405, as well, for example, as part of a video call or the like). The horizontal position is relative to the display side camera 415a. In the display side portion of the figure (FIG. 4D), position $P_1$ indicates a horizontal offset (by distance x) from the centerline (which defines a line that is normal to a face of the camera 415a or that is normal to the face of the display device 410). The FOV 425 for this offset position is shown (as a pair of dot-dash lines) in the capture side figure (FIG. 4E). For reference, the FOV of position $P_2$ is also shown. Position $P_2$ corresponds to one in which the user is not horizontally offset relative to the display side camera (i.e., is aligned with the centerline). The FOV 430 for this non-offset position is shown (as a pair of dash lines) in the capture side figure (FIG. 4E). In both these examples, the user 405 remains at a constant distance y from the display device 410.

Like FIG. 4C, FIG. 4F depicts the effective FOVs of the user 405, when the user 405 is located at positions $P_1$ and $P_2$, for example. In FIG. 4F, as in FIG. 4C, one might treat display device 410 as if it were a virtual window looking into the capture side (in a sense, through the "peephole" of camera 415b). For example, on the display side, when the user 405 is at position $P_1$ (i.e., positioned to the right at a distance x from the centerline), the user's effective FOV 425' might ideally extend from the display side, beyond display device 410, to the capture side, with the FOV 425' shifted to the left. To display an appropriate FOV 425 on the display device 410 to simulate this ideal, effective FOV 425', objects within FOV 420 should ideally be at least on plane 435 that is parallel to a face of the camera 415b or extend outward from camera 415b beyond plane 435. In this manner, it may be ensured that objects within the FOV 420 may be captured in images/video. Any objects or portions of objects between camera 415b and plane 435 may not be fully captured (or indeed captured at all), thus resulting in a somewhat unnatural image/video that is displayed on the display device, which would not effective simulate a virtual window.

When the user 405 moves to position $P_2$ (i.e., at a distance x from the position $P_1$ (and aligned along the centerline), and at a distance y from display device 410), the user's effective FOV 430' might ideally extend from the display side, beyond display device 410, to the capture side. For similar reasons as with FOV 425', to display an appropriate FOV 430 on the display device 410 to simulate this ideal, effective FOV 430', objects within FOV 420 should ideally be at least on plane 440 that is parallel to a face of the camera 415b or extend outward from camera 415b beyond plane 440.

Although not shown, vertical movements of the user 405 relative to the display device 410 may be tracked, and the FOV may be adjusted in a similar manner as described above with respect to FIGS. 4D-4F.

A number of techniques can be used to detect the position of the user (or, as noted above, more precisely, the user's eyes), along any combination of three dimensions. Merely by way of example, in some embodiments, location of the viewer's eyes on the display side can be detected (or estimated) by one or more of techniques including, but not necessarily limited to, (a) distance sensors (including, without limitation, lidar sensors, radar sensors, sonar sensors, and/or the like); (b) facial recognition techniques; (c) point locating device (e.g., remote control, headset, glasses, and/or similar devices), (d) silhouette detection, (e) eye tracking techniques; and/or (f) other techniques. The analysis techniques to determine the user's position can be performed by a video calling device (or other user device) that captures the video of the user, by a control server, by a video calling device (or other user device) that is used to record the video to be displayed to the user, or by a combination of these devices.

Figure 5B:
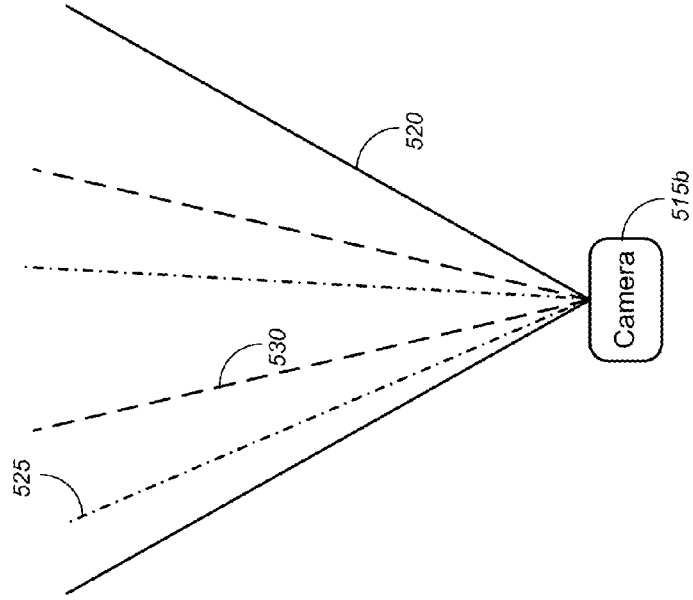
FIGS. 5A and 5B are general schematic diagrams illustrating techniques for adjusting apparent fields of view of a display device for multiple users, in accordance with various embodiments.
Figure 5A:
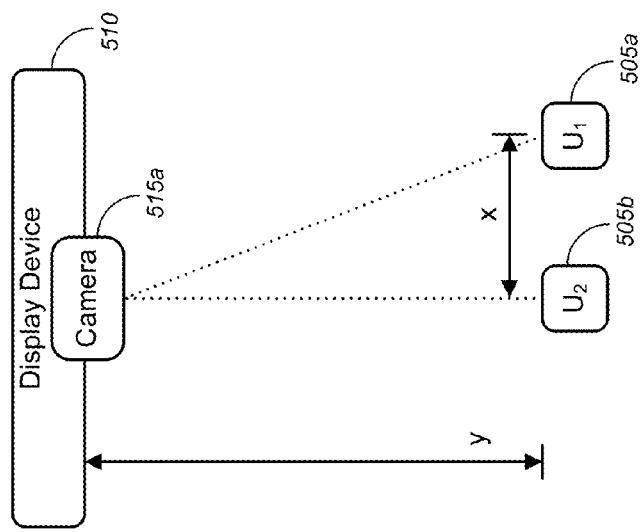

FIGS. 5A and 5B (collectively, "FIG. 5") are general schematic diagrams illustrating techniques for adjusting apparent fields of view of a display device for multiple users, in accordance with various embodiments. As illustrated by FIG. 5A, display side portion (shown in FIG. 5A) shows the side on which the users 505a and 505b (collectively, "users 505") are located and on which the display device 510 displays content (including, without limitation, images/video captured from the capture side, and/or the like) to the users 505. The position of the users 505 (and/or the users' eyes) may be tracked by camera 515a. The capture side portion (shown in FIG. 5B) shows the side on which another party to a video call is located or the side on which a live video stream is captured (or the like). The other party to the video call or the objects of the live video stream may be captured by camera 515b. The capture side shows the maximum field of view ("FOV") 520 (shown as a pair of solid lines in FIG. 5B) that the camera 515b captures, as well as the various FOVs 525 and 530 that the camera 515b captures in various situations for each of the users 505a and 505b.

On the display side (FIG. 5A), camera 515a might be used for determining the first user's 505a position relative to (a face of) display device 510 (and can be used to transmit video or other media content to the first user 505a, as well, for example, as part of a video call or the like). The horizontal position is relative to the display side camera 515a. In the display side portion of the figure (FIG. 5A), position $P_1$ indicates a horizontal offset (by distance x) from the centerline (which defines a line that is normal to a face of the camera 515a or that is normal to the face of the display device 510). The FOV 525 for this offset position is shown (as a pair of dot-dash lines) in the capture side figure (FIG. 5B). Likewise, camera 515a might be used for determining the second user's 505b position relative to (a face of) display device 510 (and can be used to transmit video or other media content to the second user 505b, as well, for example, as part of a video call or the like). In the display side portion of the figure (FIG. 5A), position $P_2$ is shown aligned with the centerline. The FOV 530 for this offset position is shown (as a pair of dash lines) in the capture side figure (FIG. 5B). In both these examples, the users 505 remain at a constant distance y from the display device 510 (although the various embodiments are not so limited, and the users 505 may be positioned one closer to the display device 510 compared to the other).

In some embodiments, in order for both users 505 to view the different FOVs 525 and 530, various techniques may be used, including, but not limited to, techniques such as the use of active glasses that, based at least in part on time synchronization with the display device 510, can allow one pair of active glasses (worn by one user) to receive one FOV, while the other pair of active glasses (worn by the other user) blocks that particular FOV, and vice versa, such that the eyes of each user only receives images/video corresponding to one set of FOV and not the other. Such a technique of using the active glasses to alternate between frames of displayed content to display different FOVs is described in detail below with respect to FIG. 8.

Figure 6:
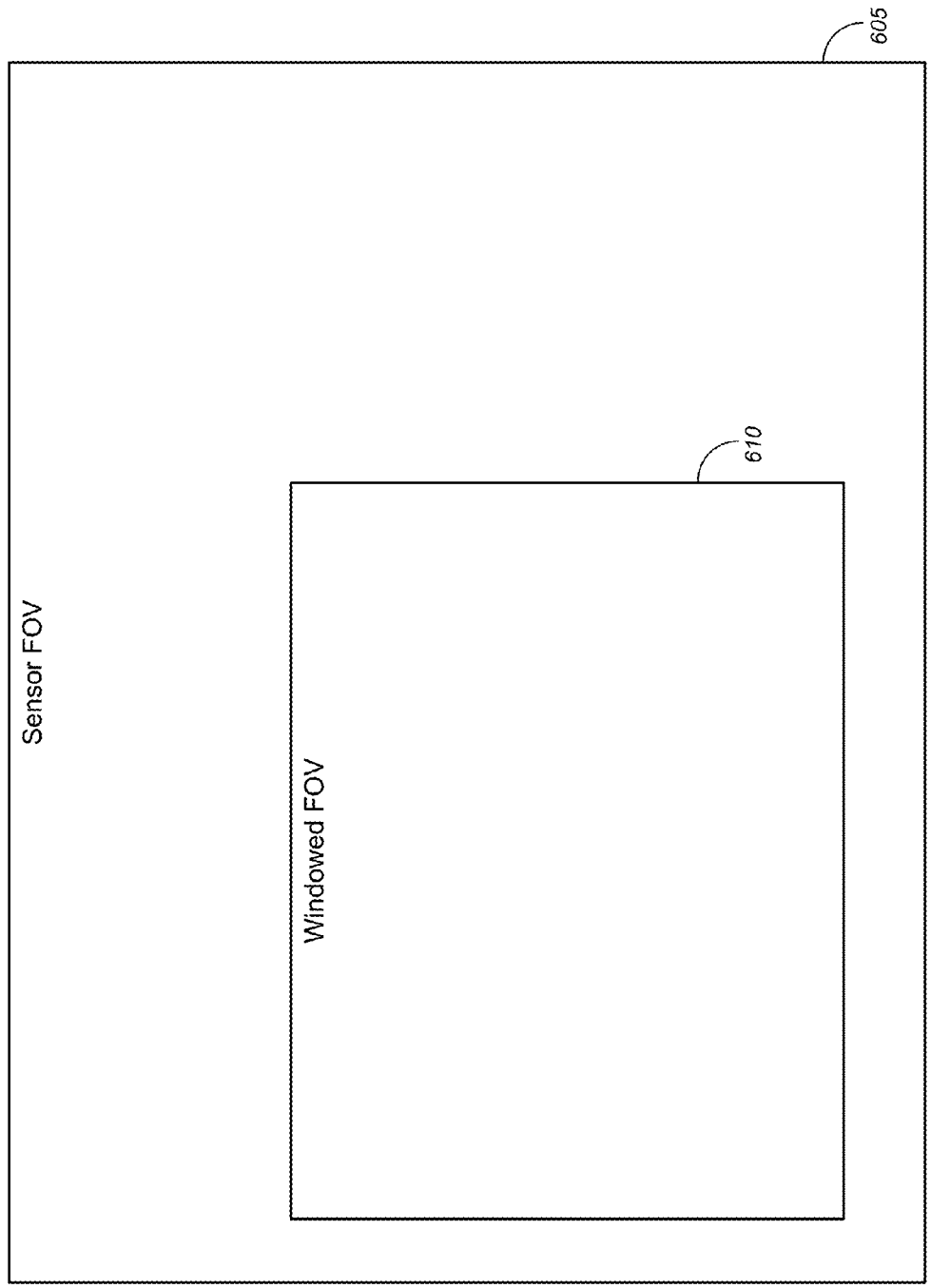
FIG. 6 is a general schematic diagram illustrating a windowed field of view in relation to a sensor field of view, in accordance with various embodiments.

Similar to the above, a number of techniques can be used to adjust a field of view ("FOV") to correspond to the viewer's position. One technique is the creation of a windowed field of view, as depicted by FIG. 6, which is a general schematic diagram illustrating a windowed field of view in relation to a sensor field of view, in accordance with various embodiments. In FIG. 6, a sensor field of view ("FOV") 605 is shown in relation to a windowed FOV 610. The sensor FOV 605 represents the FOV that is achieved by a sensor at the capture side, while the windowed FOV 610 represents the FOV that is displayed on a display device at the display side.

The video stream that is captured can be the entire FOV (referred to, in some embodiments herein, as "maximum field of view"), or can be a subset that is smaller and can be positioned arbitrarily (or to correspond to the viewer's position) within the full sensor field of view. This is denoted "windowed FOV" in FIG. 6. If the full FOV is captured, the video can be cropped to produce the desired windowed FOV.

Thus, one approach is to adjust the windowed FOV 610 on the capture side camera to something other than the full FOV and in a manner that corresponds to the position of the viewer's eyes on the display side. One way to do this is to send the coordinates of the viewer's eyes to the capture side. This could be done in a peer-to-peer fashion and/or might be facilitated via a server. Merely by way of example, in some embodiments, peer-to-peer sessions might be initiated using a server, and after a peer-to-peer session has been initiated or established by the server, the server may be by-passed, resulting in a direct peer-to-peer connection or session. This could also be done via networking protocols such as TCP, UDP, RTP, XMPP, SIP or others. Once the capture side camera has the coordinates of the viewer's eyes, the windowed FOV 610 (which in this case represents the camera's or sensor's FOV) can be adjusted accordingly, and the image that is seen on the display side would adjust based on the position of the viewer's eyes.

An alternative approach would be to have the capture side always send the full FOV 605 to the display side. With this approach, the video communications device on the display side would manipulate the video stream to display a windowed version that is a subset of the full FOV that corresponds to the position of the viewer's eyes. The advantage of this approach is that no additional network communication is required, and the latency between any view movements and the image adjustment on the display side would be reduced.

For example, as depicted by FIG. 6, the windowed FOV 610 is moved left when the user moves (and/or the user's eyes move) right, and/or is moved down when the user moves (and/or the user's eyes move) up. Similarly, although not shown, the windowed FOV 610 is moved right when the user moves (and/or the user's eyes move) left, and/or is moved up when the user moves (and/or the user's eyes move) down. Although not shown, the user (and/or the user's eyes) moving in any combination of left, right, up, and/or down relative to the display device will result in the windowed FOV 610 being moved in the corresponding combination of right, left, down, and/or up, respectively.

Yet another approach is to have a camera on the capture side that has a physical mechanism for the adjustment of the field of view (i.e., pan, tilt, and zoom, etc.). If the camera has such capability, then when the viewer's eyes' coordinates are sent across the network to the capture side, the camera's position can physically be adjusted (by any suitable combination of panning, tilting, zooming, and/or the like) to produce an image that is appropriate for the viewer's eyes. In some cases, the capture side device might feature an array of cameras (as shown, e.g., in FIG. 7B), which can expand the field of view that can be captured. The images from one or more cameras can be combined and processed to produce a larger field of view than a single camera alone (as shown, e.g., in FIG. 7A). Camera arrays can be used to form a composite image using the images from one or more camera. This composite image can have a virtual perspective that is different than any of the individual cameras. The virtual perspective can be set to create a perspective based on the location of the viewer. For example, the perspective can be with respect to the viewer and his or her display.

Figure 7A:
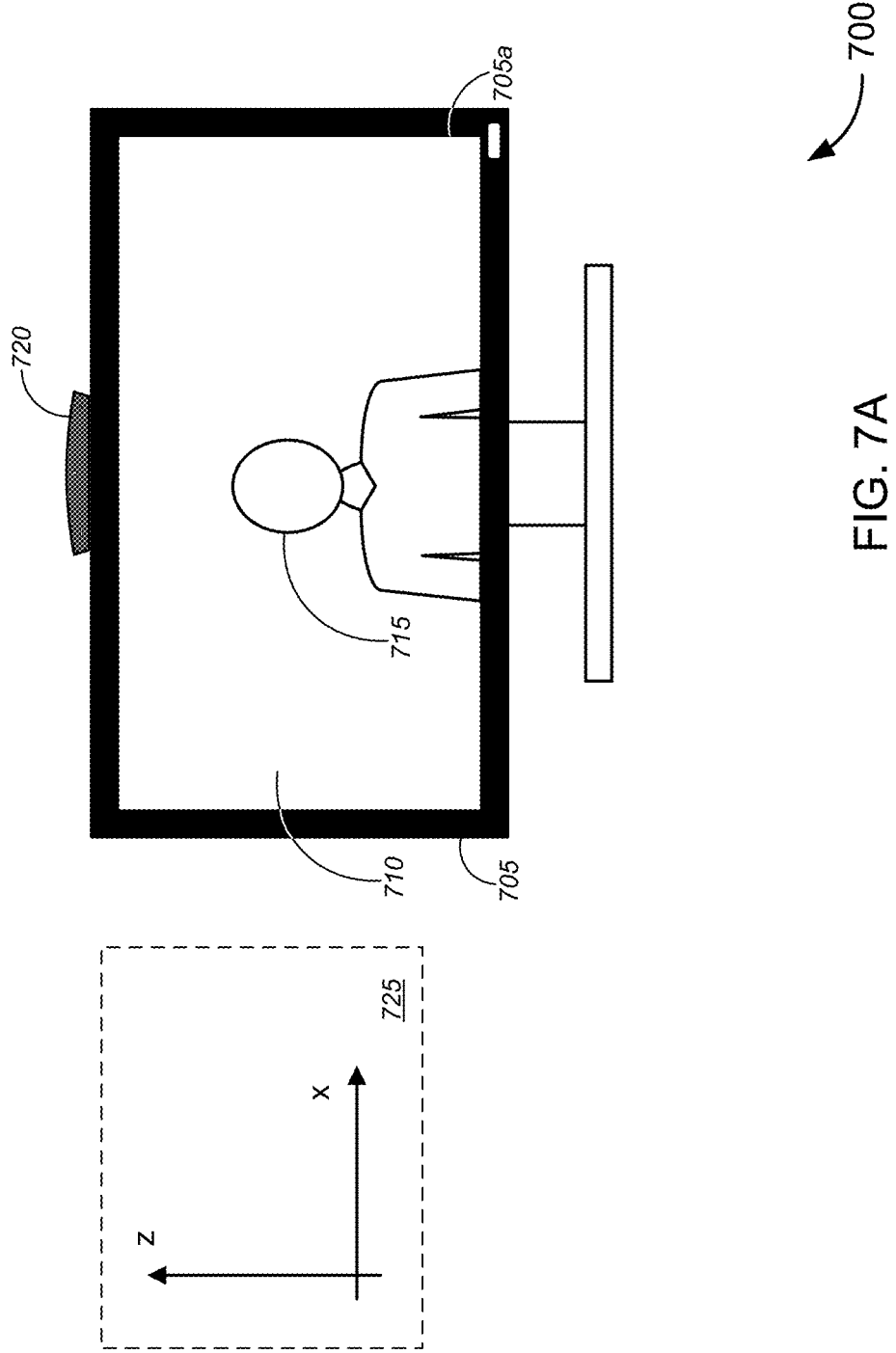
FIGS. 7A and 7B are general schematic diagrams illustrating a display device in use with one or more image capture devices, in accordance with various embodiments.
Figure 7B:
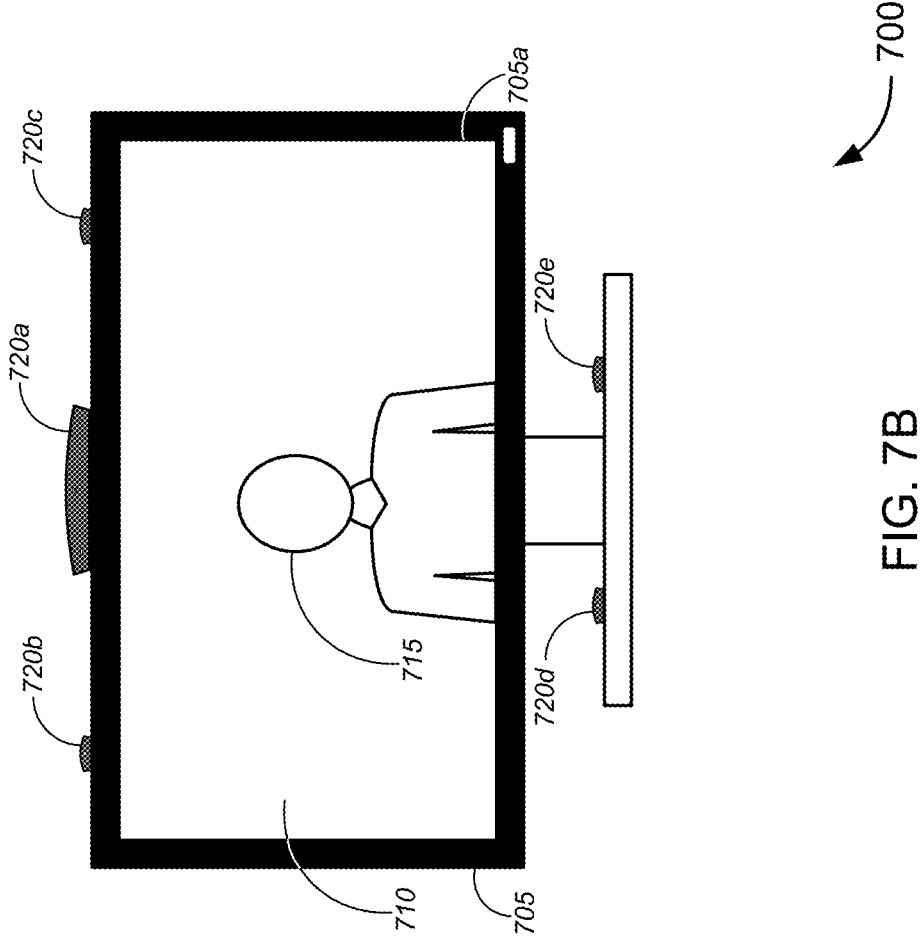

FIGS. 7A and 7B (collectively, "FIG. 7") are general schematic diagrams illustrating a display device 700 in use with one or more image capture devices, in accordance with various embodiments. In FIG. 7, display device 700 might comprise housing 705, display screen 705a, displayed or windowed FOV 710, image-captured object(s) 715 (which in the embodiments shown in FIG. 7 might include a call participant in a video call, or the like). Also shown in FIG. 7 are one or more image capture devices ("ICDs") or cameras 720; in FIG. 7A, a single ICD or camera 720 is shown, while, in FIG. 7B, a plurality of ICDs or cameras 720 are shown (although five ICDs or cameras 720a-720e are shown, this is merely for illustration, and any suitable number of ICDs or cameras 720 may be used). As described above, multiple ICDs or cameras 720 (which may be arranged in an array(s)) can be used to form a composite image using the images captured by the plurality of ICDs or cameras 720. The composite image may represent one frame in a series of frames of a video (such as in a video call, movie content, television content, live video stream, etc.).

Also shown in FIG. 7A is a plane 725 that is parallel to a plane defined by (the screen 705a or face of) the display device 700. Axes x and z represent the horizontal and vertical axes, respectively. In some embodiments, determining a position of a first user (who might be a viewer or a first party to a video call, or the like) might comprise determining a horizontal position of the first user in a horizontal dimension (e.g., along the x-axis) of the plane 725, which is parallel to the face of the display device. In such embodiments, adjusting an apparent or windowed FOV might comprise panning the video in a horizontal direction (i.e., along the x-axis) or moving the windowed FOV in the horizontal direction, based on the determined horizontal position of the first user. In particular, when the user moves (and/or the user's eyes move) right along the positive x direction, the windowed FOV is moved left (along the negative x direction), and vice versa. In a similar manner, determining a position of the first user might comprise determining a horizontal position of the first user in a vertical dimension (e.g., along the z-axis) of the plane 725, which is parallel to the face of the display device. In such embodiments, adjusting an apparent or windowed FOV might comprise panning the video in a vertical direction (i.e., along the z-axis; sometimes referred to as "tilting") or moving the windowed FOV in the vertical direction, based on the determined vertical position of the first user. In particular, when the user moves (and/or the user's eyes move) up along the positive z direction, the windowed FOV is moved down (along the negative z direction), and vice versa.

Figure 8:
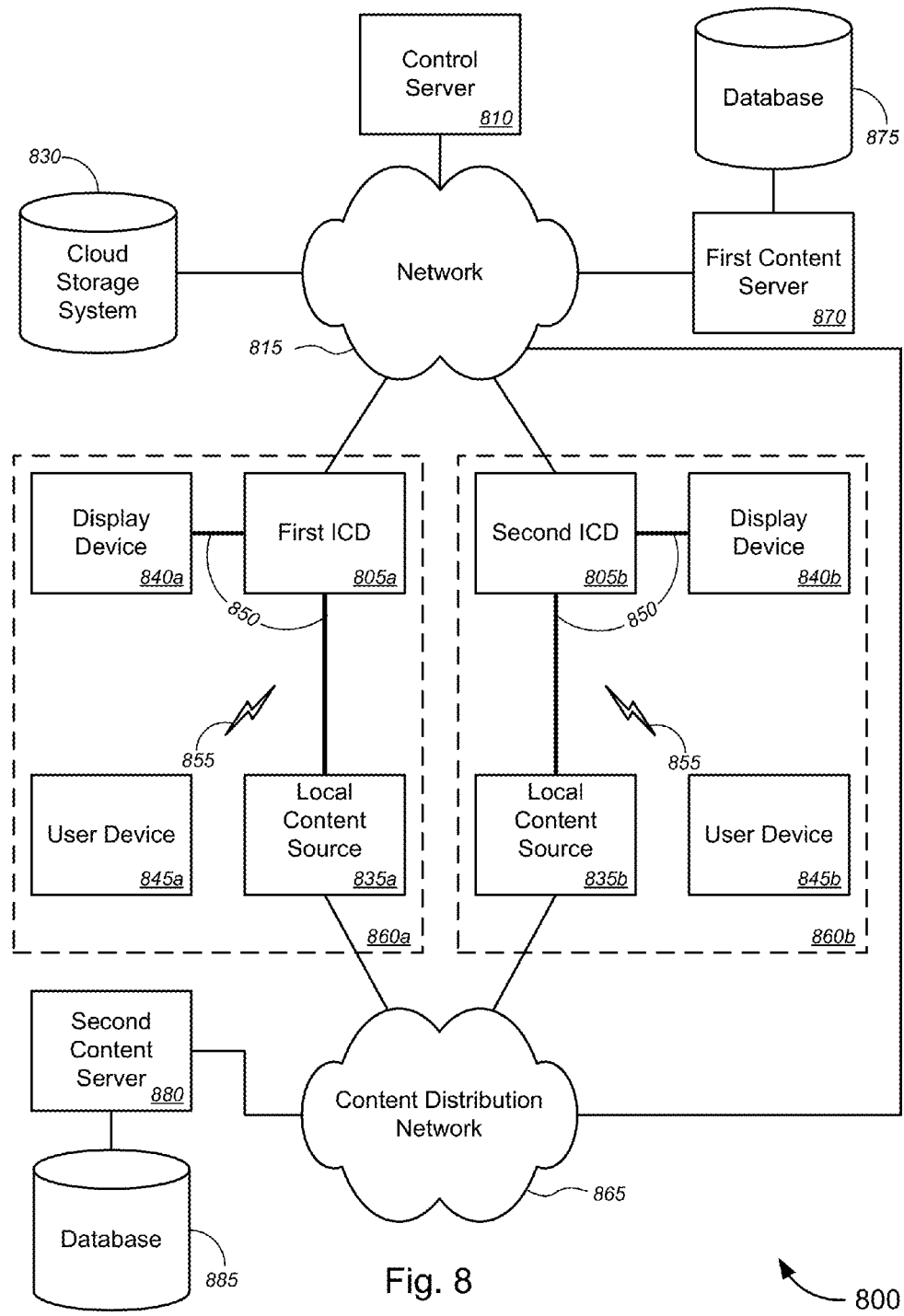
FIG. 8 is a block diagram illustrating another system for modifying an apparent view(s) of displayed content, based at least in part on sensed presence and/or determined position(s) of a user in a room, in accordance with various embodiments.

We now turn to FIG. 8, which illustrates a functional diagram of a system 800 for modifying an apparent view(s) of displayed content, based at least in part on sensed presence and/or determined position(s) of a user in a room, in accordance with one set of embodiments. The skilled reader should note that the arrangement of the components illustrated in FIG. 8 is functional in nature, and that various embodiments can employ a variety of different structural architectures. Merely by way of example, one exemplary, generalized architecture for the system 800 is described below with respect to FIG. 8, but any number of suitable hardware arrangements can be employed in accordance with different embodiments.

In FIG. 8, an ICD 805 might correspond to ICD 105, video calling device 105, and/or PDD 105, while user device 845 might correspond to non-ICD user device 105, non-video calling device user device 105, or non-PDD user device 105, as described in detail above with respect to FIG. 1. Control server 810, network 815, and cloud storage system 830, in the example of FIG. 8, might correspond to control server 110, network 115, and cloud storage system 130, respectively, as described in detail above with respect to FIG. 1.

System 800 might further comprise a local content source 835 (e.g., a local content source as described above), a display device 840 (including, without limitation, a television ("TV"), a computer monitor, and/or the like), and high-definition ("HD") data cables 850 (or any other suitable data transmission media). In some cases, the HD data cables 850 might include, without limitation, high-definition multimedia interface ("HDMI") cables. One or more of the ICDs 805 (e.g., the first ICD 805*a* and the second ICD 805*b*, as shown in FIG. 8) might be configured to provide pass-through audio and/or video from a local content source 835 to a display device 840 (e.g., using data cables 850). Merely by way of example, in some embodiments, an HDMI input port in the ICD 805 allows HD signals to be input from the corresponding local content source 835, and an HDMI output port in the ICD 805 allows HD signals to be output from the PDD 805 to the corresponding display device 840 (e.g., TV, which might include, but is not limited to, an Internet Protocol TV ("IPTV"), an HDTV, a cable TV, or the like). The output HD signal may, in some cases, be the input HD signal modified by the ICD 805. Local content source 835 might be any suitable local content source. An noted above, a local content source can be any device that provides an audio or video stream to a display device and thus can include, without limitation, a cable or satellite STB, an IPTV STB, devices that generate video and/or audio, and/or acquire video and/or audio from other sources, such as the Internet, and provide that video/audio to a display device; hence a local content source can include devices such as a video game console, a Roku® streaming media player, an AppleTV®, and/or the like. Hence, when situated functionally inline between a local content source and a display device, the ICD 805 can receive an audiovisual stream output from the local content source, modify that audiovisual stream in accordance with the methods described in the '182 patent, and provide the (perhaps modified) audiovisual stream as input to the display device 840. In some embodiments, first ICD 805*a*, local content source 835*a*, display device 840*a*, and user device 845*a* (if any) might be located at a first customer premises 860*a*, while second ICD 805*b*, local content source 835*b*, display device 840*b*, and user device 845*b* (if any) might be located at a second customer premises 860*b*. According to some embodiments, a user device 845 might be located at a customer premises 860 or might be a portable user device (including, without limitation, a tablet computer, a laptop computer, a smart phone, a mobile phone, a portable gaming device, and/or the like) that is not bound to any particular customer premises 860, and the like.

According to some embodiments, system 800 might further comprise one or more access points (not shown), each of which might be located in proximity to or in the first customer premises 860*a* or the second customer premises 860*b*. The access point(s) can allow wireless communication between each ICD 805 and network 815. (Of course, an ICD 805 might also have a wired connection to an access point, router, residential gateway, etc., such as via an Ethernet cable, which can provide similar communication functionality.) In some cases (as shown), each ICD 805 might be communicatively coupled to network 815 (via either wired or wireless connection), without routing through any access points. In some cases, wired or wireless access to network 815 allows ICD 805 to obtain profiles from cloud storage system 830, media content from first content server 870 and/or database 875 that are independent of the corresponding local content source 835, which is in communication with a content distribution network 865 (either via wireless connection or via wired connection). In some cases, content distribution network 865 (which could be, for example, a cable television distribution network, a satellite television distribution network, an Internet Protocol television ("IPTV") distribution network, and/or the like) might be communicatively coupled with second content server 880, and thus local content source 835 might obtain media content from second content server 880 and media content database 885 independently of ICD 805. Alternatively or in addition, the content distribution network 865 might be communicatively coupled to other content servers (e.g., first content server 870 or the like) and/or other media content sources (e.g., database 875 or the like).

In this manner, ICD 805 can overlay the input signal from the corresponding local content source 835 with additional media content to produce an augmented output HD signal to the corresponding display device 840 via data cables 850. This functionality allows for supplemental content (which may be associated with the media content accessed by the local content source 835 for display on display device 840) to be accessed and presented using the first ICD 805, in some cases, as a combined presentation on the display device 840, which may be one of an overlay arrangement (e.g., a picture-in-picture ("PIP") display, with the supplemental content overlaid on the main content), a split screen arrangement (with the supplemental content adjacent to, but not obscuring, any portion of the main content), a passive banner stream (with non-interactive supplemental content streaming in a banner(s) along one or more of a top, bottom, left, or right edge of a display field in which the main content is displayed on display device 840), and/or an interactive banner stream (with interactive supplemental content streaming in a banner(s) along one or more of a top, bottom, left, or right edge of a display field in which the main content is displayed on display device 840). Herein, examples of interactive supplemental content might include, without limitation, content that when streamed in a banner can be caused to slow, stop, and/or replay within the banner, in response to user interaction with the content and/or the banner (as opposed to passive banner streaming, in which information is streamed in a manner uncontrollable by the user). The interactive supplemental content that is streamed in the banner may, in some instances, also allow the user to invoke operations or functions by interacting therewith; for example, by the user highlighting and/or selecting the supplemental content (e.g., an icon or still photograph of a character, actor/actress, scene, etc. associated with the main content), links for related webpages, links to further content stored in media content database 875, or operations to display related content on display device 840 and/or user device 845 may be invoked. In some embodiments, the interactive supplemental content might include notifications or messages relating to recommendations of media content, the determination and generation of which are described in detail above. According to some embodiments, the interactive supplemental content (whether related or unrelated to the media content being presented) might include advertisement content.

In some instances, ICD 805 might detect the presence and/or proximity of one or more user devices 845 associated with the user, and might (based on user profile information associated with the user that is stored, e.g., in cloud storage system 830) automatically send supplemental media content via wireless link 855 (directly from ICD 805 or indirectly via an access point (not shown)) for display on a display screen(s) of the one or more user devices 845. In one non-limiting example, a user associated with first ICD 805*a* might have established a user profile stored in cloud storage system 830 that indicates a user preference for any and all supplemental content for movies and television programs to be compiled and displayed on one or more user devices 845*a* (including, but not limited to, a tablet computer, a smart phone, a laptop computer, and/or a desktop computer, etc.) concurrent to display of the movie or television program being displayed on display device 840*a*. In such a case, when a movie is playing on display device 840*a* broadcast or streamed via local content source 835*a* from content server 870 and media content database 875 (and/or from some other content server and some other media content source) via network 865, first ICD 805*a* accesses supplemental content (if available) from content server 870 and media content database 875 via network 815, and sends the supplemental content to the user's tablet computer and/or smart phone via wireless link(s) 855. For example, bios of actors, actresses, and/or crew might be sent to the user's smart phone for display on the screen thereof, while schematics of machines, weapons, robots, tools, etc. associated with the movie or television show might be sent to and displayed on the user's tablet computer, behind the scenes videos or information, news/reviews associated with the main content, and/or music videos associated with the main content may also be sent to the user's smart phone and/or tablet computer, and so on.

Merely by way of example, in some embodiments, first media content might be received by local content source 835*a* (in customer premises 860*a*) from media content database 875*b* via content server 870 and content distribution network 865. The first ICD 805*a* might provide pass through capability for displaying video aspects (in some cases audio aspects as well) of the first media content from the local content source 835*a*. As the first media content passes through the first ICD 805*a*, the first ICD 805*a* might monitor the media content, and might generate or select advertisements based at least in part on the monitored media content. Alternatively, or in addition, the first ICD 805*a* might comprise sensors (e.g., camera, microphone, proximity sensors, user device sensors, communications links, etc.) that monitor the user(s) within the same room, e.g., to monitor or track reactions of each user (including, but not limited to, vocal expressions or outbursts, facial expressions, hand gestures, body gestures, eye movement, eye focus, shift in proximity with respect to the PDD, and/or the like), using any number or combination of techniques, including, without limitation, facial recognition techniques, facial expression recognition techniques, mood recognition techniques, emotion recognition techniques, voice recognition techniques, vocal tone recognition techniques, speech recognition techniques, eye movement tracking techniques, eye focus determination techniques, proximity detection techniques, and/or the like. The first ICD 805*a* might determine advertisements based at least in part on the monitored reactions of each user.

In some instances, the first ICD 805*a* might send the information associated with the monitored media content and/or information associated with the monitored reactions of each user to control server 810 over network 815, and control server 810 might determine or generate recommendations for media content, based at least in part on the monitored media content and/or based at least in part on the monitored reactions of each user, which is described in detail (along with other embodiments of media content recommendation, or the like) in the '435 Application (already incorporated herein by reference in its entirety). In some embodiments, control server 810 might determine (i.e., select and/or generate) advertisements based at least in part on the monitored media content and/or based at least in part on the monitored reactions of each user, which is described in detail (along with other embodiments of advertisement determination, or the like) in the '133 and '603 Applications (already incorporated herein by reference in their entirety).

According to some embodiments, the detection of the presence of the user device 845 by the first ICD 805*a* or the second ICD 805*b* might allow identification of a user and thus access of profiles, content, and/or messages and notifications associated with the user's account, regardless of whether the first ICD 805*a* or the second ICD 805*b* is owned by and/or associated with the user. Herein, the user's media content might include, without limitation, at least one of purchased video content, purchased audio content, purchased video game, purchased image content, rented video content, rented audio content, rented video game, rented image content, user-generated video content, user-generated audio content, user-generated video game content, user generated image content, and/or free media content, while the user's profiles might include, but is not limited to, one or more of user profile information for a video game or video game console, web browser history and/or bookmarks, contact information for the user's contacts, user profile information for video or audio content, including without limitation recommended content, device preferences, messaging preferences, videomail preferences, user profile information for cloud services, and/or the like. Videomail, herein, might refer to videomail messages addressed to the user or callee. In some cases, the user's profile might also include identifying information—including, but not limited to, the user's biometric information (e.g., facial characteristics, voice characteristics, fingerprint characteristics, iris characteristics, pupil characteristics, retinal characteristics, etc.), user's past monitored reactions (e.g., vocal expressions or outbursts, facial expressions, hand gestures, body gestures, eye movement, eye focus, shift in proximity with respect to the PDD, and/or the like), or the like. In some examples, the user profile information for cloud services might include user log-in information (e.g., username, account number, and/or password/passphrase, etc.) or other suitable credentials for cloud services, which might include, without limitation, video calling service, videomail service, voice calling service, video broadcast/streaming service, audio broadcast/streaming service, on-line gaming service, banking/financial services, travel/accommodation/rental vehicle services, and/or dining/entertainment event reservation/ticketing services, or the like.

In one example, a user might be associated with first ICD 805*a* (located in the first customer premises 860*a*), while her friend might be associated with second ICD 805*b* (located in the second customer premises 860*b*), and the user and the friend are both subscribers of a similar service provided by control server 810 and/or the cloud service provider associated with control server 810. When the user visits her friend, the friend's ICD 805*b* might first detect presence of the user, by querying and/or obtaining the identification information for the user's smart phone and/or tablet computer or the like, by capturing video, image, and/or voice data of the user, by infrared detection of a living person in the room, and/or by audio detection of a living person in the room, etc. The friend's ICD 805*b* might then identify the user using the user's device(s) identification information and/or the captured video, image, and/or voice data, or might send such presence information to control server 810 for identification and authentication analysis. In some cases, detecting presence of, or identifying/authenticating, the user might include, without limitation, analyzing captured images or video segments using one or more of facial recognition software, pupil/iris recognition software, retinal identification software, fingerprint analysis software, and/or physiology recognition software, analyzing captured audio samples using one or more of voiceprint analysis and/or comparison with stored challenge/response information, and/or identification of a user device owned by and/or associated with the user (e.g., based on identification information of the device, which may be previously associated with the user or the user's profile(s), etc.). In terms of detection of the presence of the user's device, any suitable technique may be implemented including, but not limited to, at least one of detecting a Bluetooth connection of the user device, detecting that the user device is associated with a WiFi access point with which the video calling device has associated, and/or communicating with the user device using near field communication ("NFC").

Once the user has been identified and authenticated, control server 810 might send copies of the user's profiles and/or content to the second ICD 805*b* (either from first ICD 805*a* and/or from cloud storage system 830, or the like), or at least provide the user with access to her profiles, notifications of media content recommendations, notification of determined advertisements, preferences for advertisements, videomail, and/or content from her friend's ICD 805*b*. In some embodiments, the identification and authentication processes might include comparing the user device identification information and/or the captured video, image, and/or voice data against all similar identification data for all users/subscribers of the cloud service that are stored in cloud storage system 830. In some cases, the process might be facilitated where ICDs 805*a* and 805*b* might already be associated with each other (e.g., where the user has previously made a video call from first ICD 805*a* to her friend on second ICD 805*b*, where the user might have added the friend to the user's contact list, and/or where the friend might have added the user to the friend's contact list). In other cases, the user's first ICD 805*a* might have access to the user's calendar and/or communications, which might indicate that the user is visiting the friend. The first ICD 805*a* might query control server 810 to determine whether the friend has an ICD 805*b* associated with the cloud service provider. In this example, the first ICD 805*a* determines that second ICD 805*b* is part of the same service and/or is in communication with control server 810, and based on such determination, first ICD 805*a* (and/or control server 810) might send the user's profiles and/or content to second ICD 805*b*, and/or provide second ICD 805*b* with access to the user's profiles, notifications of media content recommendations, notifications of determined advertisements, preferences for advertisements, videomail, and/or content. In some embodiments, the user's profiles, notifications of media content recommendations, notifications of determined advertisements, preferences for advertisements, videomail, and/or content, or access to profiles, notifications of media content recommendations, notifications of determined advertisements, preferences for advertisements, videomail, and/or content, might be encrypted, and might be released/decrypted upon identification and/or authentication by second ICD 805*b* (and/or by control server 810) when the user is detected by second ICD 805*b*. In this manner, the user's profiles, notifications of media content recommendations, notifications of determined advertisements, preferences for advertisements, videomail, and/or content can follow the user wherever she goes, so long as there is a device (e.g., PDD or video calling device) that is associated with the same or affiliate cloud service provider at her destination, and so long as the device can recognize and authenticate the user.

By the same token, if the user is no longer detected by the second ICD 805*b*, either after a predetermined number of prompts or queries for the user and/or after a predetermined period of time (e.g., after a specified number of minutes, hours, days, weeks, months, etc.), second ICD 805*b* (and/or control server 810) might determine that the user is no longer present at the location of second ICD 805*b*. Based on such a determination, second ICD 805*b* and/or control server 810 might remove the user's profiles, notifications of media content recommendations, notifications of determined advertisements, preferences for advertisements, videomail, and/or media content (or access thereto) from second ICD 805*b*. As described above, a time-out system might be utilized. Alternatively, other suitable systems may be used for determining the user is no longer present, and removing the user's profiles, notifications of media content recommendations, notifications of determined advertisements, preferences for advertisements, videomail, and/or media content (or access thereto) from the second ICD 805*b*. In some cases, once the user is determined to no longer be present at the location of the second ICD 805*b*, the system might either stop presenting the advertisement(s) (if currently being presented) or not present the advertisement(s) (if not yet presented).

In some embodiments, system 800 might provide virtual window functionality. In other words, system 800 might modify an apparent view(s) of displayed content, based at least in part on sensed presence and/or determined position(s) of a user in a room. For example, in the case of media content presentation (e.g., presentation of one of movie content, television program content, video content, image content, gaming content, and/or the like), first ICD 805*a* might determine or collect presence and/or position information about a user with respect to the display device 840*a*. In some cases, first ICD 805*a* and/or control server 810 might modify an apparent view of the media content (either from first content server 870 and database 875 via network 815 or from second content server 880 and database 885 via local content source 835*a* and network 865, or the like) that is displayed on display device 840*a*, based at least in part on the position information of the user, similar to the techniques as described above with respect to FIGS. 1-7.

For example, if the user moves closer to the display device 840*a*, the first ICD 805*a* might determine and/or collect the changed position of the user relative to the display device 840*a*, and the first ICD 805*a* and/or the control server 810 might modify the apparent view of the media content displayed on display device 840*a* by increasing the apparent field of view of the media content displayed. Conversely, if the user moves further away from the display device 840*a*, the first ICD 805*a* might determine and/or collect the changed position of the user relative to the display device 840*a*, and the first ICD 805*a* and/or the control server 810 might modify the apparent view of the media content displayed on display device 840*a* by decreasing the apparent field of view of the media content displayed. If the user moves left with respect to the display device 840*a*, the first ICD 805*a* might determine and/or collect the changed position of the user relative to the display device 840*a*, and the first ICD 805*a* and/or the control server 810 might modify the apparent view of the media content displayed on display device 840*a* by proportionally changing the apparent field of view of the media content displayed toward the right (in some cases, by proportionally changing an apparent perspective of the media content toward the right; herein, changing an apparent perspective of the media content might include changing the apparent field of view such that the apparent view of the media content is panned or tilted with respect to a previous apparent view of the media content, or otherwise modifying the apparent so that the image/video displayed appears to have been captured from a different angle). If the user moves right with respect to the display device 840*a*, the first ICD 805*a* might determine and/or collect the changed position of the user relative to the display device 840*a*, and the first ICD 805*a* and/or the control server 810 might modify the apparent view of the media content displayed on display device 840*a* by proportionally changing the apparent field of view of the media content displayed toward the left (in some cases, by proportionally changing an apparent perspective of the media content toward the left).

According to some embodiments, the user may move in any combination of closer/further, left/right, up/down, and/or the like with respect to display device 840*a*, over a period of time (e.g., during presentation of at least a portion, if not the entirety, of the media content), and the ICD 805*a* can track such movements, and the ICD 805*a* and the control server 810 can modify the apparent view of the displayed media content accordingly (despite the combination of the movements), such that the resultant apparent fields of view track the movements of the user, to provide a more natural display, not unlike looking out a physical window while changing one's position relative to the window (hence, in some cases, the display device that displays modified or adjusted apparent views of content according to this technique might be referred to as a "virtual window"). In some cases, the modification of the apparent view of the displayed media content might be performed in real-time or near real-time (i.e., with minimal, almost imperceptible lag).

For video calls, similar virtual window functionality may be achieved in a similar manner. Here, the ICD 805 associated with the particular call participant might determine and/or collect presence information about the corresponding call participant, and the particular ICD and/or control server 810 might modify the apparent view of the corresponding video feed of the other call participant accordingly. In a non-limiting example, a caller at the first customer premises 860*a* might initiate, using first ICD 805*a*, a video call with a callee at the second customer premises 860*b*. After the video call has been established between first ICD 805*a* and second ICD 805*b* (perhaps via control server 810 and network 815), first ICD 805*a* might display video feeds of the callee on display device 840*a*, while second ICD 805*b* might display video feeds of the caller on display device 840*b*. During the call, the caller might shift position with respect to display device 840*a* (say, for example, moving a bit closer and to the left with respect to the display device 840*a*). First ICD 805*a* might track this movement, and first ICD 805*a* and/or control server 810 might modify the apparent view of the callee displayed on display device 840*a* in one of several ways. In one set of embodiments, modifying the apparent view might include, but is not limited to, sending instructions to second ICD 805*b* to perform at least one of panning to the right, zooming in on the callee, and/or increasing the apparent field of view. In another set of embodiments, second ICD 805*b* might normally send a maximum field of view to the first ICD 805*a* and/or control server 810, which might normally reduce the apparent field of view prior to displaying the video feed on display device 840*a*. In such cases, modifying the apparent view might include, without limitation, changing the apparent field of view by taking the maximum field of view that is sent from second ICD 805*b*, by simulating the at least one of panning to the right, zooming in on the callee, and/or increasing the apparent field of view.

Likewise, if the callee changes her position with respect to display device 840*b*, second ICD 805*b* might track the movement, and second ICD 805*b* and/or control server 810 might modify the apparent view of the caller displayed on display device 840*b* in a similar manner as described above with respect to the modification of the apparent view of the callee displayed on display device 840*a*.

In some embodiments, rather than a single camera or single image capture device 805 being used at each of the customer premises 860, multiple cameras or multiple image capture devices (in some cases, arranged in an array(s)) may be used, and a composite image/video with composite field of view (both maximum and displayed) may be generated (either by ICD 805 and/or by control server 810). In such embodiments, modification of the apparent view may be performed by modifying the composite image/video and/or modifying the composite field of view, or the like. In order for the composite image/video and/or the composite field of view to appear to be a single coherent image/video and/or composite field of view from a single image capture device, some image processing of the image or frames of the video might be necessary to ensure that stitching of the different images/frames of video is seamless. This is especially important for three-dimensional ("3-D") images/video having been collected or captured by different image capture devices (and thus have different fields of view).

Merely by way of example, although the above embodiments have been described with respect to single users for each ICD 805 (or each display device 840), the various embodiments are not so limited, and multiple users or viewers may be accommodated. In some embodiments, to accommodate multiple users, techniques not unlike those used for 3-D televisions or 3-D movies may be implemented. In one non-limiting example, each user viewing a display device 840 might wear glasses, not unlike active 3-D glasses. For active glasses, the glasses might each be in wireless communication (e.g., infrared communication, Bluetooth communication, WiFi communication, and/or the like) with the ICD 805, and the timing of each device may be synchronized by the ICD 805. A first viewer might wear a first pair of active glasses, while a second viewer might wear a second pair of active glasses, and a third viewer might wear a third pair of glasses. In one set of non-limiting examples, the ICD 805 might send a first frame of video to be displayed on the display device 840, and while the first frame of video is displayed, the first pair of active glasses might be set to not block (i.e., to allow) light that is received from the frame, but each of the second and third pairs of active glasses might be set to block the light received from the frame. The ICD 805 might then send a second frame of video to be displayed on the display device 840, and while the second frame of video is displayed, the second pair of active glasses might be set to not block (i.e., to allow) light that is received from the frame, but each of the first and third pairs of active glasses might be set to block the light received from the frame. In a similar manner, the ICD 805 might send a third frame of video to be displayed on the display device 840, and while the third frame of video is displayed, the third pair of active glasses might be set to not block (i.e., to allow) light that is received from the frame, but each of the first and second pairs of active glasses might be set to block the light received from the frame. The fourth frame of video might be treated in the same manner as the first frame, while the fifth frame might be treated in the same manner as the second frame, and the sixth frame might be treated in the same manner as the third frame, and so on.

Each of the frames of video might be modified in a manner similar to the above that takes into account the relative positions of each of the first through third viewers relative to display device 840. In this way, to the first viewer, the displayed and perceived images through the display device 840 and through the first pair of glasses closely reflect an apparent field of view as if the first viewer was looking through a real window (or in this case, a virtual window) despite moving relative to the window. The second and third viewers might perceive similar effects from their respectively positions relative to the display device 840.

Although this set of examples describes the system applying to only three viewers, the various embodiments are not so limited, and any suitable number of viewers may be used (say, n users). For n users, the first user might receive through the first active glasses first, $(n+1)^{th}$, etc. frames of the video, while the $n^{th}$ user might receive through the $n^{th}$ active glass $n^{th}$, $2n^{th}$, etc. frames of the video. The ICD 805 may also adjust the frame rate to ensure seamless display of the video. Currently, for example, 24 frames per second (or 24 Hz) is a standard frame rate for film, 60i (or interlaced, which is effectively about 30 frames per second) is a current standard frame rate for U.S. television broadcasts, 50p or 60p (or progressive, which is effectively about 50 or 60 frames per second) is currently used in high-end HDTV systems, and so on. Higher frame rates (as well as other frame rates) are also being tested. The ICD 805, in some cases, might adjust the overall frame rate to be higher, in order to account for the n viewers, such that each viewer receives an effective frame rate that is one of the same as, half of, a third of, a quarter of, or a fifth of one of these frame rates, or the like.

In some cases, for video calls, one side might have a single user, while the other side might have multiple users. The single-user side might function in a manner similar to that as described above for single users, while the multiple-user side might function in a manner similar to that as described above for multiple users. In some cases, both sides of the video calls might have multiple, but different numbers of users (for example, one side might have n users, while the other has m users, or the like). In most cases, the ICD 805 might determine whether a multiple-user situation exists, by determining presence of more than one user, and in some instances determining with eye tracking techniques how many users are actually viewing the display device 840. The ICD 805 then appropriately signals active glasses of the users to appropriately delivery the appropriate frames of the video to each user to allow for individualized perceptions of the virtual window, as described in detail above.

For multi-party video calls, similar techniques might apply. For example, in a 3-party video call, each display device might be split into two panels, each showing one of the other 2 parties. In such cases, depending on the positions on the display device in which each panel is arranged, the apparent view of each panel might be modified accordingly. For instance, if the panels are arranged side by side, the center of each panel would be off-center with respect to the display device, and the ICD 805 and/or the control server 810 might modify the field of view of the left panel as if the viewer was shifted to the right, and might modify the field of view of the right panel as if the viewer was shifted to the left. For panels that are arranged one on top of the other, the ICD 805 and/or the control server 810 might determine the relational positions of the viewer's eyes with respect to the centers of each of the panels, and might modify the apparent views displayed in the panels accordingly. Although the example above only discusses a 3-party call, any number of parties may be on the video call (and any number of participants may be present at each party's location). Although these examples are directed to adjacent and aligned panels, the various embodiments are not so limited, and the panels may be arranged in any relative position on the display screen with respect to each other. In some cases, one panel might be made smaller than another panel, or the like.

According to some embodiments, 3-D video content may similarly be displayed to a single viewer or to multiple viewers. For a single user, half of the frames might be directed to the left eye of the user, while the other half of the frames might be directed to the right eye of the user, in alternating fashion. For multiple viewers, for each of the frames described above for the n viewers, two frames would be permitted to pass through each viewer's pair of active glasses (one to only the left eye of the viewer and the other to only the right eye of the viewer). The left eye view and the right eye view would be appropriately generated and/or modified such that the combined frames by the two eye views provide the desired depth information to form 3-D views.

Figure 9:
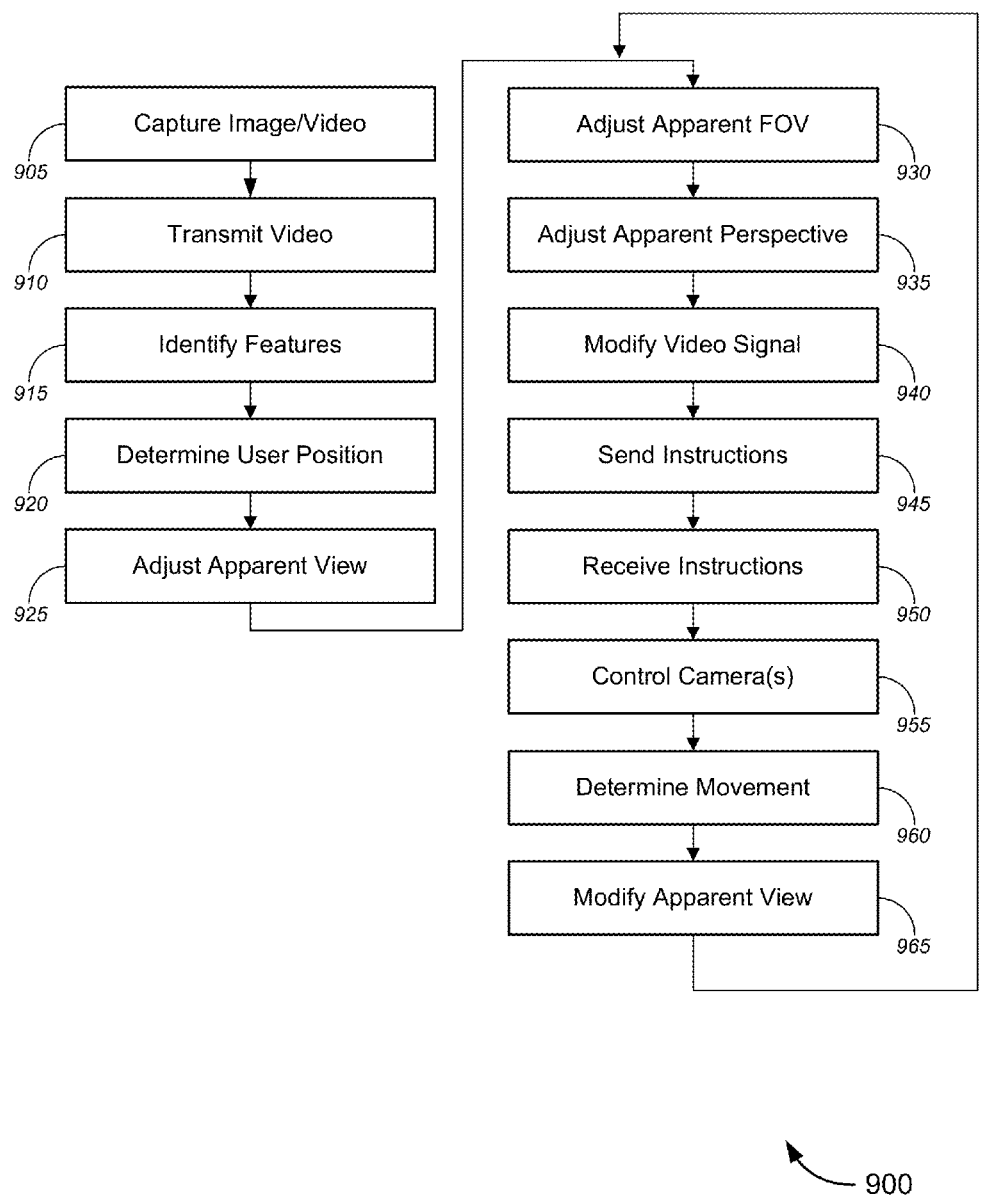
FIG. 9 is a process flow diagram illustrating a method of providing a virtual window or for modifying an apparent view(s) of displayed content, based at least in part on sensed presence and/or determined position(s) of a user in a room, in accordance with various embodiments.

FIG. 9 is a process flow diagram illustrating a method 900 of providing a virtual window or for modifying an apparent view(s) of displayed content, based at least in part on sensed presence and/or determined position(s) of a user in a room, in accordance with various embodiments. While the techniques and procedures of FIG. 9 are depicted and/or described in a certain order for purposes of illustration, it should be appreciated that certain procedures may be reordered and/or omitted within the scope of various embodiments. Moreover, while the method illustrated by FIG. 9 can be implemented by (and, in some cases, are described below with respect to) the systems 100, 1000, and/or 1100 of FIGS. 1, 10, and/or 11, respectively (or components thereof), these methods may also be implemented using any suitable hardware implementation. Similarly, while each of the system 100 (and/or components thereof) of FIG. 1, the system 1000 (and/or components thereof) of FIG. 10, and/or the system 1100 (and/or components thereof) of FIG. 11 can operate according to the method illustrated by FIG. 9 (e.g., by executing instructions embodied on a computer readable medium), the systems 100, 1000, and/or 1100 can also operate according to other modes of operation and/or perform other suitable procedures.

According to some embodiments, the method 900 might comprise, at block 905, capturing (e.g., with a video calling device or other user device) an image or video of a user(s), who might be a first party to a video call or who might simply be the viewer of a video stream (or still image), such as a television program, video game, live stream of a remote scene, and/or the like. If the user is a party to a video call, this captured video can be transmitted to another video calling device in a remote location used by another party to the video call (block 910), as described in the '182 patent, for example.

The method 900 can further comprise identifying one or more features within the captured image/video (block 915). Merely by way of example, the method 900 might include processing video with facial recognition software, silhouette detection software, eye-tracking software, and/or the like. At block 920, the method 900 can include determining a position of the user(s) with respect to a display device (or speakers, or any other defined point). In some cases, the spatial relationship between the user device (or other camera) used to capture the image/video and the display device might be known (such as, for example, if both the camera and the display are integrated into a single device, or if the user device is designed to be placed on top of the display device). In other cases, the user might specify the relative positions of these devices (e.g., in a guided setup operation and/or by configuring user preferences on the user device). In some cases, the user device (or other camera) used to capture the image/video and/or the display device might communicate with each other or with a server computer over a local or wider network to determine relative positions (either by exchange location information, if each device has such capability, and/or by using triangulation techniques or similar techniques, or the like). In other cases, the location of the user device can be used as a proxy for the location of the display device itself. Hence, the user's position with respect to the user device can be used to derive or estimate the user's position with respect to the display device.

According to some embodiments, a known object (e.g., an object packaged with one or more of the image capture device, user device, display device, video calling device, and/or the like) might be placed within the field of view of the image capture device; because the dimensions of the object are already known, determination of the relative size of the image captured object can be used to determine distance relative to the object, and the object can be used as a point of reference for determining distance and/or position of the user(s). In some instances, the known object might be a wearable object (such as a pin, brooch, button, etc. that might be affixed to clothing of the user). In some embodiments, the known object need not be on the user, much less very close to the user; image analysis (e.g., lighting analysis, shadow analysis, and/or the like) might be used to determine relative positions between the user and the known object. In some cases, any object may be calibrated to serve as such a known object and point of reference. According to some embodiments, sonar, lidar, or other similar techniques might be used to determine distances and/or relative positions of the user(s), with respect to the image capture device and/or the display device.

To determine the user's position with respect to the user device (e.g., video calling device), a number of techniques can be used. For example, as noted above, the position of the user in three dimensions can be used to adjust the apparent view of the displayed video. Two of the dimensions can be considered the horizontal and vertical dimensions in a plane parallel to the display device (and/or a plane normal to the visual axis from the user's position to the focal point of the camera on the user device. FIG. 7A, for example, shows a plane 725 that is parallel to the display device, and the axes x and z represent the horizontal and vertical dimensions, respectively. The third dimension (i.e., dimension y, as shown, e.g., in FIGS. 4D, 4F, and 5A) is the distance of the axis from the user to the focal point of the camera. To determine the user's position in the first two dimensions (e.g., x and z dimensions), the identified features in the captured video/image of the user (as described above) can be used to identify a position in both dimensions. To determine the user's position in the third dimension (e.g., y dimension), any of a number of distance estimation techniques can be used, including, without limitation, laser rangefinding, parallax focusing, and/or the like.

The method 900, then, can comprise adjusting the apparent view of the displayed video (e.g., a video call, video game, media content, etc.), based on the determined position of the viewing user (block 925). Adjusting the apparent view of the video can comprise one or more of several operations. Merely by way of example, in some cases, adjusting the apparent view can comprise adjusting the apparent FOV, that is, the field of view that the user perceives when viewing the video, to correspond to the user's position(s) relative the display device (block 930). This adjustment can be performed by creating a windowed FOV (as noted above with respect to FIG. 6), and/or it can include panning, tilting (or vertical panning), and/or zooming a real or virtual camera capturing the video (for example, in a live stream or video call context), and/or it can include adjusting a raw video stream to provide the appropriate apparent field of view.

Additionally and/or alternatively, adjusting an apparent view can comprise adjusting an apparent perspective of the displayed video, i.e., the perspective that the user perceives when viewing the display, to correspond to the user's position relative to the display device (block 935). This operation can also be accomplished in a number of ways. For example, in a three-dimensional ("3-D") video feed, the 3-D aspects of the video stream can be manipulated to provide an appropriate perspective. In other cases, adjusting the perspective might include moving a real or virtual camera (either by pan/tilt or through translation of the camera) to capture a displayed scene that corresponds to the user's position relative to the display device. In other cases, if the capturing device comprises an array of two or more cameras, the device might create a composite FOV that is a mosaic of the fields of view of a plurality of those cameras. The selection of cameras that are used to create the composite FOV can be changed to adjust the perspective given to the captured (and displayed) video and the apparent perspective offered to the user.

As noted above, in some cases, adjusting the view might comprise processing the captured video to effect the adjustment (either at the capturing device, the displaying device, or a control server, or at a combination of two or more of those devices), and the method 900, accordingly, can comprise modifying a video signal (with any of such devices) to adjust the apparent view of the displayed video (block 940). Alternatively and/or additionally, as noted above, the position and/or behavior of cameras at the capturing device can be adjusted to effect those changes, and the method 900, therefore, can include sending instructions from a displaying device (or a control server) to the capturing device to adjust the camera(s) accordingly (block 945), receiving such instructions at the capturing device (block 950), and/or controlling one or more cameras in accordance with the received instructions (block 955).

In some cases, certain embodiments are configured to provide real-time (or near real-time) adjustments to the apparent view of the displayed video. In such embodiments, the user device on the viewer side can be configured to continually and/or periodically monitor the position of the user relative to the display device, and if the user device determines that the user has moved (block 960), the system can modify the apparent view of the displayed video (block 965), e.g., using the techniques described above, as shown by the flow continuing back to block 930.

The reader should note, as indicated above, that the functionality described with respect to certain system components in the method 900 of FIG. 9 can be performed by any other system components, as appropriate. Merely by way of example, the video calling device (or other user device) at the viewer's location might not have sufficient processing power to perform some or all of the functions described above, and in such cases, the control server (or another component) may perform such functions. For instance, the video calling device (or other user device) might capture video of the user and transmit that video to the control server (e.g., as part of a video call), and the control server might analyze that video for user position information before forwarding it to the video calling device at the other end of the video call; the control server then might provide instructions to the video calling device capturing video to be displayed to the user to modify camera behavior and/or might modify the video signal it receives from that video calling device before forwarding it to the viewer's calling device for display. Based on this example, the skilled reader should understand that the functionality described herein can be divided among system components in any appropriate manner.

It should also be appreciated that this functionality can be provided at both ends of a video call, such that a video device capturing video first party to a call can use that video to determine the position of the first party (and adjust the first party's apparent view accordingly), while a video calling device catching video of a second party to the call can use that video to determine a position of the second party relative to a display device on the second parties and of the call (and adjust the second parties apparent view accordingly). Thus, the video captured of each party can be adjusted for display to the other party as part of the video call, providing a much more lifelike and interesting video calling experience.

Further, as noted above, the reader should understand that the techniques described herein can have utility in a wide variety of applications and are not limited to the examples described above. Merely by way of example, these techniques can be used to provide a more realistic experience in the display of video games (e.g., using cameras or camera arrays in common use with many modern video game consoles), to provide a virtual window of a picturesque scene (e.g., times square, a nature scene, a child's room, and/or the like) in a remote location, such as in a virtual picture frame in an office. Similar techniques can be used to enhance the presentation of television programs, sports, and/or any other broadcast video, movies, and/or the like.

Figure 10:
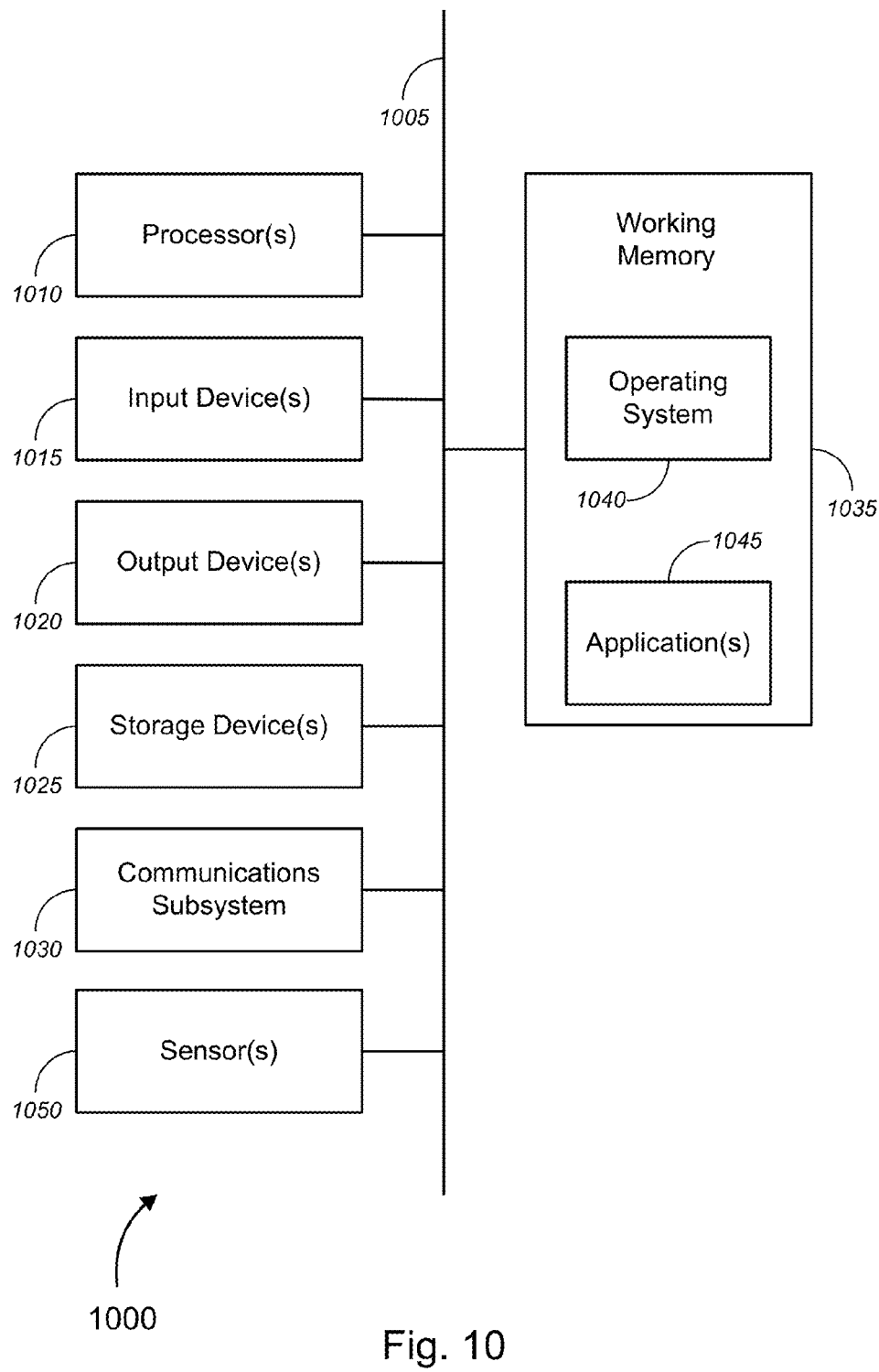
FIG. 10 is a generalized schematic diagram illustrating a computer system, in accordance with various embodiments.

FIG. 10 provides a schematic illustration of one embodiment of a computer system 1000 that can perform the methods provided by various other embodiments, as described herein, and/or can function as a video calling device, ICD, PDD, user device, control server, server computer, web server, and/or the like. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include, without limitation, a mouse, a keyboard, and/or the like; and one or more output devices 1020, which can include, without limitation, a display device, a printer, and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 1000 might also include a communications subsystem 1030, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer systems, and/or with any other devices described herein. In many embodiments, the computer system 1000 will further comprise a working memory 1035, which can include a RAM or ROM device, as described above.

The computer system 1000 also may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

According to some embodiments, system 1000 might further comprise one or more sensors 1050, which might include, without limitation, one or more cameras, one or more IR sensors, and/or one or more 3D sensors, or the like. In some cases, the one or more sensors 1050 might be incorporated in (or might otherwise be one of) the input device(s) 1015. The output device(s) 1020 might, in some embodiments, further include one or more monitors, one or more TVs, and/or one or more display screens, or the like.

The terms "machine readable medium" and "computer readable medium," as used herein, refer to any medium that participates in providing data that causes a machine to operate in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals, and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

As noted above, a set of embodiments comprises systems collecting presence information and/or enabling monitoring of media content presentation and determination (e.g., selection or generation) of advertisements, based on presence information (regardless of whether the user device detecting the presence detection is owned by and/or associated with the user). FIG. 11 illustrates a schematic diagram of a system 1100 that can be used in accordance with one set of embodiments. The system 1100 can include one or more user computers 1105. In particular, a user computer 1105 can be a video calling device, an ICD, a PDD, and/or a user device, as described above. More generally, a user computer 1105 can be a general purpose personal computer (including, merely by way of example, desktop computers, workstations, tablet computers, laptop computers, handheld computers, mobile phones, smart phones, and the like), running any appropriate operating system, several of which are available from vendors such as Apple, Microsoft Corp., as well a variety of commercially-available UNIX™ or UNIX-like operating systems. A user computer 1105 can also have any of a variety of applications, including one or more applications configured to perform methods provided by various embodiments (as described above, for example), as well as one or more office applications, database client and/or server applications, and/or web browser applications. Alternatively, a user computer 1105 can be any other electronic device, such as a thin-client computer, Internet-enabled mobile telephone, and/or personal digital assistant, capable of communicating via a network (e.g., the network 1110 described below) and/or of displaying and navigating web pages or other types of electronic documents. Although the exemplary system 1100 is shown with two user computers 1105, any number of user computers can be supported.

Certain embodiments operate in a networked environment, which can include a network 1110. The network 1110 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network 1110 can include a local area network ("LAN"), including, without limitation, a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 1115. Each of the server computers 1115 may be configured with an operating system, including, without limitation, any of those discussed above with respect to the user computers 1105, as well as any commercially (or freely) available server operating systems. Each of the servers 1115 may also be running one or more applications, which can be configured to provide services to one or more clients 1105 and/or other servers 1115.

Merely by way of example, one of the servers 1115 might be a control server, with the functionality described above. In another embodiment, one of the servers might be a web server, which can be used, merely by way of example, to provide communication between a user computer 1105 and a control server, for example, to process requests for web pages or other electronic documents from user computers 1105 and/or to provide user input to the control server. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform operations in accordance with methods provided by various embodiments.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer 1105 and/or another server 1115. In some embodiments, an application server can create web pages dynamically for displaying the information in accordance with various embodiments, such as providing a user interface for a control server, as described above. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases, a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters. Further, as noted above, the functionality of one or more servers 1115 might be implemented by one or more containers or virtual machines operating in a cloud environment and/or a distributed, cloud-like environment based on shared resources of a plurality of user video calling devices, a plurality of ICDs, and/or a plurality of PDDs.

In certain embodiments, the system can include one or more data stores 1120. The nature and location of the data stores 1120 is discretionary: merely by way of example, one data store 1120 might comprise a database 1120*a* that stores information about master accounts, user profiles, user preferences, assigned video calling devices, viewing/listening/Internet browsing/gaming patterns, viewing/listening/Internet browsing/gaming history, etc. Alternatively and/or additionally, a data store 1120*b* might be a cloud storage environment for storing master accounts, user profiles, user preferences, uploaded monitored reactions of users, and/or the like.

As the skilled reader can appreciate, the database 1120*a* and the cloud storage environment 1120*b* might be collocated and/or separate from one another. Some or all of the data stores 1120 might reside on a storage medium local to (and/or resident in) a server 1115*a*. Conversely, any of the data stores 1120 (and especially the cloud storage environment 1120*b*) might be remote from any or all of the computers 1105, 1115, so long as it can be in communication (e.g., via the network 1110) with one or more of these. In a particular set of embodiments, a database 1120*a* can reside in a storage-area network ("SAN") familiar to those skilled in the art, and/or the cloud storage environment 1120*b* might comprise one or more SANs. (Likewise, any necessary files for performing the functions attributed to the computers 1105, 1115 can be stored locally on the respective computer and/or remotely, as appropriate.) In one set of embodiments, the database 1120*a* can be a relational database, such as an Oracle database, that is adapted to store, update, and retrieve data in response to SQL-formatted commands. The database might be controlled and/or maintained by a database server, as described above, for example.

As noted above, the system can also include a first ICD 1125 and a second ICD 1130. The first ICD 1125 in the context of the examples described herein corresponds to a device associated with a first user (or first video call participant), while the second ICD 1130 might correspond to a device associated a second user (or second video call participant). Although only two ICDs are illustrated in FIG. 11, it should be appreciated that any number of ICDs 1125-1130 may be implemented in accordance with various embodiments.

Using the techniques described herein, each of the first ICD 1125 or the second ICD 1130 can determine presence and/or positions of one or more users (or audience members, or call participants, etc.), modify the displayed view based at least in part on the determined presence and/or positioned of the one or more users, and/or the like.

Each of the first ICD 1125 or the second ICD 1130 may be (or may have similar functionality as) a video calling device 105, a user device 105, an ICD 105, or a PDD 105, as described in detail above; in some cases, each of the first ICD 1125 or the second ICD 1130 might be (or may have similar functionality as) a VCD as described in the '182 patent.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or without-certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    displaying, with a presence detection device ("PDD"), video content on a display device that is communicatively coupled to the PDD;
    determining, with a processor of the PDD based at least in part on one or more first images of the first user that are captured by at least one camera of the PDD, a first position of a first user relative to a reference point on the display device that displays the video content, the first user viewing the displayed video content, the first position of the first user comprising a first vertical position and a first lateral position, each relative to the reference point on the display device, the first vertical position and the first lateral position of the first user relative to the reference point on the display device providing the first user with a first apparent view of the displayed video content;
    determining, with the processor of the PDD based at least in part on one or more second images of the first user that are captured by the at least one camera of the PDD, that position of the first user has changed from the first position to a second position relative to the reference point on the display device, the second position of the first user comprising a second vertical position and a second lateral position, each relative to the reference point on the display device;
    calculating, with the processor of the PDD, a difference between the first position and the second position of the first user, by calculating the difference between the first vertical position and the second vertical position and the difference between the first lateral position and the second lateral position, by determining a first vertical direction from the first vertical position to the second vertical position and determining a first lateral direction from the first lateral position to the second lateral position, and by calculating a vertical angle of rotation about the reference point on the display device based on the calculated difference between the first vertical position and the second vertical position and calculating a lateral angle of rotation about the reference point on the display device based on the calculated difference between the first lateral position and the second lateral position;
    adjusting, with the processor of the PDD, the first apparent view of the displayed video content to a second apparent view of the displayed video content, based at least in part on the calculated difference between the first position and the second position of the first user, wherein the second apparent view of the displayed video content is rotated by the calculated lateral angle of rotation about the reference point along a second lateral direction and rotated by the calculated vertical angle of rotation about the reference point along a second vertical direction, the second lateral direction being opposite to the first lateral direction with respect to the reference point, and the second vertical direction being opposite to the first vertical direction with respect to the reference point; and displaying, with the PDD, the second apparent view of the displayed video content on the display device.

2. The method of claim 1, wherein adjusting the first apparent view of the displayed video content comprises adjusting an apparent field of view of the displayed video content.

3. The method of claim 2, wherein the reference point is a face of the display device, and wherein calculating the difference between the first lateral position and the second lateral position comprises determining a first horizontal position of the first user in a horizontal dimension of a plane parallel to the face of the display device based on the first lateral position, determining a second horizontal position of the first user in the horizontal dimension of the plane parallel to the face of the display device, and calculating a difference between the first horizontal position and the second horizontal position.

4. The method of claim 3, wherein adjusting an apparent field of view of the displayed video content comprises panning the video content in a horizontal direction, based on the calculated difference between the first lateral position and the second lateral position.

5. The method of claim 2, wherein the reference point is a face of the display device, and wherein calculating the difference between the first vertical position and the second vertical position comprises determining a third vertical position of the first user in a vertical dimension of a plane parallel to the face of the display device based on the first vertical position, determining a fourth vertical position of the first user in the vertical dimension of the plane parallel to the face of the display device based on the second vertical position, and calculating a difference between the third vertical position and the fourth vertical position.

6. The method of claim 5, wherein adjusting an apparent field of view of the displayed video content comprises panning the video in a vertical direction, based on the calculated difference between the first vertical position and the second vertical position.

7. The method of claim 2, wherein the first position of the first user further comprises a first proximal position that is also relative to the reference point on the display device, the combination of the first vertical position, the first horizontal position, and the first proximal position of the first user relative to the reference point on the display device providing the first user with a first apparent view of the displayed video content, wherein the second position of the first user further comprises a second proximal position that is also relative to the reference point on the display device, wherein calculating the difference between the first position and the second position of the first user comprises calculating, with the processor of the PDD, a difference between the first position and the second position of the first user, by calculating the difference between the first vertical position and the second vertical position, the difference between the first lateral position and the second lateral position, and the difference between the first proximal position and the second proximal position, and by determining a first vertical direction form the first vertical position to the second vertical position, determining a first lateral direction from the first lateral position to the second lateral position, and determining a first proximal direction from the first proximal position to the second proximal position.

8. The method of claim 7, wherein calculating the difference between the first proximal position and the second proximal position comprises determining a first distance of the first user from the reference point on the display device based on the first proximal position, determining a second distance of the first user from the reference point on the display device based on the second proximal position, and calculating a difference between the first distance and the second distance.

9. The method of claim 8, wherein adjusting an apparent field of view of the displayed video content comprises zooming the video content based on the calculated difference between the first proximal position and the second proximal position.

10. The method of claim 7, wherein the second apparent view of the displayed video content is further shifted to have a narrower field of view when the first proximal direction is away from the display device, wherein the second apparent view of the displayed video content is further shifted to have a wider field of view when the first proximal direction is toward the display device.

11. The method of claim 1, wherein adjusting the first apparent view of the displayed video content comprises modifying, at the PDD, a video signal received by the PDD.

12. The method of claim 1, wherein the PDD is a first video calling device, wherein the video content is received from a second video calling device, and wherein adjusting the first apparent view of the displayed video content comprises instructing the second video calling device to adjust a view of one or more cameras of the second video calling device.

13. The method of claim 12, wherein instructing the second video calling device to adjust a view of one or more cameras comprises instructing the second video calling device to adjust a perspective of the one or more cameras.

14. The method of claim 12, wherein instructing the second video calling device to adjust a view of one or more cameras comprises instructing the second video calling device to pan a camera in at least one of a horizontal dimension or a vertical dimension.

15. The method of claim 12, wherein instructing the second video calling device to adjust a view of a camera comprises instructing the second video calling device to zoom a camera.

16. The method of claim 12, wherein instructing the second video calling device to adjust a view of a camera comprises instructing the second video calling device to crop frames of a video stream captured by the camera.

17. The method of claim 12, wherein instructing the second video calling device to adjust a view of one or more cameras comprises instructing the second video calling device to adjust a field of view of the one or more cameras.

18. The method of claim 12, wherein the second video calling device comprises an array of cameras, and wherein the field of view of the one or more cameras comprises a field of view of a composite image captured by a plurality of cameras within the array of cameras.

19. The method of claim 18, wherein the apparent view of the video call comprises a virtual perspective of the composite image.

20. The method of claim 19, wherein the virtual perspective represents a perspective of the first party to the displayed video content relative to the display device.

21. The method of claim 1, wherein the PDD is a video game console, and wherein the displayed video content is at least one of video content, image content, or gaming content from a video game.

22. The method of claim 1, wherein adjusting the first apparent view of the displayed video content comprises adjusting the first apparent view of the displayed video content to the second apparent view of the displayed video content substantially in real time with the determined change in position of the first user from the first position to the second position.

23. The method of claim 1, wherein determining each of the first position and the second position of the first user comprises capturing one or more images of the first user with the camera.

24. The method of claim 23, wherein the one or more images comprise a video stream.

25. The method of claim 24, wherein the PDD is a first video calling device, wherein the method further comprises transmitting the video stream to a second video calling device as part of a video call between the first video calling device and the second video calling device.

26. The method of claim 23, wherein determining each of the first position and the second position of the first user further comprises analyzing the one or more images to identify the corresponding first position and second position of the first user.

27. The method of claim 26, wherein analyzing the one or more images comprises identifying, in the one or more images, positions of one or more eyes of the first user.

28. An apparatus, comprising:
at least one processor;
at least one camera; and
a non-transitory computer readable medium having encoded thereon a set of instructions executable by the at least one processor to cause the apparatus to:
display video content on a display device that is communicatively coupled to the apparatus;
determine, based at least in part on one or more first images of the first user that are captured by the at least one camera, a first position of a first user relative to a reference point on the display device that displays the video content, the first user viewing the displayed video content, the first position of the first user comprising a first vertical position and a first lateral position, each relative to the reference point on the display device, the first vertical position and the first lateral position of the first user relative to the reference point on the display device providing the first user with a first apparent view of the displayed video content;
determine, based at least in part on one or more second images of the first user that are captured by the at least one camera, that position of the first user has changed from the first position to a second position relative to the reference point on the display device, the second position of the first user comprising a second vertical position and a second lateral position, each relative to the reference point on the display device;
calculate the difference between the first position and the second position of the first user, by calculating the difference between the first vertical position and the second vertical position and the difference between the first lateral position and the second lateral position, by determining a first vertical direction from the first vertical position to the second vertical position and determining a first lateral direction from the first lateral position to the second lateral position, and by calculating a vertical angle of rotation about the reference point on the display device based on the calculated difference between the first vertical position and the second vertical position and calculating a lateral angle of rotation about the reference point on the display device based on the calculated difference between the first lateral position and the second lateral position;
adjust the first apparent view of the displayed video content to a second apparent view of the displayed video content, based at least in part on the calculated difference between the first position and the second position of the first user, wherein the second apparent view of the displayed video content is rotated by the calculated lateral angle of rotation about the reference point along a second lateral direction and rotated by the calculated vertical angle of rotation about the reference point along a second vertical direction, the second lateral direction being opposite to the first lateral direction with respect to the reference point, and the second vertical direction being opposite to the first vertical direction with respect to the reference point; and
display the second apparent view of the displayed video content on the display device.

29. The apparatus of claim 28, wherein the apparatus comprises a video calling device.

30. The apparatus of claim 28, wherein the apparatus comprises a video game console.

31. A system, comprising:
a presence detection device ("PDD"), comprising:
at least one first processor;
at least one camera;
a first network interface; and
a first non-transitory computer readable medium in communication with the at least one first processor, the first non-transitory computer readable medium having encoded thereon a first set of instructions executable by the at least one first processor to cause the video calling device to:
display video content on a display device that is communicatively coupled to the PDD;
determine, based at least in part on one or more first images of the first user that are captured by the at least one camera, a first position of a first user relative to a reference point on the display device that displays the video content, the first user viewing the displayed video content, the first position of the first user comprising a first vertical position and a first lateral position, each relative to the reference point on the display device, the first vertical position and the first lateral position of the first user relative to the reference point on the display device providing the first user with a first apparent view of the displayed video content;
determine, based at least in part on one or more second images of the first user that are captured by the at least one camera, that position of the first user has changed from the first position to a second position relative to the reference point on the display device, the second position of the first user comprising a second vertical position and a second lateral position, each relative to the reference point on the display device; and
send, over a network via the first network interface, the first position and the second position of the first user to a computer;
the computer, comprising:
one or more second processors;
a second network interface; and
a second non-transitory computer readable medium in communication with the one or more second processors, the second non-transitory computer readable medium having encoded thereon a second set of instructions executable by the one or more second processors to cause the computer to:
receive, over the network via the second network interface, the first position and the second position of the first user;
calculate the difference between the first position and the second position of the first user, by calculating the difference between the first vertical position and the second vertical position and the difference between the first lateral position and the second lateral position, by determining a first vertical direction from the first vertical position to the second vertical position and determining a first lateral direction from the first lateral position to the second lateral position, and by calculating a vertical angle of rotation about the reference point on the display device based on the calculated difference between the first vertical position and the second vertical position and calculating a lateral angle of rotation about the reference point on the display device based on the calculated difference between the first lateral position and the second lateral position;
adjust the first apparent view of the displayed video content to a second apparent view of the displayed video content, based at least in part on the calculated difference between the first position and the second position of the first user, wherein the second apparent view of the displayed video content is rotated by the calculated lateral angle of rotation about the reference point along a second lateral direction and rotated by the calculated vertical angle of rotation about the reference point along a second vertical direction, the second lateral direction being opposite to the first lateral direction with respect to the reference point, and the second vertical direction being opposite to the first vertical direction with respect to the reference point; and
send, over the network and via the second network interface, the second apparent view of the displayed video content to the PDD;
wherein the first set of instructions, when executed by the at least one first processor, cause the video calling device to:
receive, over the network and via the first network interface, the second apparent view of the displayed video content; and
display the second apparent view of the displayed video content on the display device.

32. The system of claim 31, wherein the PDD comprises a video game console.

33. The system of claim 31, wherein the PDD comprises a first video calling device, the system further comprising a second video calling device that comprises a camera that records the video of a second user who is party to a video call established between the first video calling device and the second video calling device.

34. The system of claim 33, wherein adjusting the first apparent view of the displayed video content comprises transmitting, to the second video calling device, instructions for adjusting a field of view of the camera of the second video calling device.

35. The system of claim 33, wherein the computer is a control server separate from the first video calling device and the second video calling device.

36. The system of claim 33, wherein the computer is incorporated within the second video calling device.

37. The system of claim 31, wherein the computer is a control server separate from the PDD.

* * * * *